(12) United States Patent
Lee et al.

(10) Patent No.: US 12,510,799 B2
(45) Date of Patent: Dec. 30, 2025

(54) CAMERA ACTUATOR AND CAMERA MODULE INCLUDING SAME

(71) Applicant: LG INNOTEK CO., LTD., Seoul (KR)

(72) Inventors: Sung Guk Lee, Seoul (KR); Hyun Joong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 463 days.

(21) Appl. No.: 18/000,775

(22) PCT Filed: Jun. 3, 2021

(86) PCT No.: PCT/KR2021/006960
§ 371 (c)(1),
(2) Date: Dec. 5, 2022

(87) PCT Pub. No.: WO2021/246808
PCT Pub. Date: Dec. 9, 2021

(65) Prior Publication Data
US 2023/0213837 A1   Jul. 6, 2023

(30) Foreign Application Priority Data

Jun. 4, 2020  (KR) .................. 10-2020-0067527
Jun. 8, 2020  (KR) .................. 10-2020-0069125

(51) Int. Cl.
*G03B 5/00* (2021.01)
*G03B 13/36* (2021.01)
(Continued)

(52) U.S. Cl.
CPC ............ *G03B 5/00* (2013.01); *G03B 13/36* (2013.01); *H02K 11/215* (2016.01);
(Continued)

(58) Field of Classification Search
CPC .. G03B 5/00; G03B 13/36; G03B 2205/0007; G03B 2205/0046; G03B 2205/0069;
(Continued)

(56) References Cited

U.S. PATENT DOCUMENTS

| 2011/0215889 | A1 | 9/2011 | Schworm |
| 2018/0239162 | A1* | 8/2018 | Lee .................. H04N 23/57 |
| 2018/0343391 | A1 | 11/2018 | Goldenberg et al. |

FOREIGN PATENT DOCUMENTS

| EP | 4 068 751 A1 | 10/2022 |
| KR | 10-2010-0109831 A | 10/2010 |

(Continued)

OTHER PUBLICATIONS

English langage machine translation of KR_20100109831_, 2010 (Year: 2010).*

(Continued)

*Primary Examiner* — Marin Pichler
(74) *Attorney, Agent, or Firm* — Saliwanchik, Lloyd & Eisenschenk

(57) ABSTRACT

An embodiment of the present invention provides a camera actuator comprising: a housing; a first member combined with the housing; a mover including an optical member; a first magnetic body disposed in the first member; a second magnetic body disposed in the mover; and a tilting-guiding part for guiding titling of the mover, wherein the mover comprises a holder combined with the optical member and a second member combined with the holder, and the tilting-guiding part is closely adhered to the first member and the holder by repulsion between the first magnetic body and the second magnetic body.

8 Claims, 72 Drawing Sheets

(51) Int. Cl.
  *H02K 11/215*     (2016.01)
  *H02K 41/035*     (2006.01)
(52) U.S. Cl.
  CPC . *H02K 41/0354* (2013.01); *G03B 2205/0007* (2013.01); *G03B 2205/0046* (2013.01); *G03B 2205/0069* (2013.01)
(58) Field of Classification Search
  CPC .. G03B 2205/0023; G03B 3/10; G03B 30/00; H02K 11/215; H02K 41/0354; H04N 23/51; H04N 23/57; H04N 23/58; H04N 23/55; H04N 23/687
  USPC .......................... 359/822, 823, 824, 694, 813
  See application file for complete search history.

(56)          References Cited

FOREIGN PATENT DOCUMENTS

| KR | 10-2018-0092251 A | 8/2018 |
| KR | 10-1973434 B1 | 4/2019 |
| KR | 10-2020-0006607 A | 1/2020 |
| KR | 10-2020-0047275 A | 5/2020 |

OTHER PUBLICATIONS

Supplementary Partial European Search Report dated Jan. 23, 2024 in European Application No. 21818614.6.
International Search Report dated Sep. 6, 2021 in International Application No. PCT/KR2021/006960.

\* cited by examiner

1100

1200

CAMERA ACTUATOR AND CAMERA MODULE INCLUDING SAME

CROSS-REFERENCE TO RELATED APPLICATIONS

This application is the U.S. national stage application of International Patent Application No. PCT/KR2021/006960, filed Jun. 3, 2021, which claims the benefit under 35 U.S.C. § 119 of Korean Application Nos. 10-2020-0067527, filed Jun. 4, 2020; and 10-2020-0069125, filed Jun. 8, 2020; the disclosures of each of which are incorporated herein by reference in their entirety.

TECHNICAL FIELD

The present disclosure relates to a camera actuator and a camera module including the same.

BACKGROUND ART

A camera is a device that takes a picture or video of a subject, and is mounted on a portable device, a drone, a vehicle, or the like. The camera module may have an image stabilization (IS) function of correcting or inhibiting image shakes due to a user motion in order to improve an image quality, an auto-focusing (AF) function of automatically adjusting a distance between an image sensor and a lens and thereby aligning a focal length of the lens, and a zooming function of increasing or decreasing the magnification of a distant subject through a zoom lens.

Meanwhile, the higher the pixel number, the higher the resolution of the image sensor, and the smaller the size of the pixel. As the pixel becomes smaller in size, the amount of light received during the same time decreases. Therefore, as the camera has a higher pixel number, image shakes caused by hand shakes due to a slow shutter speed in a dark environment may appear more severe. As a representative IS technology, there is an optical image stabilizer (OIS) technology that corrects motion by changing an optical path.

A general OIS technology is capable of detecting a camera movement through a gyrosensor or the like and, based on the detected movement, tilting or moving the lens or tilting or moving the camera module including the lens and the image sensor. In the case that the lens or the camera module including the lens and the image sensor is tilted or moved for the OIS, it is necessary to additionally secure a space for tilting or moving in the vicinity of the lens or the camera module.

On the other hand, an actuator for the OIS may be disposed around the lens. In this case, the actuator for the OIS may include actuators in charge of tilting of two axes perpendicular to the optical axis Z, that is, an actuator in charge of X-axis tilting and an actuator in charge of Y-axis tilting.

However, due to the needs of ultra-slim and ultra-small camera modules, there is a large space constraint for arranging the actuators for the OIS, and it may be difficult to ensure a sufficient space where the lens or the camera module itself including the lens and the image sensor can be tilted or moved for the OIS. In addition, as the camera has a higher pixel number, it is desirable to increase the size of the lens to increase the amount of light received. However, there may be a limit in increasing the size of the lens due to a space occupied by the actuator for the OIS.

In addition, when the zooming function, the AF function, and the OIS function are all included in the camera module, there is a problem in that a magnet for the OIS and a magnet for the AF or zoom are disposed close to each other and cause magnetic field interference.

On the other hand, in the case of a lens movement scheme, a Hall sensor is used to detect the position and movement of the lens.

The Hall sensor is connected to a driver IC, acquires lens position information, and transfers the acquired position information to the driver IC.

Typically, the driver IC and the Hall sensor are mounted on different substrates, but recently the driver IC and the Hall sensor tend to be mounted on the same substrate to reduce noise and minimize volume. In this case, a plurality of pads are formed on the substrate and connected to the driver IC, and the Hall sensor is connected to the driver IC. That is, in the case where the driver IC and the Hall sensor are disposed on one substrate, the substrate has no pad directly connected to the Hall sensor.

Here, the Hall sensor is mounted on the substrate through surface mount technology (SMT) or the like. In this case, about 3% to 4% of short-circuit defects occur in the SMT process of the Hall sensor. However, the substrate has no pad connected to the Hall sensor, so that there is a problem in that a mounting state of the Hall sensor cannot be tested. That is, checking the mounting state of the Hall sensor is made through the measurement of Hall resistance, and in order to check the mounting state of the Hall sensor, a test should be performed through a pad connected to the driver IC. However, because the pad is connected to the Hall sensor through the driver IC rather than directly connected to the Hall sensor, a direct test of the Hall sensor is impossible.

Meanwhile, the above-described Hall sensor is disposed on the substrate together with a coil. Specifically, the Hall sensor is disposed on the substrate in the inner region of the coil. In addition, the movement of the lens is performed by the electromagnetic force generated between the coil and the magnet. At this time, the electromagnetic force is affected by a separation distance between the coil and the magnet. Also, depending on the separation distance between the Hall sensor and the magnet, the magnetic flux of the magnet detected by the Hall sensor varies, and thus the position detecting performance of the Hall sensor is affected.

Typically, the height of the coil should be guaranteed to secure thrust. As the height of the coil increases, the separation distance between the magnet and the Hall sensor increases, and thus there is a problem in that the position detecting performance is deteriorated.

DISCLOSURE

Technical Problem

A technical problem to be solved by the present disclosure is to provide a camera actuator that maintains a combination between a mover and a housing by using a repulsive force between a first magnetic body and a second magnetic body, and provide a camera module including the same.

In addition, embodiments are intended to provide a camera actuator applicable to ultra-slim, ultra-small, and high-resolution cameras.

In addition, embodiments are intended to provide a camera actuator capable of testing a mounted state of a Hall sensor even when a driver IC and the Hall sensor are disposed on the same substrate, and provide a camera module including the same.

In addition, embodiments are intended to provide a camera actuator capable of increasing the thrust and also increasing the sensitivity of the Hall sensor, and provide a camera module including the same.

The problem to be solved in embodiments is not limited to the above, and other objects or effects that can be understood from the technical solution or embodiments described below are also included.

Technical Solution

A camera actuator according to an embodiment of the present disclosure includes a housing; a first member combined with the housing; a mover including an optical member; a first magnetic body disposed on the first member; a second magnetic body disposed on the mover; and a tilting guide part for guiding tilting of the mover, wherein the mover includes a holder combined with the optical member and a second member combined with the holder, and wherein the tilting guide part is in close contact with the first member and the holder by a repulsive force of the first magnetic body and the second magnetic body.

The first member may include a first through hole and a second through hole spaced apart from the first through hole, and the second member may include a member base; a first extension located at an edge of the member base and extending toward the holder; and a second extension spaced apart from the first extension and extending toward the mover.

The first extension may pass through the first through hole, and the second extension may pass through the second through hole.

The first member may include an upper member disposed above the first through hole and the second through hole; a lower member disposed below the first through hole and the second through hole; a connecting member connecting the upper member and the lower member; a first protrusion extending toward the holder from one side of the upper member; and a second protrusion extending toward the holder from other side of the upper member, wherein the first extension and the second extension may be disposed between the upper member and the lower member.

A camera actuator according to an embodiment may include a housing; a first member combined with the housing; a mover including a holder; a first magnetic body disposed on the first member; a second magnetic body disposed on the mover; and a tilting guide part disposed between the holder and the first member, wherein the mover may include a second member combined with the holder, wherein a portion of the first member may be disposed between the second member and the holder, and wherein a first surface of the first magnetic body and a second surface of the second magnetic body facing the first surface may have same polarity.

A center of the second magnetic body and a center of the second member may be disposed at different positions from each other.

The center of the second magnetic material may be located above or below the center of the second member.

An area of the second magnetic body may be greater than an area of the first magnetic body, and the first magnetic body may be located on an imaginary straight line extending from both ends of the second magnetic body in an optical axis direction.

A camera actuator according to an embodiment may include a housing; a first member combined with the housing; a first magnetic body disposed on the first member; a second magnetic body corresponding to the first magnetic body; a second member on which the second magnetic body is disposed; a holder combined with the second member; and a tilting guide part disposed between the holder and the first member, wherein a portion of the first member may be disposed between the second member and the holder.

The first magnetic body and the second magnetic body may face each other with same polarity.

A camera actuator according to an embodiment may include a base; a guide part disposed inside the base; a lens assembly moving along the guide part; and a substrate disposed outside the base, wherein the lens assembly may include a lens barrel where a lens is disposed, and a mover where a magnet is disposed, wherein the substrate may include an insulating unit, a coil unit disposed to face the magnet on the insulating unit, a position detection sensor disposed in an inner region of the coil unit, and a test pad disposed in the insulating unit, and wherein the test pad is directly connected to the position detection sensor through a connection wire.

In addition, the test pad may be disposed to face the magnet with the coil unit interposed therebetween.

In addition, the substrate may include a driver IC, and the position detection sensor may include a first terminal connected to the test pad and a second terminal connected to the driver IC.

In addition, the insulating unit may includes an insulating layer having one surface which faces the magnet and on which the test pad and the connection wire are disposed, a first protective layer formed on one surface of the insulating layer and having a first opening area exposing the test pad, and a second protective layer formed on one surface of the first protective layer and having a second opening area exposing the first opening area.

In addition, the coil unit may be disposed on one surface of the second protective layer to cover the first opening area and the second opening area.

In addition, an outer side of the base may be disposed to cover the first opening area of the first protective layer and the second opening area of the second protective layer.

In addition, the second protective layer may have a mounting recess opened to allow the coil unit to be disposed, and the coil unit may be disposed in the mounting recess of the second protective layer.

In addition, the position detection sensor may include a plurality of Hall sensors disposed spaced apart from each other in an inner region of the coil unit.

In addition, the guide part may include a first guide part disposed on a first inner side adjacent to a first sidewall of the base, and a second guide part disposed on a second inner side adjacent to a second sidewall of the base, wherein the lens assembly may include a first lens assembly including a first lens barrel where a first lens is disposed, and a first mover where a first magnet is disposed, and a second lens assembly including a second lens barrel where a second lens is disposed, and a second mover where a second magnet is disposed, wherein the substrate may include a first substrate area disposed outside the first sidewall, and a second substrate area disposed outside the second sidewall, and wherein the coil unit, the test pad, and the position detection sensor may be respectively disposed in the first substrate area and the second substrate area.

Meanwhile, a camera actuator according to an embodiment may include a housing; an image shake control unit disposed in the housing; a mover disposed in the image shake control unit; and a tilting guide part disposed between the housing and the mover, wherein the mover may include a prism mover and a prism disposed on the prism mover, wherein the image shake control unit may include a substrate, a coil unit disposed on one surface of the substrate facing the prism mover, a position sensor disposed in an inner region of the coil unit, and a magnet disposed on the prism mover facing the coil unit, and wherein the test pad may be disposed to face the magnet with the coil unit interposed therebetween, and be directly connected to the position detection sensor through a connection wire.

In addition, the substrate may includes an insulating layer having one surface which faces the magnet and on which the test pad and the connection wire are disposed, a first protective layer formed on one surface of the insulating layer and having a first opening area exposing the test pad, and a second protective layer formed on one surface of the first protective layer and having a second opening area exposing the first opening area, wherein the coil unit may be disposed on one surface of the second protective layer to cover the first opening area and the second opening area.

In addition, the second protective layer may have a mounting recess opened to allow the coil unit to be disposed, and the coil unit may be disposed in the mounting recess of the second protective layer.

Meanwhile, a camera module according to an embodiment may include a first camera actuator; and a second camera actuator, wherein the first camera actuator performs an auto focusing or zoom function, and the second camera actuator performs an optical image stabilizer (OIS) function.

In addition, light incident on the camera module from outside changes in path by the second camera actuator and is incident on the first camera actuator.

Advantageous Effects

According to embodiments of the present disclosure, the tilting guide part comes into close contact with the holder by the first and second magnetic bodies generating the repulsive force, so that the camera actuator with improved combining force can be implemented.

In addition, according to embodiments, the camera actuator applicable to ultra-slim, ultra-small, and high-resolution cameras can be provided. In particular, it is possible to efficiently dispose the actuator for the OIS without increasing the overall size of the camera module.

In embodiments, the Hall sensor, the driver IC, and the coil unit are disposed on the first substrate. In this case, the first substrate includes the test pad directly connected to the Hall sensor. That is, in a state where the driver IC, the Hall sensor, and the coil unit are disposed on the same substrate, a separate test pad for testing the mounting state of the Hall sensor is formed on the first substrate. According to this, it is possible to efficiently verify mounting defects that may occur during mounting of the Hall sensor, and thus improve reliability.

In addition, the test pad according an embodiment may be formed on the first substrate by being exposed to the outside. In this case, the test pad may cause a reliability problem when it comes into contact with other components. In one embodiment, an exposed surface of the test pad may be covered by the coil unit. In another embodiment, the exposed surface of the test pad may be covered by a sidewall of the base. Therefore, in embodiments, it is not necessary to form a separate protective layer for covering the exposed surface of the test pad, thereby simplifying the manufacturing process and reducing manufacturing cost. Also, in embodiments, it is possible to solve the design problem caused by the protective layer, and thus secure the degree of freedom in design.

In addition, the first substrate according to an embodiment may include the mounting recess formed in a region where the coil unit is disposed. In this case, the mounting recess is an open area of a coverlay constituting the first substrate. Therefore, in embodiments, it is possible to reduce the distance between the Hall sensor and the magnet by the depth of the mounting recess, and improve the sensitivity of the Hall sensor while increasing the thrust of the drive unit.

According to an embodiment of the present disclosure, the tilting in the X-axis direction and the tilting in the Y-axis direction do not cause magnetic field interference with each other, and also the tilting in the X-axis direction and the tilting in the Y-axis direction can be implemented with a stable structure and realize a precise OIS function without causing magnetic field interference with an actuator for AF or zooming.

According to an embodiment of the present disclosure, it is possible to secure a sufficient amount of light by solving a size limitation of a lens, and it is also possible to implement OIS with low power consumption.

BEST MODE

Figure 1:
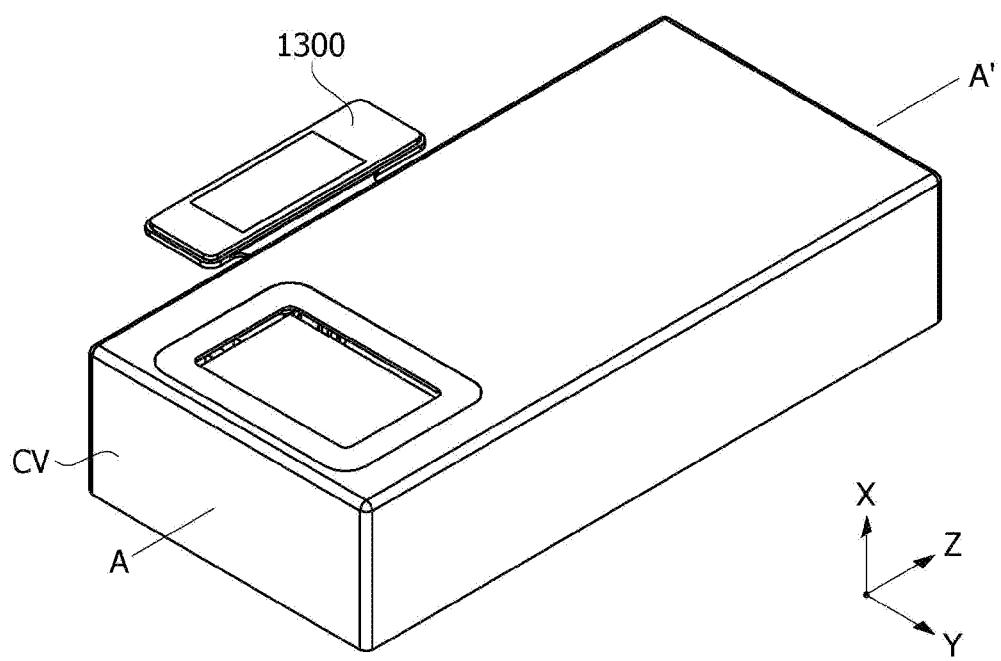
FIG. 1 is a perspective view of a camera module according to an embodiment.

The present disclosure may have various embodiments with several modifications, and specific embodiments will be described with reference to the accompanying drawings. However, this is not intended to limit the present disclosure to specific embodiments, and it should be understood that all modifications, equivalents, and alternatives are included in the subject matter and scope of the present disclosure.

The terms including ordinal numbers such as first, second, etc. may be used to indicate various elements, but such elements are not limited by the terms. The terms are used only for the purpose of distinguishing one element from another. For example, without departing from the scope of the present disclosure, a second element may be referred to as a first element, and similarly, a first element may also be referred to as a second element. The term "and/or" includes any one of or any combination of a plurality of enumerated items.

When it is mentioned that a certain element is "combined with/to" or "connected with/to" another element, it will be understood that the certain element is combined or connected to another element directly or via any other element.

On the other hand, when it is mentioned that a certain element is "directly combined with/to" or "directly connected with/to" another element, it will be understood that there is no element interposed between both elements.

Terms used in the present disclosure are used only to describe certain embodiments and may not be intended to limit the scope of the present disclosure. The singular expressions may include plural expressions unless the context clearly dictates otherwise. In the disclosure, the terms such as "comprise", "include", and "have" denote the presence of stated elements, components, operations, functions, features, and the like, but do not exclude the presence of or a possibility of addition of one or more other elements, components, operations, functions, features, and the like.

Unless otherwise defined, all terms used herein, including technical or scientific terms, have the same meaning as commonly understood by one of ordinary skill in the art to which the present disclosure belongs. Among terms used herein, terms defined in a generic dictionary may be interpreted as having the same or similar meaning as the contextual meanings of the related art and, unless explicitly defined herein, may not be interpreted as ideally or excessively formal sense.

Hereinafter, embodiments will be described in detail with reference to the accompanying drawings. The same or corresponding elements are given the same reference numerals, and overlapping descriptions thereof will be omitted.

Figure 2:
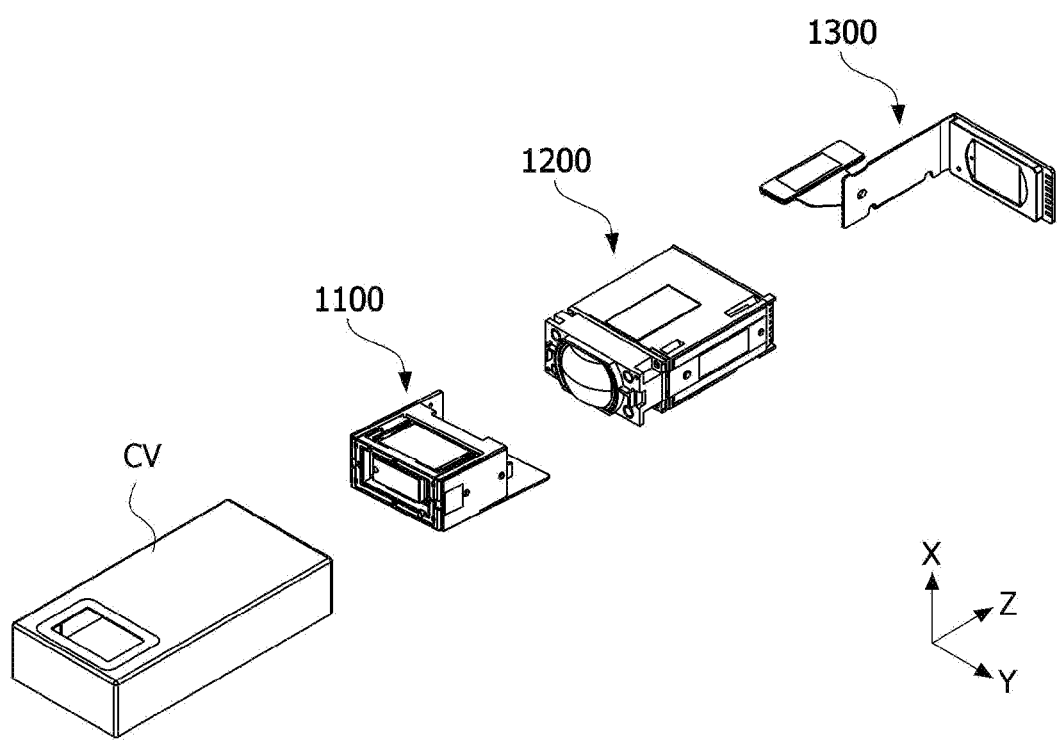
FIG. 2 is an exploded perspective view of a camera module according to an embodiment.
Figure 3:
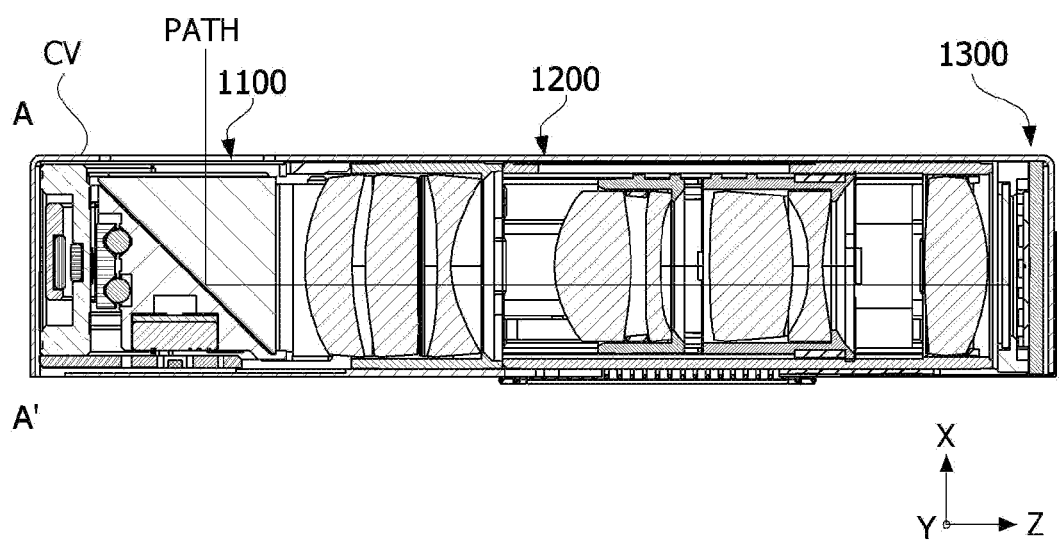
FIG. 3 is a cross-sectional view taken along line AA' in FIG. 1.

FIG. 1 is a perspective view of a camera module according to an embodiment, FIG. 2 is an exploded perspective view of a camera module according to an embodiment, and FIG. 3 is a cross-sectional view taken along line AN in FIG. 1.

Referring to FIGS. 1 and 2, a camera module 1000 according to an embodiment may include a cover CV, a first camera actuator 1100, a second camera actuator 1200, and a circuit board 1300. Here, the first camera actuator 1100 may be interchangeably referred to as a first actuator, and the second camera actuator 1200 may be interchangeably referred to as a second actuator. They may also correspond to the first camera actuator and the second camera actuator to be described in another embodiment below. Furthermore, the first camera actuator and the second camera actuator described in FIGS. 19 to 42 may be replaced with the first camera actuator 1100 and the second camera actuator 1200 described in FIGS. 1 to 18, respectively.

The cover CV may cover the first camera actuator 1100 and the second camera actuator 1200. A combining force between the first camera actuator 1100 and the second camera actuator 1200 may be improved by the cover CV.

Furthermore, the cover CV may be made of a material that blocks electromagnetic waves.

Accordingly, the first camera actuator 1100 and the second camera actuator 1200 in the cover CV can be easily protected.

The first camera actuator 1100 may be an optical image stabilizer (OIS) actuator. For example, the first camera actuator 1100 may move an optical member in a direction perpendicular to the optical axis.

The first camera actuator 1100 may include a lens disposed in a predetermined barrel (not shown). The lens may include a fixed focal length lens. The fixed focal length lens may also be referred to as a "single focal length lens" or "single lens".

The first camera actuator 1100 may change the optical path. In an embodiment, the first camera actuator 1100 may vertically change the optical path through an optical member (e.g., a prism or a mirror) therein. With this configuration, even if the thickness of a mobile terminal is reduced, a lens configuration larger than the mobile terminal thickness can be disposed in the mobile terminal through a change in the optical path, and zooming, auto-focusing (AF), and OIS functions can be performed.

However, it is not limited to the above, and the first camera actuator 1100 may change the optical path vertically or at a predetermined angle multiple times.

The second camera actuator 1200 may be disposed at the rear end of the first camera actuator 1100. The second camera actuator 1200 may be combined with the first camera actuator 1100. This combining may be made by various manners.

In addition, the second camera actuator 1200 may be a zoom actuator or an auto focus (AF) actuator. For example, the second camera actuator 1200 may support one lens or a plurality of lenses and may perform an auto-focusing function or a zoom function by moving the lenses in response to a control signal of a predetermined controller.

One or a plurality of lenses may independently or individually move along the optical axis direction.

The circuit board 1300 may be disposed at the rear end of the second camera actuator 1200. The circuit board 1300 may be electrically connected to the second camera actuator 1200 and the first camera actuator 1100. Also, there may be a plurality of circuit boards 1300.

The camera module according to an embodiment may be composed of a single camera module or a plurality of camera modules. For example, the plurality of camera modules may include a first camera module and a second camera module.

The first camera module may include a single actuator or a plurality of actuators. For example, the first camera module may include the first camera actuator 1100 and the second camera actuator 1200.

The second camera module may include an actuator (not shown) disposed in a predetermined housing (not shown) and capable of driving the lens. The actuator may be a voice coil motor, a micro actuator, a silicon actuator, etc., and may be applied in various ways such as, but not limited to, an electrostatic type, a thermal type, a bimorph type, an electrostatic force type, and the like. Also, in this specification, the camera actuator may be referred to as an actuator or the like. In addition, the camera module including a plurality of camera modules may be mounted in various electronic devices such as a mobile terminal.

Referring to FIG. 3, the camera module according to an embodiment may include the first camera actuator 1100 performing an OIS function, and the second camera actuator 1200 performing a zooming function and an auto-focusing (AF) function.

The light may be incident into the camera module or the first camera actuator through an opening area located in an upper surface of the first camera actuator 1100. That is, the light may be incident into the inside of the first camera actuator 1100 along the optical axis direction (e.g., the X-axis direction), and the optical path may be changed to the vertical direction (e.g., the Z-axis direction) through an optical member. In addition, the light may pass through the second camera actuator 1200 and be incident to an image sensor IS located at one end of the second camera actuator 1200 (PATH).

In this specification, a lower surface refers to one side in a first direction. In addition, the first direction is the X-axis direction in the drawing and may be used interchangeably with a second axis direction. A second direction is the Y-axis direction in the drawing and may be used interchangeably with a first axis direction. The second direction is perpendicular to the first direction. In addition, a third direction is the Z-axis direction in the drawing and may be used interchangeably with a third axis direction. The third direction is perpendicular to both the first direction and the second direction. The third direction (Z-axis direction) corresponds to the direction of the optical axis, and the first direction (X-axis direction) and the second direction (Y-axis direction) are perpendicular to the optical axis and can be tilted by the second camera actuator. Also, the horizontal direction may refer to the first and second directions, and the vertical direction may refer to a direction perpendicular to at least one of the first and second directions. For example, the horizontal direction may refer to the X-axis and Y-axis directions in the drawing, and the vertical direction may refer to the Z-axis direction perpendicular to the X-axis and Y-axis directions in the drawing. In the following description of the first camera actuator 1100 and the second camera actuator 1200, the optical axis direction is the third direction (Z-axis direction), which will be used as a basis of the following description.

Also, in this specification, inside may refer to a direction from the cover CV toward the first camera actuator, and outside may refer to a direction opposite to inside. That is, the first camera actuator and the second camera actuator may be positioned inside the cover CV, and the cover CV may be positioned outside the first camera actuator or the second camera actuator.

With this configuration, the camera module according to an embodiment can improve the spatial limitation of the first and second camera actuators by changing the optical path. That is, in response to a change of the optical path, the camera module according to an embodiment can extend the optical path while minimizing the thickness of the camera module. Furthermore, the second camera actuator can provide a high range of magnification by controlling a focus or the like on the extended optical path.

In addition, the camera module according to an embodiment may implement the OIS through control of the optical path by the first camera actuator, thereby minimizing the occurrence of a decent or tilt phenomenon, and exhibiting the best optical properties.

Furthermore, the second camera actuator 1200 may include an optical system and a lens driving unit. For example, in the second camera actuator 1200, at least one of a first lens assembly, a second lens assembly, a third lens assembly, and a guide pin may be disposed.

Also, the second camera actuator 1200 may include a coil and a magnet to perform a high-magnification zooming function.

For example, the first lens assembly and the second lens assembly may be a moving lens that moves through the coil, the magnet, and the guide pin, and the third lens assembly may be a fixed lens, but this is not a limitation. For example, the third lens assembly may perform the function of a concentrator (focator) that images light at a specific position, and the first lens assembly may perform the function of a variator that re-images the image formed by the third lens assembly to another position. Meanwhile, a magnification change may be large in the first lens assembly because a distance to a subject or an image distance changes a lot, and the first lens assembly which is a variator may perform an important role in changing the focal length or magnification of the optical system. On the other hand, an image point formed by the first lens assembly which is a variator may be slightly different depending on a position. Therefore, the second lens assembly may perform a position compensation function for the image formed by the variator. For example, the second lens assembly may perform the function of a compensator that accurately forms, at an actual image sensor position, the image point formed by the first lens assembly which is a variator. For example, the first lens assembly and the second lens assembly may be driven with electromagnetic force by an interaction between the coil and the magnet. The above description may be applied to a lens assembly to be described later. In addition, the first to third lens assemblies may move along the optical axis direction, that is, the third direction. Also, the first to third lens assemblies may move in the third direction independently or dependently on each other.

Meanwhile, when the actuator for OIS and the actuator for AF or zoom are disposed according to an embodiment of the present disclosure, magnetic field interference with the magnet for AF or zoom can be inhibited during the OIS operation. Because a first driving magnet of the first camera actuator 1100 is disposed separately from the second camera actuator 1200, magnetic field interference between the first camera actuator 1100 and the second camera actuator 1200 can be inhibited. In this specification, the OIS may be used interchangeably with terms such as hand-shake correction, optical image stabilization, optical image correction, and shake correction.

Figure 4:
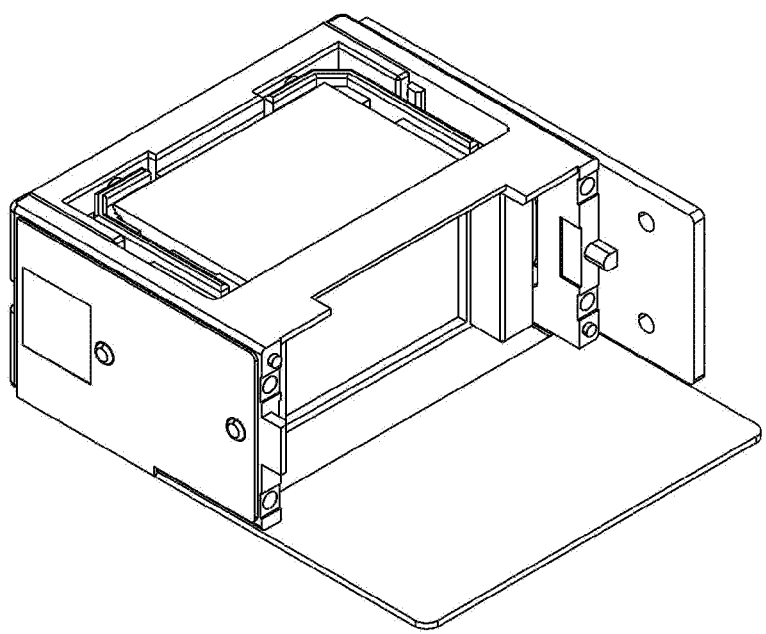
FIG. 4 is a perspective view of a first camera actuator according to an embodiment.
Figure 5:
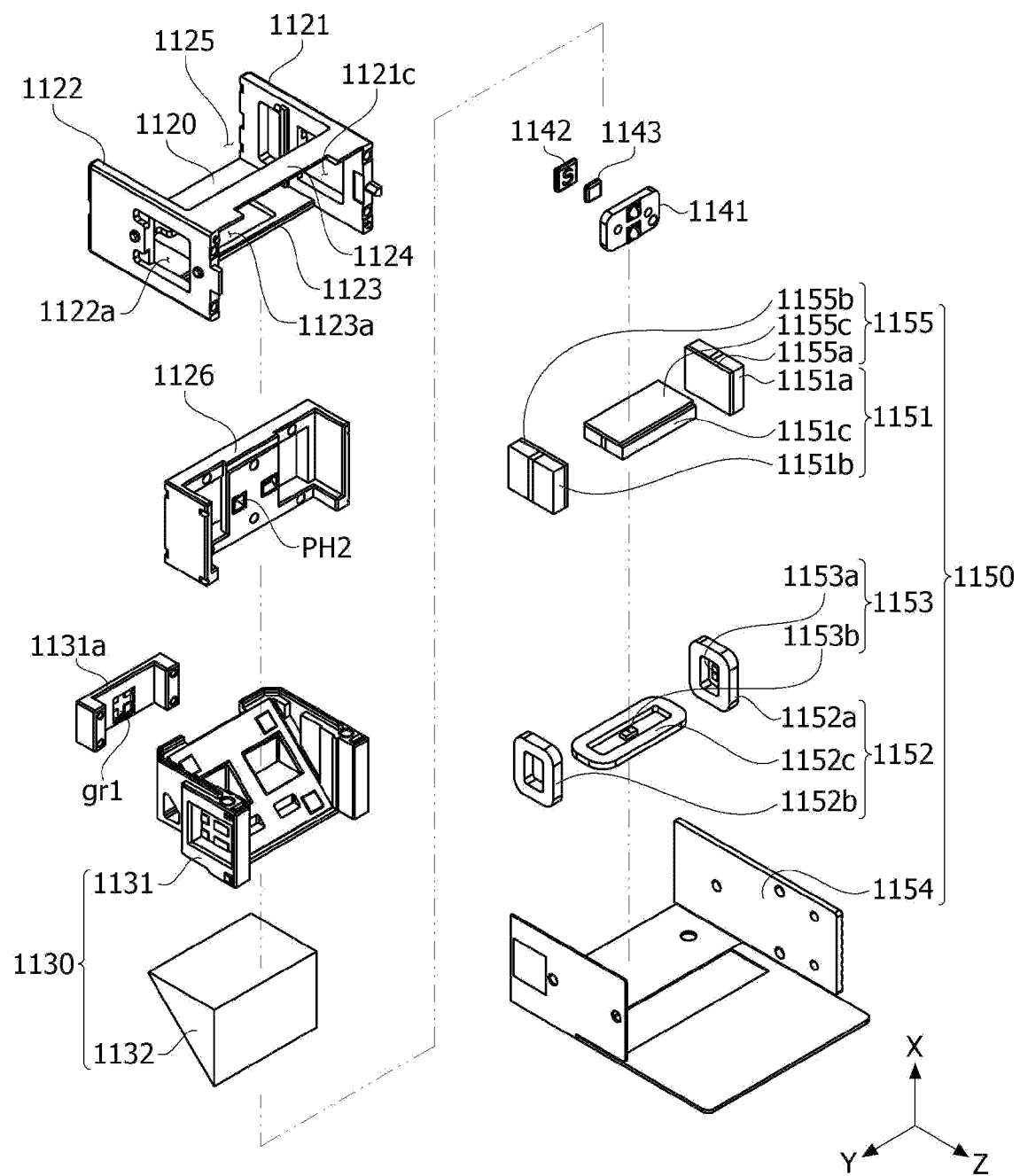
FIG. 5 is an exploded perspective view of a first camera actuator according to an embodiment.

FIG. 4 is a perspective view of a first camera actuator according to an embodiment, and FIG. 5 is an exploded perspective view of a first camera actuator according to an embodiment.

Referring to FIGS. 4 and 5, the first camera actuator 1100 according to an embodiment includes a first housing 1120, a mover 1130, a rotation unit 1140, a first driving unit 1150, a first member 1126, and a second member 1131*a*.

The mover 1130 may include a holder 1131 and an optical member 1132 disposed in the holder 1131. The rotation unit 1140 may include a tilting guide part 1141, and a second magnetic body 1142 and a first magnetic body 1143 having different polarities to press the tilting guide part 1141. The first driving unit 1150 includes a driving magnet 1151, a driving coil 1152, a Hall sensor unit 1153, a first substrate unit 1154, and a yoke unit 1155.

The first camera actuator 1100 may include a shield can (not shown). The shield can (not shown) may be positioned on the outermost of the first camera actuator 1100 to surround the rotation unit 1140 and the first driving unit 1150, which will be described later.

The shield can (not shown) can block or reduce electromagnetic waves generated from the outside. That is, the shield can (not shown) can reduce the occurrence of a malfunction in the rotation unit 1140 or the first driving unit 1150.

The first housing 1120 may be located inside the shield can (not shown). When there is no shield can, the first housing 1120 may be located on the outermost of the first camera actuator.

In addition, the first housing 1120 may be located inside the first substrate unit 1154 to be described later. The first housing 1120 may be fitted into or fastened to the shield can (not shown).

The first housing 1120 may include a first housing side 1121, a second housing side 1122, a third housing side 1123, and a fourth housing side 1124. A detailed description will be given later.

The first member 1126 may be disposed in the first housing 1120. The first member 1126 may be disposed between the second member 1131*a* and the housing. The first member 1126 may be disposed within or included in the housing. The first member 1126 may be combined with the holder 1131 by the second member 1131*a*. The first member 1126 may be penetrated by the second member 1131*a*, and the second member 1131*a* may be combined with the holder 1131. Thus, at least apart of the first member 1126 may be positioned between the second member 1131*a* and the holder 1131. A related description will be given later.

The mover 1130 includes the holder 1131 and the optical member 1132 mounted on the holder 1131.

The holder 1131 may be placed in an accommodating space 1125 of the first housing 1120.

The holder 1131 may include first to fourth holder outer surfaces corresponding to the first housing side 1121, the second housing side 1122, the third housing side 1123, and the first member 1126, respectively. For example, the first to fourth holder outer surfaces may correspond to or face inner surfaces of the first housing side 1121, the second housing side 1122, the third housing side 1123, and the first member 1126, respectively.

Also, the holder 1131 may include a second member 1131*a* disposed in a fourth mounting groove. A detailed description will be given later.

The optical member 1132 may be mounted on the holder 1131. To this end, the holder 1131 may have a mounting surface, which may be formed by a receiving recess. In an embodiment, the optical member 1132 may be formed of a mirror or a prism. Hereinafter, although the prism is shown as an example, it may be composed of a plurality of lenses as in the above-described embodiment. Alternatively, the optical member 1132 may be composed of a plurality of lenses and a prism or mirror. Also, the optical member 1132 may include a reflector disposed therein. However, this is not a limitation.

The optical member 1132 may reflect light reflected from the outside (e.g., an object) into the camera module. In other words, the optical member 1132 may change a path of reflected light, thereby improving a spatial limitation of the first and second camera actuators. Accordingly, the camera module may provide a high range of magnifications by extending the optical path while minimizing thickness.

Additionally, the second member 1131*a* may be combined with the holder 1131. The second member 1131*a* may be disposed outside the holder 1131 and inside the housing. In addition, the second member 1131*a* may be placed in an additional groove located in an area other than the fourth mounting groove on the fourth holder outer surface of the holder 1131. Through this, the second member 1131*a* may be combined with the holder 1131, and at least a portion of the first member 1126 may be positioned between the second member 1131*a* and the holder 1131. For example, at least a portion of the first member 1126 may pass through a space formed between the second member 1131*a* and the holder 1131.

Also, the second member 1231*a* may have a structure separated from the holder 1131. With this configuration, assembly of the first camera actuator can be easily performed as will be described later. Alternatively, the second member 1131*a* may be integrally formed with the holder 1131, but will be described below as a separate structure.

The rotation unit 1140 includes the tilting guide part 1141, and the second magnetic body 1142 and the first magnetic body 1143 having different polarities to press the tilting guide part 1141.

The tilting guide part 1141 may be combined with the mover 1130 and the first housing 1120 described above. Specifically, the tilting guide part 1141 may be disposed between the holder 1131 and the first member 1126. Accordingly, the tilting guide part 1141 may be combined with the mover 1130 of the holder 1131 and the first housing 1120. However, unlike the above description, the tilting guide part 1141 may be disposed between the first member 1126 and the holder 1131 in this embodiment. Specifically, the tilting guide part 1141 may be positioned between the first member 1126 and the fourth mounting groove of the holder 1131.

The second member 1131*a*, the first member 1126, the tilting guide part 1141, and the holder 1131 may be disposed sequentially in the third direction (Z-axis direction). In addition, the second magnetic body 1142 and the first magnetic body 1143 may be mounted in a first groove gr1 formed in the second member 1131*a* and a second groove gr2 formed in the first member 1126, respectively. In this embodiment, the first and second grooves gr1 and gr2 may have different positions from the first and second grooves described in another embodiment. However, the first groove gr1 is located in the second member 1131*a* and moves integrally with the holder, and the second groove gr2 is located in the first member 1126 to correspond to the first groove gr1 and is combined with the first housing 1120. Therefore, these terms will be used interchangeably.

Also, the tilting guide part 1141 may be disposed adjacent to the optical axis. Thus, the actuator according to an embodiment can easily change the optical path according to the tilt of the first and second axes, which will be described later.

The tilting guide part 1141 may include first protrusions spaced apart from each other in the first direction (X-axis direction) and second protrusions spaced apart from each other in the second direction (Y-axis direction). Also, the first protrusion and the second protrusion may protrude in opposite directions. A detailed description will be given later.

Also, as described above, the second magnetic body 1142 may be positioned within the second member 1131*a*. In addition, the first magnetic body 1143 may be positioned within the first member 1126.

The second magnetic body 1142 and the first magnetic body 1143 may have the same polarity. For example, the second magnetic body 1142 may be a magnet having the N pole, and the first magnetic body 1143 may be a magnet having the N pole. Alternatively, the second magnetic body 1142 may be a magnet having the S pole, and the first magnetic body 1143 may be a magnet having the S pole.

For example, a first pole surface of the first magnetic body 1143 and a second pole surface of the second magnetic body 1142 facing the first pole surface may have the same polarity.

The second magnetic body 1142 and the first magnetic body 1143 may generate a repulsive force between each other by the polarities described above. With this configuration, this repulsive force may be applied to the second member 1131*a* or holder 1131 combined with the second magnetic body 1142 and the first member 1126 or the first housing 1120 combined with the first magnetic body 1143. At this time, the repulsive force applied to the second member 1131*a* may be delivered to the holder 1131 combined with the second member 1131*a*. Therefore, the tilting guide part 1141 disposed between the second member 1131*a* and the first member 1126 may be pressed by the repulsive force. That is, the repulsive force may maintain the position of the tilting guide part 1141 between the holder 1131 and the first housing 1120 (or the first member 1126). With this configuration, the position between the mover 1130 and the first housing 1120 may be maintained even during X-axis tilt or Y-axis tilt. In addition, the tilting guide part may come into close contact with the first member 1126 and the holder 1131 by the repulsive force between the first magnetic body 1143 and the second magnetic body 1142.

The first driving unit 1150 includes the driving magnet 1151, the driving coil 1152, the Hall sensor unit 1153, the first substrate unit 1154, and the yoke unit 1155. Details on this will be described later.

Figure 6A:
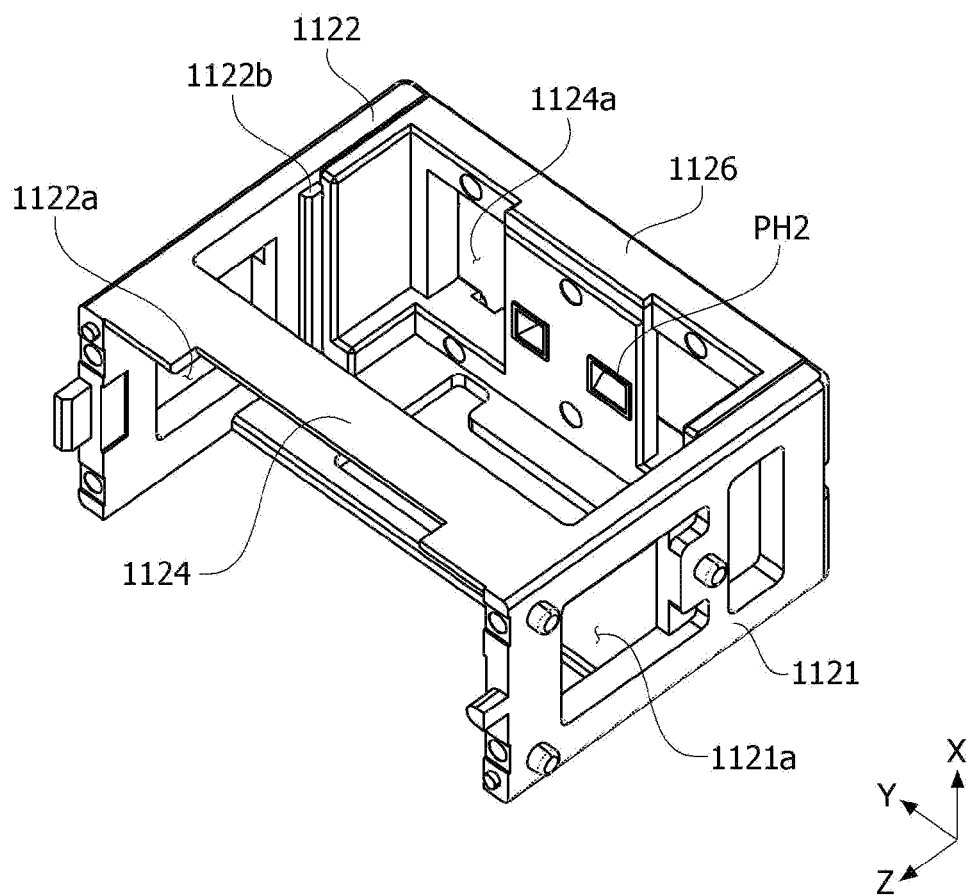
FIG. 6A is a perspective view of a first housing of a first camera actuator according to an embodiment.
Figure 6B:
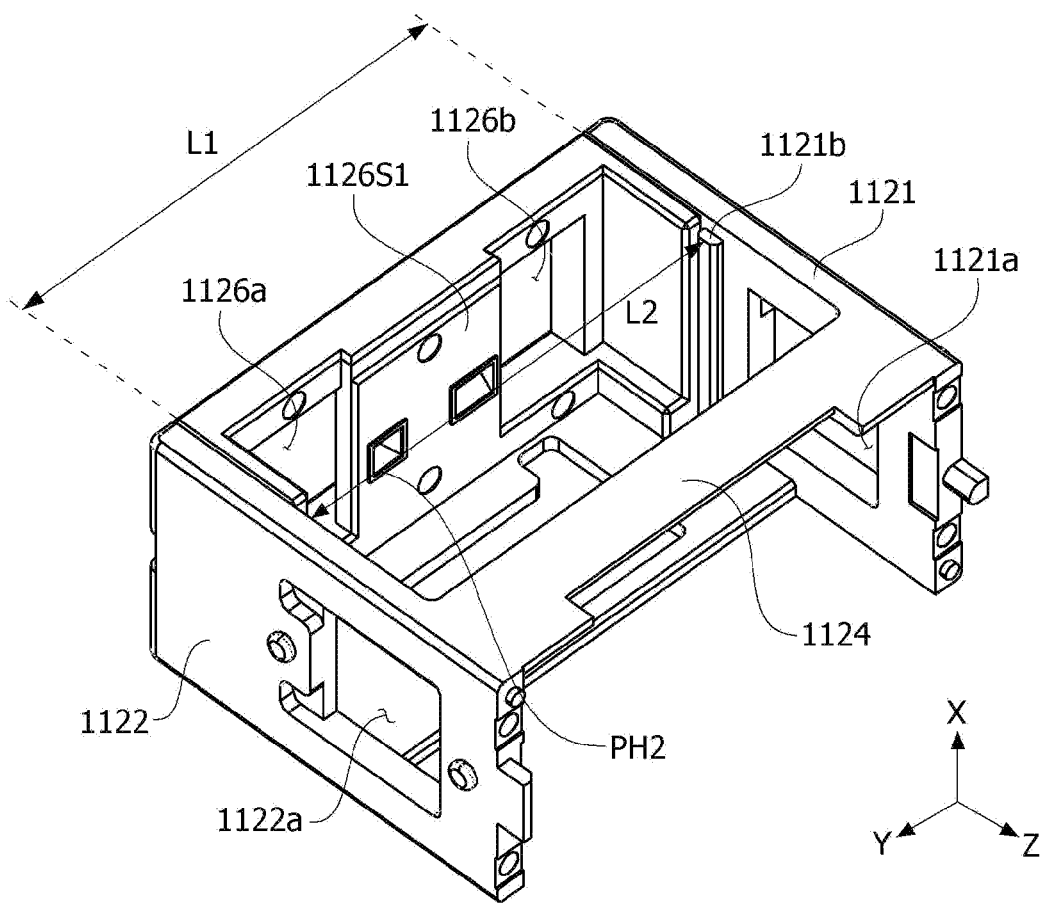
FIG. 6B is a perspective view in a direction different from FIG. 6A.
Figure 6C:
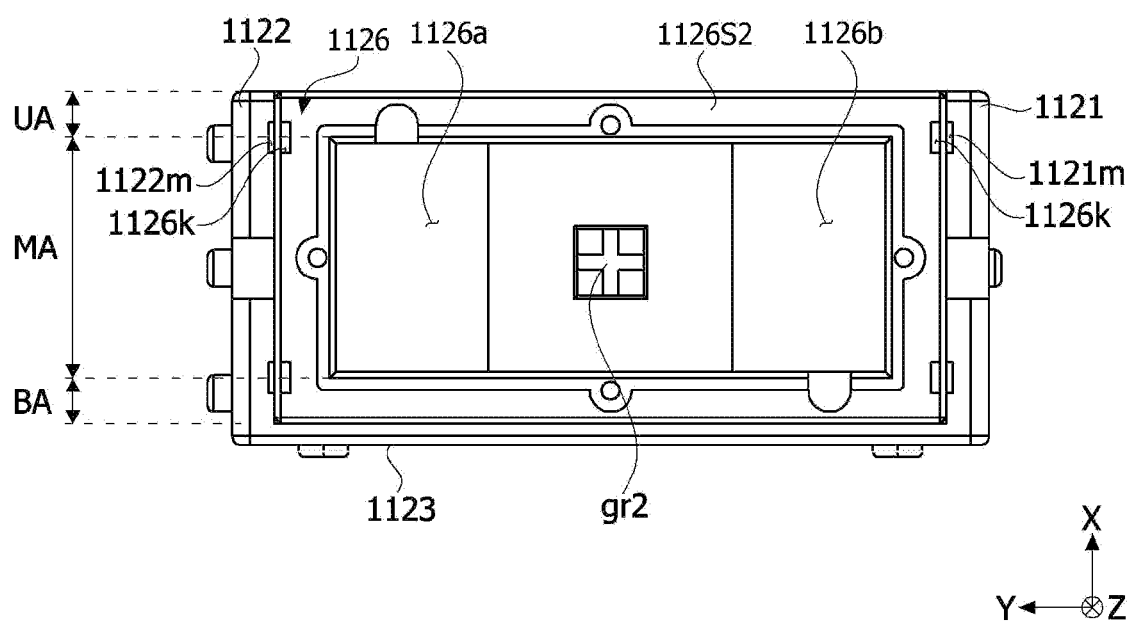
FIG. 6C is a front view of a first housing of a first camera actuator according to an embodiment.

FIG. 6A is a perspective view of a first housing of a first camera actuator according to an embodiment, FIG. 6B is a perspective view in a direction different from FIG. 6A, and FIG. 6C is a front view of a first housing of a first camera actuator according to an embodiment.

Referring to FIGS. 6A to 6C, the first housing 1120 according to an embodiment may include the first housing side 1121 to the fourth housing side 1124. Also, the first member 1126 may be integrally combined with the first housing 1120. Therefore, the first member 1126 may be a component included in the first housing 1120. That is, the first housing 1120 may be integrally combined with the first member 1126. Alternatively, the first housing 1120 may include the first member 1126.

The first housing side 1121 and the second housing side 1122 may be disposed to face each other. Also, the third housing side 1123 and the fourth housing side 1124 may be disposed to face each other.

The third housing side 1123 and the fourth housing side 1124 may be disposed between the first housing side 1121 and the second housing side 1122.

The third housing side 1123 and the fourth housing side 1124 may be in contact with the first housing side 1121 and the second housing side 1122. Also, the third housing side 1123 may be a lower surface of the first housing 1120. Also, the fourth housing side 1124 may be an upper surface of the first housing 1120. In addition, the description of the direction may also be applied in the same manner as described above.

The first housing side 1121 may have a first housing hole 1121a. A first coil to be described later may be positioned in the first housing hole 1121a.

Also, the second housing side 1122 may have a second housing hole 1122a. A second coil 1152b to be described later may be positioned in the second housing hole 1122a.

Also, the first housing side 1121 and the second housing side 1122 may be side surfaces of the first housing 1120.

The first coil and the second coil may be combined with the first substrate unit. In an embodiment, the first coil and the second coil may be electrically connected to the first substrate unit, so that current may flow. This current is a component of electromagnetic force capable of tilting the second camera actuator relative to the X-axis.

Also, the third housing side 1123 may have a third housing hole 1123a.

A third coil to be described later may be positioned in the third housing hole 1123a. In addition, the third coil 1152c may be electrically connected to and combined with the first substrate unit being in contact with the first housing 1120. Thus, the third coil electrically connected to the first substrate unit may receive current from the first substrate unit. This current is a component of electromagnetic force capable of tilting the second camera actuator relative to the Y-axis.

The first member 1126 may be placed between the first housing side 1121 to the fourth housing side 1124. Therefore, the first member 1126 may be positioned on the third housing side 1123. For example, the first member 1126 may be located on one side. Based on the third direction, the first member 1126 and the holder may be sequentially positioned.

The fourth housing side 1124 may be disposed between the first housing side 1121 and the second housing side 1122 and be in contact with the first housing side 1121, the second housing side 1122, and the third housing side 1123.

Also, the fourth housing side 1124 may have a fourth housing hole 1124a. The fourth housing hole 1124a may be located above the optical member. Therefore, light may pass through the fourth housing hole 1124a and be incident on the optical member.

Also, the first housing 1120 may have an accommodating space 1125 formed by the first housing side 1121 to the fourth housing side 1124. The first member 1126, the second member 1131a, and the mover 1130 may be positioned in the accommodating space 1125.

Also, the first housing 1120 may further include a fifth housing side facing the first member 1126. The fifth housing side may be disposed between the first housing side 1121 and the second housing side 1122 and be in contact with the first housing side 1121, the second housing side 1122, and the third housing side 1123. In addition, the fifth housing side may have an opening to provide a path through which light reflected from the optical member 1132 moves. In addition, the fifth housing side may include a protrusion or a groove to provide an easy combination with other camera actuators adjacent thereto. With this configuration, by not only providing the optical path, but also improving a combining force between the fifth housing side having the opening providing the optical path and other components, it is possible to suppress the movement of the opening due to separation, etc. and thereby minimize the change of the optical path.

Also, as described above, the first member 1126 may be combined with the first housing 1120 and included in the first housing 1120. That is, the first housing 1120 may include the first member 1126.

In addition, the first member 1126 may be disposed in the first housing 1120. Alternatively, the first member 1126 may be located within the first housing 1120.

In addition, the first member 1126 may be combined with the first housing 1120. In an embodiment, the first member 1126 may be positioned between the first housing side 1121 and the second housing side 1122. Also, the first member 1126 may be positioned between the third housing side 1123 and the fourth housing side 1124.

In addition, the first member 1126 may be positioned on the third housing side 1123 and be in contact with the first housing side 1121 to the third housing side 1123.

Also, a first stopper 1121b may be positioned on an inner surface of the first housing side 1121. In addition, a second stopper 1122b may be positioned on an inner surface of the second housing side 1122.

The first stopper 1121b and the second stopper 1122b may be positioned symmetrically with respect to the first direction (X-axis direction). The first stopper 1121b and the second stopper 1122b may extend in the first direction (X-axis direction). With this configuration, even when the first member 1126 moves into the first housing 1120, the position can be maintained by the first stopper 1121b and the second stopper 1122b. In other words, the first stopper 1121b and the second stopper 1122b may maintain the position of the first member 1126 on one side of the first housing 1120.

Furthermore, the first stopper 1121b and the second stopper 1122b may fix the position of the first member 1126, fix the position of the tilting guide part between the first member 1126 and the mover, and thereby eliminate errorcausing factors such as vibration. Thus, the first camera actuator according to an embodiment can accurately perform the X-axis tilt and Y-axis tilt.

In addition, a separation distance L2 between the first stopper 1121*b* and the second stopper 1122*b* in the second direction (Y-axis direction) may be smaller than the maximum length L1 of the first member 1126 in the second direction (Y-axis direction). Therefore, the first member 1126 may be assembled or inserted laterally into the first housing 1120 and combined with the first housing 1120.

In addition, the first member 1126 includes a second protrusion hole PH2 in which the second protrusion of the tilting guide part is placed. The second protrusion hole PH2 may be located on the inner surface 1126*s*1 of the first member 1126. Therefore, the first member 1126 allows the protrusion (e.g., the second protrusion) of the tilting guide part to be disposed adjacent to the prism in the fourth mounting groove, and allows the protrusion, which is a reference axis of tilt, to be disposed close to the center of gravity of the mover 1130. Thus, when the holder tilts, the moment for moving the mover 1130 for tilting can be minimized. Accordingly, because current consumption for driving the coil is minimized, power consumption of the camera actuator may be reduced.

Also, the first member 1126 may have through holes 1126*a* and 1126*b*. The through holes are plural and may be composed of a first through hole 1126*a* and a second through hole 1126*b*.

First and second extensions of the second member, which will be described later, may respectively pass through the first through hole 1126*a* and the second through hole 1126*b*. Through this, the second member and the first member may be combined. In other words, the first housing and the mover may be combined with each other.

The second protrusion hole PH2 may be positioned between the first through hole 1126*a* and the second through hole 1126*b*. With this configuration, a combining force between the tilting guide part 1141 and the first member 1126 is improved, so that a decrease in tilt accuracy caused by movement of the tilting guide part 1141 within the first housing can be inhibited.

Also, the second groove gr2 may be positioned on the outer surface 1126*s*2 of the first member 1126. A first magnetic body may be placed in the second groove gr2. Also, the outer surface 1126*s*2 of the first member 1126 may face the inner surface of the second member or member base. Furthermore, the second magnetic body placed on the second member and the first magnetic body of the first member 1126 may face each other and generate the aforementioned repulsive force. Therefore, because the first member 1126 presses the tilting guide part inward or the holder by the repulsive force, the mover may be spaced apart from the third housing side within the first housing by a predetermined distance even without current injection into the coil. Furthermore, the tilting guide part disposed between the holder and the housing (e.g., the first member) may be pressed by the holder and the housing. In other words, the combining force among the mover, the housing, and the tilting guide part may be maintained.

In addition, when the first member 1126 is integrally formed with the first housing 1120, the combining force between the first member 1126 and the first housing 1120 is improved, thereby improving the reliability of the camera actuator. In addition, when the first member 1126 and the first housing 1120 are separated, the ease of assembling and manufacturing may be improved.

In an embodiment, the first member 1126 may have the first through hole 1126*a* and the second through hole 1126*b* as described above. Also, the first through hole 1126*a* and the second through hole 1126*b* may be disposed side by side in the second direction (Y-axis direction) and overlap with each other.

The first member 1126 may include an upper member UA located above the first through hole 1126*a* and the second through hole 1126*b*, and a lower member BA located under the first through hole 1126*a* and the second through hole 1126*b*. Thus, the first through hole 1126*a* and the second through hole 1126*b* may be positioned in the middle of the first member 1126. That is, the first member 1126 may include a connecting member MA located at a side of the first and second through holes 1126*a* and 1126*b*. That is, the upper member UA and the lower member BA may be connected to each other through the connecting member MA. Further, the lower member BA may be plural to form the first and second through holes, and may be spaced apart from each other in the second direction (Y-axis direction).

Because the first member 1126 has the upper member UA, the rigidity can be improved. For example, compared to the case where the upper member UA is not present, the rigidity of the first member 1126 may increase. For example, in this embodiment, the unit of rigidity may be N/μm. Accordingly, the reliability of the first camera actuator according to an embodiment may be improved.

In addition, a first combining groove 1126*k* may be located on the outer surface 1126*s*2 of the first member 1126. The first combining groove 1126*k* may be located at an edge of the outer surface 1126*s*2 of the first member 1126. In particular, the first combining groove 1126*k* may be located at an end (e.g., left and right sides) of the outer surface 1126*s*2 of the first member 1126 and may be located adjacent to the first housing side 1121.

The first combining groove 1126*k* may be positioned to correspond to second combining grooves 1121*m* and 1122*m* of the first and second housing sides 1121 and 1122. In an embodiment, the first combining groove 1126*k* may be positioned to face the second combining grooves 1121*m* and 1122*m* of the first and second housing sides 1121 and 1122. The second combining grooves 1121*m* and 1122*m* may be positioned on a coplanar side surface adjacent to the outer surface 1126S2 of the first member 1126.

In an embodiment, the first combining groove 1126*k* and the second combining grooves 1121*m* and 1122*m* may be plural, and the plurality of first combining grooves 1126*k* and second combining grooves 1121*m* and 1122*m* may be symmetrically positioned in the first direction or the second direction.

In addition, a bonding member may be coated in the first combining groove 1126*k* and the second combining grooves 1121*m* and 1122*m*. That is, the bonding member may be coated between the first housing side (or the second housing side) and the first member 1126 to improve the combining force between the housing 1120 and the first member 1126. The bonding member may include, but is not limited to, a material such as epoxy.

Also, the first member 1126 may further include a first protrusion and a second protrusion. The first protrusion may be in contact with the first housing side, and the second protrusion may be in contact with the second housing side. The first protrusion may extend in the third direction (Z-axis direction) from one end of the outer surface 1126S2 of the first member. The second protrusion may extend in the third direction (Z-axis direction) from the other end of the outer surface 1126S2 of the first member. That is, the first protrusion and the second protrusion may extend toward the holder.

The position of the first protrusion may be maintained by the first stopper 1121b, and the position of the second protrusion may be maintained by the second stopper 1122b. Accordingly, the reliability of the camera actuator according to an embodiment may be improved.

Figure 7:
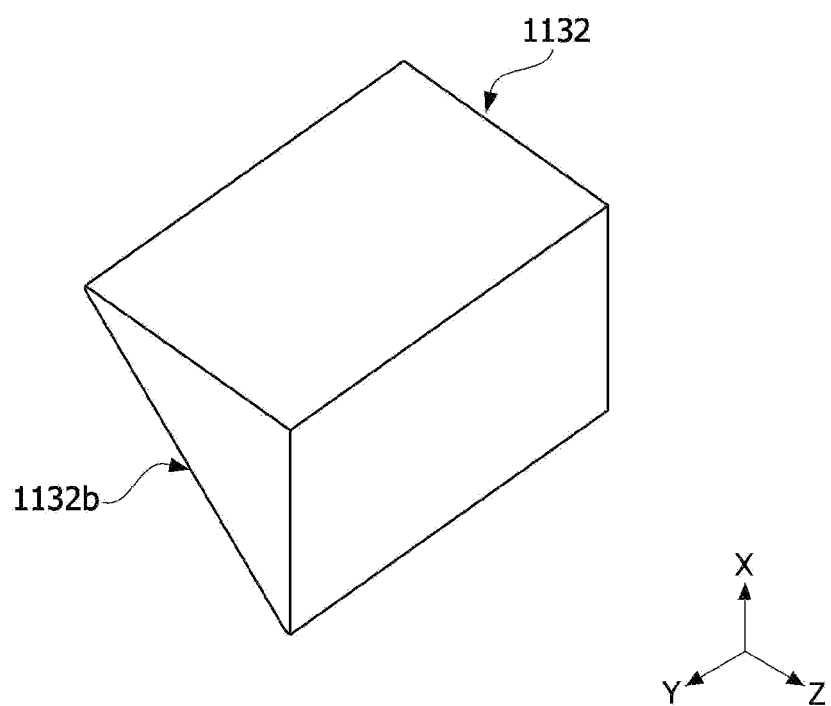
FIG. 7 is a perspective view of an optical member of a first camera actuator according to an embodiment.

FIG. 7 is a perspective view of an optical member of a first camera actuator according to an embodiment.

The optical member 1132 may be placed on the holder. The optical member 1132 may be, but is not limited to, a right angle prism as a reflector.

In an embodiment, the optical member 1132 may have a protrusion (not shown) on a part of its outer surface. The optical member 1132 may be easily combined with the holder through the protrusion (not shown). Also, the holder may have a groove or a protrusion to be combined with the optical member 1132.

Also, a bottom surface 1132b of the optical member 1132 may be placed on the mounting surface of the holder. Thus, the bottom surface 1132b of the optical member 1132 may correspond to the mounting surface of the holder. In an embodiment, the bottom surface 1132b may be formed of an inclined surface to correspond to the mounting surface of the holder. Therefore, when the holder moves, the prism can move, and the separation of the optical member 1132 from the holder due to the movement can be inhibited.

Also, the bottom surface 1132b of the optical member 1132 may have a groove formed thereon and coated with a bonding member, so that the optical member 1132 can be combined with the holder. Alternatively, a bonding member may be coated in a groove or protrusion of the holder, so that the holder may be combined with the optical member 1132.

Also, as described above, the optical member 1132 may have a structure capable of reflecting light reflected from the outside (e.g., an object) into the camera module. As in the embodiment, the optical member 1132 may be formed of a single mirror. Also, the optical member 1132 may change a path of reflected light, thereby improving a spatial limitation of the first and second camera actuators. Accordingly, the camera module may provide a high range of magnifications by extending the optical path while minimizing thickness. In addition, the camera module including the camera actuator according to an embodiment may provide a high range of magnification by extending the optical path while minimizing the thickness.

Figure 8A:
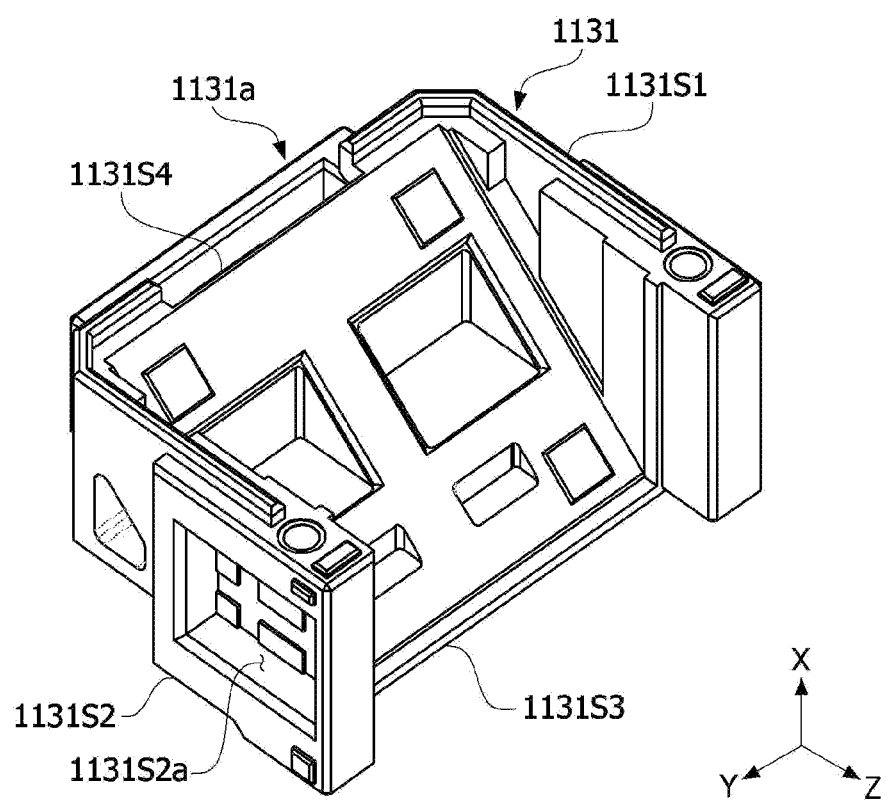
FIG. 8A is a perspective view of a holder of a first camera actuator according to an embodiment.
Figure 8B:
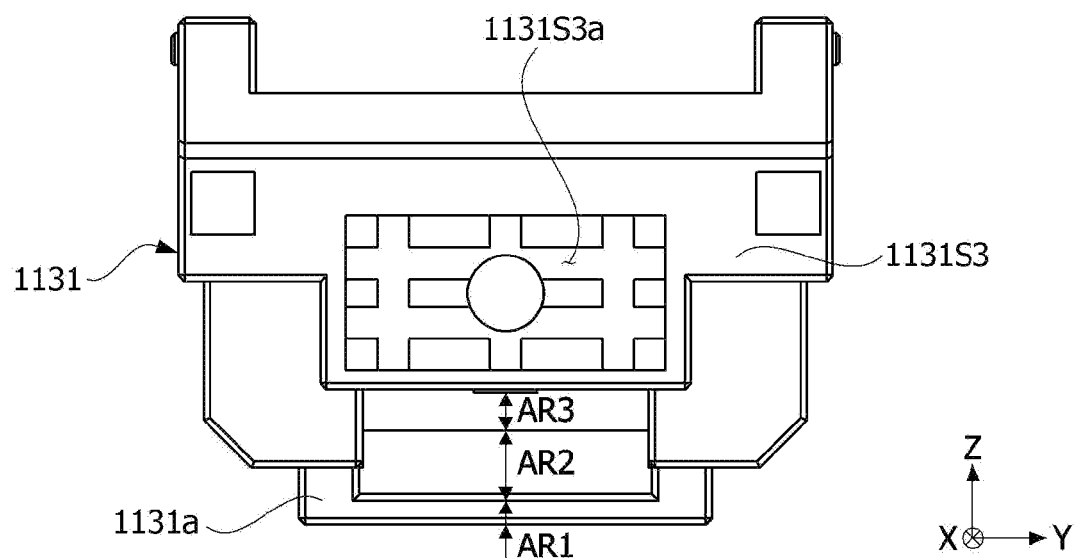
FIG. 8B is a bottom view of a holder of a first camera actuator according to an embodiment.
Figure 8C:
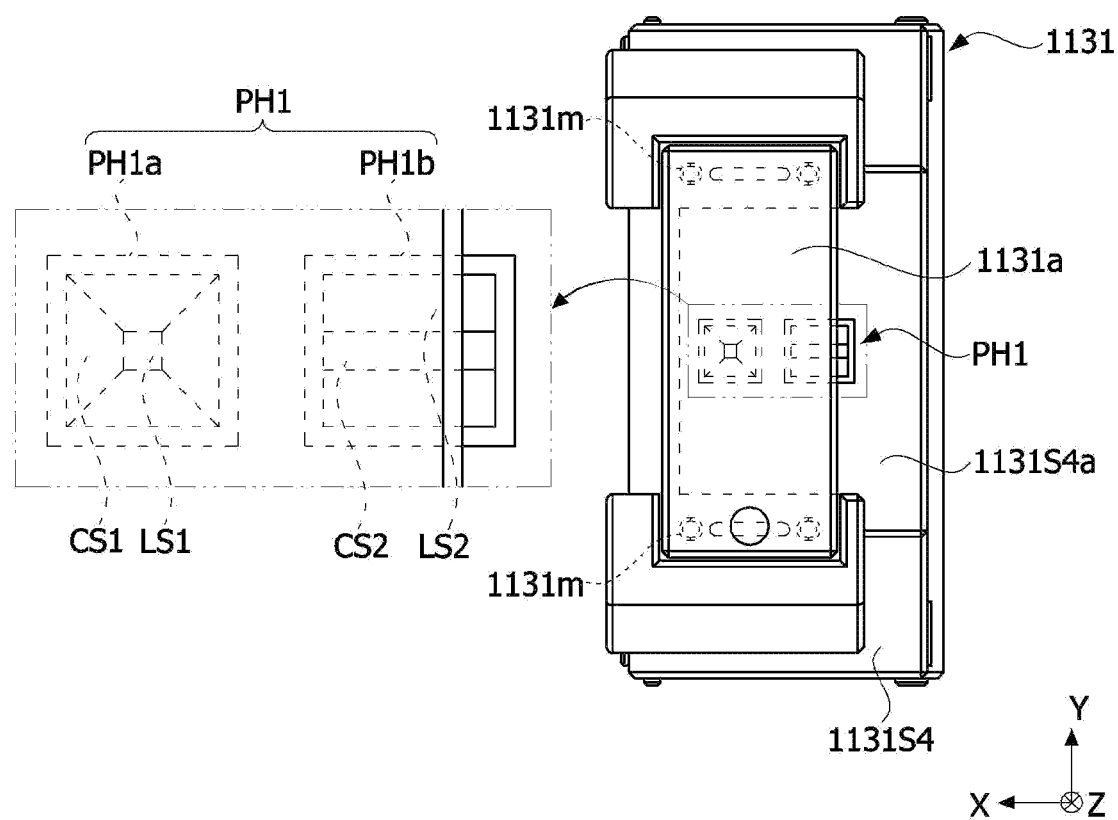
FIG. 8C is a front view of a holder of a first camera actuator according to an embodiment.
Figure 8D:
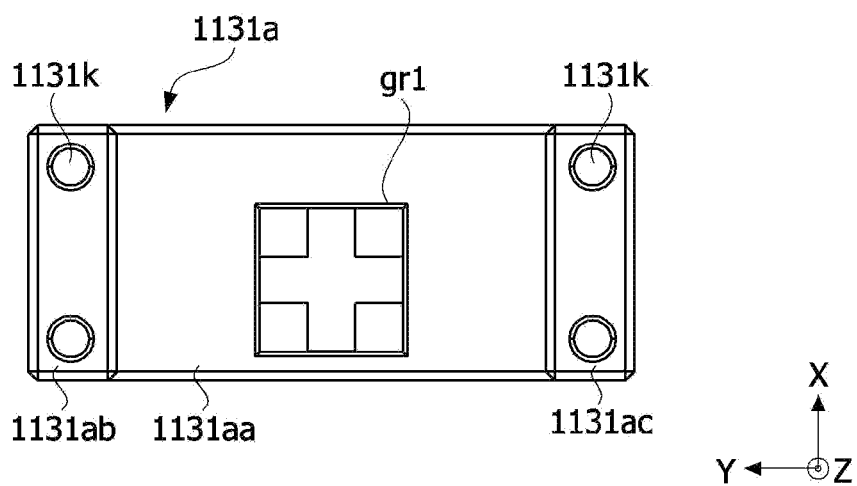
FIG. 8D is a rear view of a second member of a first camera actuator according to an embodiment.
Figure 8E:
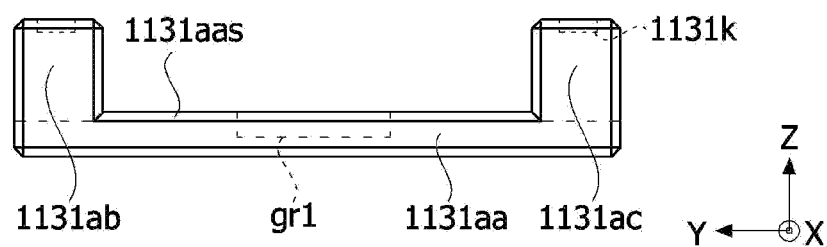
FIG. 8E is a bottom view of a second member of a first camera actuator according to an embodiment.

FIG. 8A is a perspective view of a holder of a first camera actuator according to an embodiment, FIG. 8B is a bottom view of a holder of a first camera actuator according to an embodiment, FIG. 8C is a front view of a holder of a first camera actuator according to an embodiment, FIG. 8D is a rear view of a second member of a first camera actuator according to an embodiment, and FIG. 8E is a bottom view of a second member of a first camera actuator according to an embodiment.

Referring to FIGS. 8A to 8E, the holder 1131 may include a mounting surface 1131k on which the optical member 1132 is placed. The mounting surface 1131k may be an inclined surface. In addition, the holder 1131 may include a jaw portion on the mounting surface 1131k. Also, the jaw portion of the holder 1131 may be combined with a protrusion (not shown) of the optical member 1132.

The holder 1131 may have a plurality of outer surfaces. For example, the holder 1131 may have a first holder outer surface 1131S1, a second holder outer surface 1131S2, a third holder outer surface 1131S3, and a fourth holder outer surface 1131S4.

The first holder outer surface 1131S1 may be positioned to face the second holder outer surface 1131S2. That is, the first holder outer surface 1131S1 and the second holder outer surface 1131S2 may be disposed symmetrically with respect to the first direction (X-axis direction).

The first holder outer surface 1131S1 may be positioned to correspond to the first housing side. That is, the first holder outer surface 1131S1 may face the first housing side. Also, the second holder outer surface 1131S2 may be positioned to correspond to the second housing side. That is, the second holder outer surface 1131S2 may be positioned to face the second housing side.

Also, the first holder outer surface 1131S1 may have a first mounting recess 1131S1a. Also, the second holder outer surface 1131S2 may have a second mounting recess 1131S2a. The first mounting recess 1131S1a and the second mounting recess 1131S2a may be disposed symmetrically with respect to the first direction (X-axis direction).

Also, the first mounting recess 1131S1a and the second mounting recess 1131S2a may be disposed to overlap with each other in the second direction (Y-axis direction). In addition, the first magnet 1151a may be disposed in the first mounting recess 1131S1a, and the second magnet 1151b may be disposed in the second mounting recess 1131S2a. The first magnet 1151a and the second magnet 1151b may also be disposed symmetrically with respect to the first direction (X-axis direction). In this specification, the first to third magnets may be combined with the housing through a yoke or a bonding member.

As described above, because of the positions of the first and second mounting recesses and the first and second magnets, the electromagnetic force induced by each magnet is provided to the first holder outer surface S1231S1 and the second holder outer surface 1131S2 on the same axis. For example, a region (e.g., a portion where the electromagnetic force is strongest) applied on the first holder outer surface S1231S1 and a region (e.g., a portion where the electromagnetic force is strongest) applied on the second holder outer surface S1231S1 may be located on an axis parallel to the second direction (Y-axis direction). Thus, X-axis tilting can be accurately performed.

The first magnet 1151a may be disposed in the first mounting recess 1131S1a, and the second magnet 1151b may be disposed in the second mounting recess 1131S2a.

The third holder outer surface 1131S3 may be an outer surface being in contact with the first holder outer surface 1131S1 and the second holder outer surface 1131S2 and extending from the first holder outer surface 1131S1 and the second holder outer surface 1131S2 in the second direction (Y-axis direction). Also, the third holder outer surface 1131S3 may be positioned between the first holder outer surface 1131S1 and the second holder outer surface 1131S2. The third holder outer surface 1131S3 may be a lower surface of the holder 1131. That is, the third holder outer surface 1131S3 may be located to face the third housing side.

Also, the third holder outer surface 1131S3 may have a third mounting recess 1131S3a. A third magnet 1151c may be disposed in the third mounting recess 1131S3a. The third holder outer surface 1131S3 may be positioned to face the third housing side 1123.

Also, the third housing hole 1123a may at least partially overlap with the third mounting recess 1131S3a in the first direction (X-axis direction). Therefore, the third magnet 1151c in the third mounting recess 1131S3a and the third coil 1152c in the third housing hole 1123a may face each other. In addition, the third magnet 1151c and the third coil 1152c generate electromagnetic force, so that the second camera actuator can perform the Y-axis tilting.

Also, while the X-axis tilt is achieved by a plurality of magnets (first and second magnets 1151a and 1151b), the Y-axis tilt can be achieved only by the third magnet 1151c.

In an embodiment, the third mounting recess 1131S3a may have a greater area than the first mounting recess 1131S1a or the second mounting recess 1131S2a. With this configuration, the Y-axis tilt can be performed with current control similar to that of the X-axis tilt.

The fourth holder outer surface 1131S4 may be an outer surface being in contact with the first holder outer surface 1131S1 and the second holder outer surface 1131S2 and extending from the first holder outer surface 1131S1 and the second holder outer surface 1131S2 in the first direction (X-axis direction). Also, the fourth holder outer surface 1131S4 may be positioned between the first holder outer surface 1131S1 and the second holder outer surface 1131S2. That is, the fourth holder outer surface 1131S4 may face the first member.

The fourth holder outer surface 1131S4 may have the fourth mounting recess 1131S4a. The tilting guide part 1141 may be positioned in the fourth mounting recess 1131S4a. In addition, the second member 1131a and the first member 1126 may be positioned in the fourth mounting recess 1131S4a. Also, the fourth mounting recess 1131S4a may have a plurality of areas such as a first area AR1, a second area AR2, and a third area AR3.

The second member 1131a may be positioned in the first area AR. That is, the first area AR1 may overlap with the second member 1131a in the first direction (X-axis direction). In particular, the first area AR1 may be an area where a member base of the second member 1131a is located. In this case, the first area AR1 may be located on the fourth holder outer surface 1131S4. That is, the first area AR1 may correspond to an area located above the fourth mounting recess 1131S4a. In this case, the first area AR1 may not be an area within the fourth mounting recess 1131S4a.

The first member 1126 may be located in the second area AR2. That is, the second area AR2 may overlap with the first member 1126 in the first direction (X-axis direction).

Also, like the first area, the second area AR2 may be positioned on the fourth holder outer surface 1131S4. That is, the second area AR2 may correspond to an area located above the fourth mounting recess 1131S4a.

The tilting guide part may be located in the third area AR3. In particular, a base of the tilting guide part may be located in the third area AR3. That is, the third area AR3 may overlap with the tilting guide part (e.g., the base) in the first direction (X-axis direction).

Also, the second area AR2 may be located between the first area AR1 and the third area AR3.

In addition, the second member may be disposed in the first area AR1, and the second member 1131a may have a first groove gr1. In an embodiment, the second member 1131a may have the first groove gr1 formed on the inner surface 1131aas. Also, the second magnetic material may be disposed in the first groove gr1 as described above.

As described above, the first member may be disposed in the second area AR2. The first groove gr1 may be located to face the second groove gr2. For example, the first groove gr1 may at least partially overlap with the second groove gr2 in the third direction (Z-axis direction).

Also, the repulsive force generated by the second magnetic body may be transferred to the fourth mounting recess 1131S4a of the holder 1131 through the second member. Therefore, the holder may apply force to the tilting guide part in the same direction as the repulsive force generated by the second magnetic body.

The first member may have a second groove gr2 facing the first groove gr1 formed on the outer surface. Also, the first member may have the second protrusion hole formed on the inner surface as described above. In addition, the second protrusion may be placed in the second protrusion hole.

Also, as in the second magnetic body, the repulsive force generated by the first magnetic body and the second magnetic body may be applied to the first member. Thus, the first member and the second member may press the tilting guide part disposed between the first member and the holder 1131 through the repulsive force.

The tilting guide part 1141 may be disposed in the third area AR3.

Also, the first protrusion hole PH1 may be located in the fourth mounting recess 1131S4a. In addition, the first protrusion of the tilting guide part 1141 may be accommodated in the first protrusion hole PH1. Therefore, the first protrusion PR1 may be in contact with the first protrusion hole. The maximum diameter of the first protrusion hole PH1 may correspond to the maximum diameter of the first protrusion PR1. This may be equally applied to the second protrusion hole and the second protrusion PR2. That is, the maximum diameter of the second protrusion hole may correspond to the maximum diameter of the second protrusion PR2. Therefore, the second protrusion may be in contact with the second protrusion hole. With this configuration, the first axis tilt based on the first protrusion and the second axis tilt based on the second protrusion can easily occur, and the tilt radius can be improved.

Also, in an embodiment, the number of first protrusion holes PH1 may be plural. For example, one of the first protrusion hole PH1 and the second protrusion hole PH2 may include a first-first protrusion hole PH1a and a first-second protrusion hole PH1b. Hereinafter, it will be described that the first protrusion hole PH1 includes the first-first protrusion hole PH1a and the first-second protrusion hole PH1b. Also, the following description may be equally applied to the second protrusion hole PH2. For example, the second protrusion hole PH2 may include a second-first protrusion hole and a second-second protrusion hole, and the descriptions about the first-first protrusion hole and the first-second protrusion may be applied to the second-first protrusion hole and the second-second protrusion hole, respectively.

The first-first protrusion hole PH1a and the first-second protrusion hole PH1b may be arranged side by side in the first direction (x-axis direction). The first-first protrusion hole PH1a and the first-second protrusion hole PH1b may have the same maximum width.

The plurality of first protrusion holes PH1 may have different number of inclined surfaces. For example, the first protrusion hole PH1 may have a hole bottom surface and an inclined surface. In this case, the plurality of protrusion holes may have different numbers of inclined surfaces. In addition, the protrusion holes may also have different areas of the bottom surface.

For example, the first-first protrusion hole PH1a may have a first hole bottom surface LS1 and a first inclined surface CS1. The first-second protrusion hole PH1b may have a second hole bottom surface LS2 and a second inclined surface CS2.

In this case, the first hole bottom surface LS1 and the second hole bottom surface LS2 may have different areas. The area of the first hole bottom surface LS1 may be smaller than the area of the second hole bottom surface LS2.

Also, the number of first inclined surfaces CS1 contacting the first hole bottom surface LS1 may be different from the number of second inclined surfaces CS2. For example, the number of first inclined surfaces CS1 may be greater than the number of second inclined surfaces CS2.

With this configuration, it is possible to easily compensate for the assembly tolerance of the first protrusion placed in the first protrusion hole PH1. For example, because the number of first inclined surfaces CS1 is greater than the number of second inclined surfaces CS2, the first protrusion comes into contact with more inclined surfaces, so that the position of the first protrusion can be more accurately maintained in the first-first protrusion hole PH1a.

Contrary to this, in the first-second protrusion hole PH1b, the number of inclined surfaces in contact with the first protrusion is smaller than that of the first-first protrusion hole PH1b, so that the position of the first protrusion can be easily adjusted.

In an embodiment, the second inclined surfaces CS2 may be spaced apart from each other in the second direction (Y-axis direction). Further, the second hole bottom surface LS2 extends in the first direction (X-axis direction), so that the first protrusion can easily move in the first direction (X-axis direction) in a state of being in contact with the second inclined surface CS2. That is, the position of the first protrusion can be easily adjusted in the first-second protrusion hole PH1b. Also, the ease of assembly due to tolerances can be improved.

Also, in this embodiment, the first area AR1, the second area AR2, and the third area AR3 may have different heights in the first direction (X-axis direction). In an embodiment, the first area AR1 may have a height greater than the second area AR2 and the third area AR3 in the first direction (X-axis direction). Thus, a step may be located between the first area AR1 and the second area AR2.

Also, the second member 1131a may have the first groove gr1. In other words, the first groove gr1 may be located on the inner surface of the member base 1131aa. In addition, the above-described second magnetic body may be placed in the first groove gr1. Also, the first groove gr1 may be plural depending on to the number of second magnetic bodies. That is, the number of first grooves gr1 may correspond to the number of second magnetic bodies.

Also, the second member 1131a may include the member base 1131aa, a first extension 1131ab, and a second extension 1131ac.

The member base 1131aa may be positioned at the outermost of the first camera actuator. The member base 1131aa may be located outside the first member. That is, the first member may be positioned between the member base 1131aa and the tilting guide part.

The first extension 1131ab may extend from the edge of the member base 1131aa in the third direction (Z-axis direction). That is, the first extension 1131ab may extend toward the holder 1131 from the member base 1131aa. This is the same for the second extension 1131ac. In addition, the second extension 1131ac may extend in the third direction (Z-axis direction) from the edge of the member base 1131aa. In an embodiment, the first extension 1131ab and the second extension 1131ac may be located at the edges of the member base 1131aa in the second direction (Y-axis direction). Also, the first extension 1131ab and the second extension 1131ac may be disposed between an upper member and a lower member.

Accordingly, the second member 1131a may have a groove formed by the first extension 1131ab and the second extension 1131ac. That is, the groove may be located between the first extension 1131ab and the second extension 1131ac. Thus, the first extension 1131ab and the second extension 1131ac may be connected to each other only by the member base 1131aa. With this configuration, the second member 1131a can continuously receive the repulsive force by the second magnetic body placed in the center of the member base 1131aa, especially, in the first groove gr1.

In addition, the second member 1131a is combined with the holder and moves during X-axis tilt and Y-axis tilt, so the rigidity of the second member 1131a may be greater than that of the first member.

Furthermore, as described above, the first member according to an embodiment has the upper member and the lower member, so that the rigidity can be increased. With this configuration, a difference in rigidity between the second member and the first member can be reduced. Therefore, when the second member 1131a and the holder 1131 combined with the second member 1131a are tilted together along the X-axis or the Y-axis, the second member 1131a may have a small adjacent distance to the first member and come into contact with the first member. Thus, the first member has improved rigidity as described above, and can easily perform the operation as a stopper. That is, the reliability of the camera actuator can be improved.

Further, a rigidity difference between the first member and the second member is reduced, and damage due to contact during tilting may be minimized. That is, the reliability of the camera actuator may be improved.

Also, the first extension 1131ab may be spaced apart from the second extension 1131ac in the second direction (Y-axis direction) to form a separation space. The first member and the tilting guide part may be placed in this separation space. Also, the second magnetic body and the first magnetic body may be located in the separation space.

Also, the first extension 1131ab and the second extension 1131ac may have the same length in the third direction (Z-axis direction). Thus, the combining force and the weight are formed in balance, so that the tilt of the holder can be accurately performed.

In addition, the first extension 1131ab and the second extension 1131ac may be combined with the holder. In this specification, a bonding member other than the above-described protrusion and groove structure may used for combining. In an embodiment, the first extension 1131ab and the second extension 1131ac may have a third combining groove 1131k formed in the third direction (Z-axis direction). Also, in the fourth mounting recess 1131S4a, a combining protrusion 1131m may be positioned in an area overlapping with the first and second extensions 1131ab and 1131ac in the third direction (Z-axis direction). The combining protrusion 1131m may be positioned to correspond to the third combining groove 1131k.

For example, a bonding member such as epoxy may be coated in the third combining groove 1131k. Also, the combining protrusion 1131m may be inserted into the third combining groove 1131k of the first and second extensions 1131ab and 1131ac. With this configuration, the second member 1131a and the holder 1131 may be combined with each other. In addition, the repulsive force applied to the second member 1131a may be transmitted to the holder 1130 through this combination.

However, as described above, the positions of the protrusion and groove structures may be interchanged.

Figure 9A:
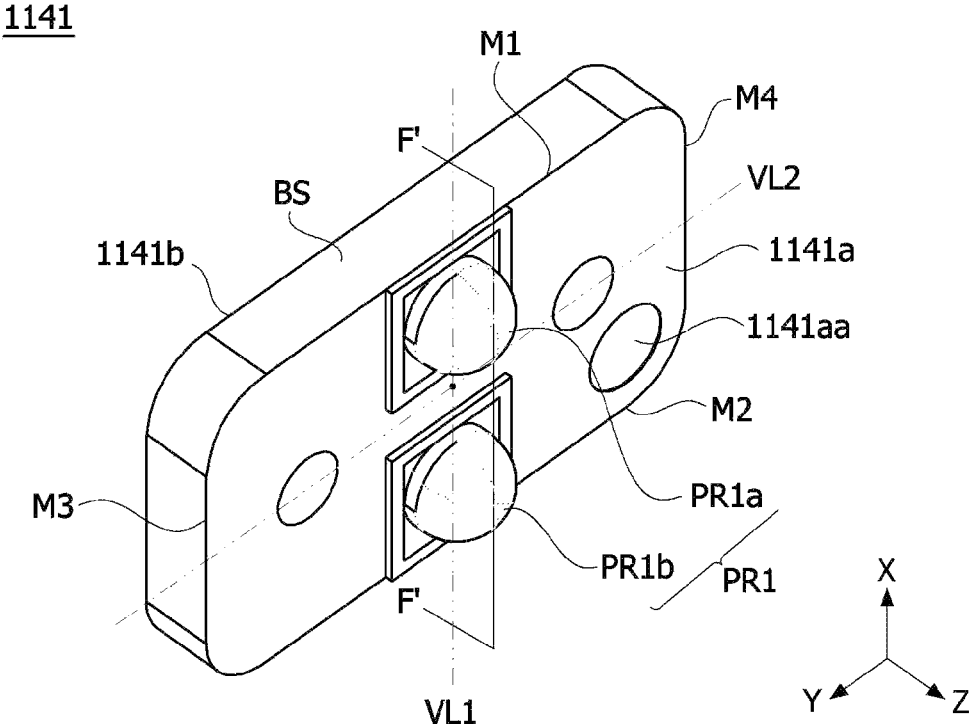
FIG. 9A is a perspective view of a tilting guide part of a first camera actuator according to an embodiment.
Figure 9B:
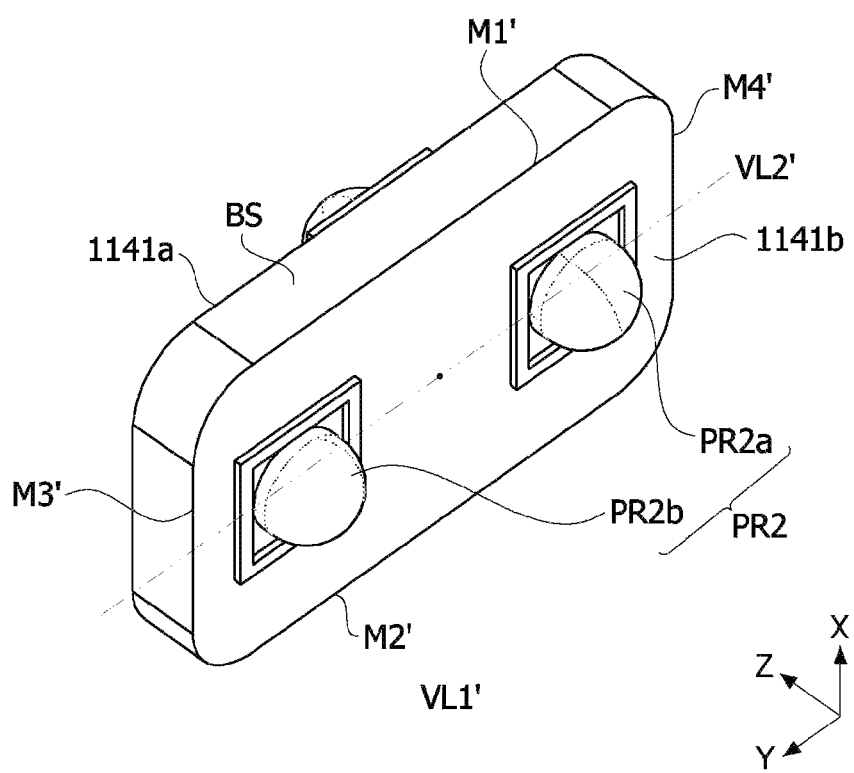
FIG. 9B is a perspective view in a direction different from FIG. 9A.
Figure 9C:
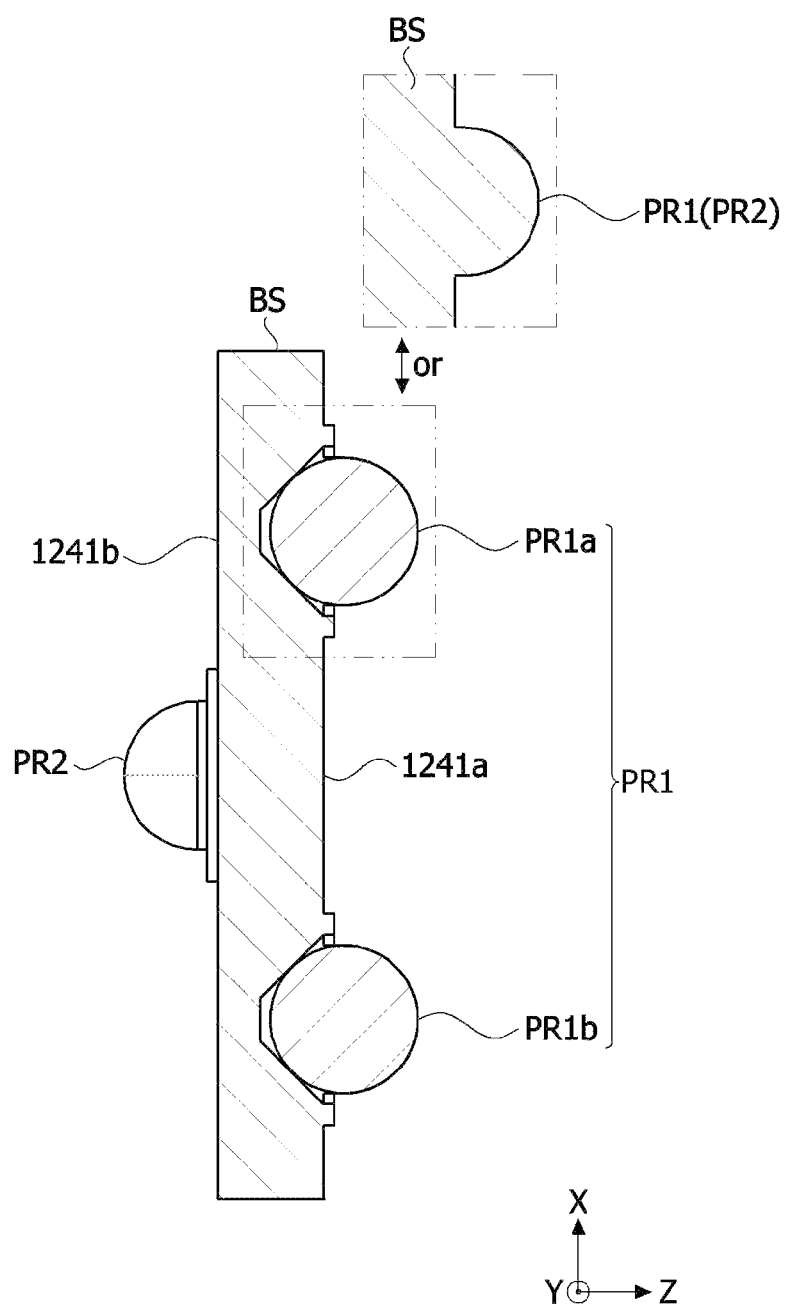
FIG. 9C is a cross-sectional view taken along line FF' in FIG. 9A.

FIG. 9A is a perspective view of a tilting guide part of a first camera actuator according to an embodiment, FIG. 9B is a perspective view in a direction different from FIG. 9A, and FIG. 9C is a cross-sectional view taken along line FF in FIG. 9A.

The tilting guide part 1141 according to an embodiment may include a base BS, a first protrusion PR1 protruding from a first surface 1141a of the base BS, and a second protrusion PR2 protruding from a second surface 1141b of the base BS. In addition, depending on the structure, the first protrusion and the second protrusion may be formed on the opposite surfaces, but they will be described hereinafter with reference to the drawings. Also, the first protrusion PR1 and the second protrusion PR2 may be integrally formed with the base BS, and as shown in the drawing, the first protrusion PR1 and the second protrusion RP2 may have a spherical shape like a ball.

The base BS may have a first surface 1141a and a second surface 1141b opposite to the first surface 1141a. That is, the first surface 1141a and the second surface 1141b may be spaced apart from each other in the third direction (Z-axis direction), and may be outer surfaces facing each other in the tilting guide part 1141.

The tilting guide part 1141 may include the first protrusion PR1 extending to one direction on the first surface 1141a. According to an embodiment, the first protrusion PR1 may protrude toward the holder from the first surface 1141a. The first protrusion PR1 may be plural and include a first-first protrusion PR1a and a first-second protrusion PR1b.

The first-first protrusion PR1a and the first-second protrusion PR1b may be positioned side by side in the first direction (X-axis direction). In other words, the first-first protrusion PR1a and the first-second protrusion PR1b may overlap in the first direction (X-axis direction). Also, in an embodiment, the first-first protrusion PR1a and the first-second protrusion PR1b may be bisected by an imaginary line extending in the first direction (X-axis direction).

In addition, the first-first protrusion PR1a and the first-second protrusion PR1b may have curvatures and may have, for example, a hemispherical shape. Also, the first-first protrusion PR1a and the first-second protrusion PR1b may be in contact with a first groove of the housing at the most distant point from the first surface 1141a of the base BS.

In addition, an alignment hole 1141aa may be located on the first surface 1141a. The alignment hole 1141aa may be disposed on one side of the first surface 1141a to provide an assembly position or assembly direction of the tilting guide part 1141 during an assembly process.

In addition, the tilting guide part 1141 may include the second protrusion PR2 extending to one direction on the second surface 1141a. According to an embodiment, the second protrusion PR2 may protrude toward the housing from the second surface 1141b. Also, the second protrusion PR2 may be plural and include a second-first protrusion PR2a and a second-second protrusion PR2b in an embodiment.

The second-first protrusion PR2a and the second-second protrusion PR2b may be positioned side by side in the second direction (Y-axis direction). That is, the second-first protrusion PR2a and the second-second protrusion PR2b may overlap in the second direction (Y-axis direction). Also, in an embodiment, the second-first protrusion PR2a and the second-second protrusion PR2b may be bisected by an imaginary line extending in the second direction (Y-axis direction).

The second-first protrusion PR2a and the second-second protrusion PR2b may have curvatures and may have, for example, a hemispherical shape. Also, the second-first protrusion PR2a and the second-second protrusion PR2b may be in contact with the second member 1131a at a point spaced apart from the second surface 1141b of the base BS.

The first-first protrusion PR1a and the first-second protrusion PR1b may be located in a region between the second-first protrusion PR2a and the second-second protrusion PR2b in the second direction. According to an embodiment, the first-first protrusion PR1a and the first-second protrusion PR1b may be located at the center of a separation space between the second-first protrusion PR2a and the second-second protrusion PR2b in the second direction. With this configuration, the actuator according to an embodiment can have an X-axis tilt angle in the same range with respect to the X-axis. In other words, based on the first-first protrusion PR1a and the first-second protrusion PR1b, the tilting guide part 1141 may provide the same X-axis tiltable range (e.g., positive/negative range) of the holder with respect to the X-axis.

In addition, the second-first protrusion PR2a and the second-second protrusion PR2b may be located in a region between the first-first protrusion PR1a and the first-second protrusion PR1b in the first direction. According to an embodiment, the second-first protrusion PR2a and the second-second protrusion PR2b may be located at the center of a separation space between the first-first protrusion PR1a and the first-second protrusion PR1b in the first direction. With this configuration, the actuator according to an embodiment can have a Y-axis tilt angle in the same range with respect to the Y-axis. In other words, based on the second-first protrusion PR2a and the second-second protrusion PR2b, the tilting guide part 1141 and the holder may provide the same Y-axis tiltable range (e.g., positive/negative range) with respect to the Y-axis.

Specifically, the first surface 1141a may have a first outer line M1, a second outer line M2, a third outer line M3, and a fourth outer line M4. The first outer line M1 and the second outer line M2 may face each other, and the third outer line M3 and the fourth outer line M4 may face each other. Also, the third outer line M3 and the fourth outer line M4 may be positioned between the first outer line M1 and the second outer line M2. Further, the first outer line M1 and the second outer line M2 may be perpendicular to the first direction (X-axis direction), and the third outer line M3 and the fourth outer line M4 may be parallel to the first direction (X-axis direction).

In this case, the first protrusion PR1 may be positioned on a first imaginary line VL1. Here, the first imaginary line LV1 is a line that bisects the first outer line M1 and the second outer line M2. Alternatively, the first and third imaginary lines LV1 and LV1' are lines that bisect the base BS in the second direction (Y-axis direction). Thus, the tilting guide part 1141 can easily perform the X-axis tilt through the first protrusion PR1. In addition, because the tilting guide part 1141 performs the X-axis tilt based on the first imaginary line VL1, a rotational force can be uniformly applied to the tilting guide part 1141. Therefore, the X-axis tilt can be precisely performed and the reliability of the device can be improved.

In addition, the first-first protrusion PR1a and the first-second protrusion PR1b may be symmetrically disposed with respect to the first imaginary line VL1 and the second imaginary line VL2. Alternatively, the first-first protrusion PR1a and the first-second protrusion PR1b may be symmetrically positioned with respect to a first center point C. With this configuration, upon the X-axis tilting, a supporting force by the first protrusion PR1 may be equally applied to the upper and lower sides based on the second imaginary line VL2. Thus, the reliability of the tilting guide part may be improved. Here, the second imaginary line VL2 is a line that bisects the third outer line M3 and the fourth outer line M4. Alternatively, the second and fourth imaginary lines LV2 and LV2' are lines that bisect the base BS in the first direction (X-axis direction).

Also, the first center point C1 may be an intersection of the first virtual line VL1 and the second virtual line VL2. Alternatively, it may be a point corresponding to the center of gravity depending on the shape of the tilting guide part 1141.

In addition, the second surface 1141b may have a fifth outer line M1', a sixth outer line M2', a seventh outer line M3', and an eighth outer line M4'. The fifth outer line M1' and the sixth outer line M2' may face each other, and the seventh outer line M3' and the eighth outer line M4' may face each other. Also, the seventh outer line M3' and the eighth outer line M4' may be positioned between the fifth outer line M1' and the sixth outer line M2'. The fifth outer line M1' and the sixth outer line M2' may be perpendicular to the first direction (X-axis direction), and the seventh outer line M3' and the eighth outer line M4' may be parallel to the first direction (X-axis direction).

In addition, because the tilting guide part 1141 performs the Y-axis tilt based on the fourth imaginary line VL2', a rotational force can be applied uniformly to the tilting guide part 1141. Thus, the Y-axis tilt can be made precisely and the reliability of the device can be improved.

Also, the second-first protrusion PR2a and the second-second protrusion PR2b may be symmetrically disposed with respect to the third imaginary line VL1' on the fourth imaginary line VL2'. Alternatively, the second-first protrusion PR2a and the second-second protrusion PR2b may be symmetrically positioned with respect to a second central point C1'. With this configuration, upon the Y-axis tilting, a supporting force by the second protrusion PR2 may be equally applied to the upper and lower sides of the tilting guide part based on the fourth imaginary line VL2'. Thus, the reliability of the tilting guide part may be improved. Here, the third imaginary line LV1' is a line that bisects the fifth outer line Ma1' and the sixth outer line M2'. Also, the second central point C1' may be an intersection of the third virtual line VL1' and the fourth virtual line VL2'. Alternatively, it may be a point corresponding to the center of gravity depending on the shape of the tilting guide part 1141.

In addition, a gap DR2 between the first-first protrusion PR1a and the first-second protrusion PR1b in the first direction (X-axis direction) may be greater than the length of the second protrusion PR2 in the first direction (X-axis direction). Thus, when the X-axis tilt is performed based on the first-first protrusion PR1a and the first-second protrusion PR1b, resistance due to the second protrusion PR2 can be minimized.

Correspondingly, a gap ML2 between the second-first protrusion PR2a and the second-second protrusion PR2b in the second direction (Y-axis direction) may be greater than the length of the first protrusion PR1 in the second direction (Y-axis direction). Thus, when the Y-axis tilt is performed based on the second-first protrusion PR2a and the second-second protrusion PR2b, resistance due to the first protrusion PR1 can be minimized.

Figure 10:
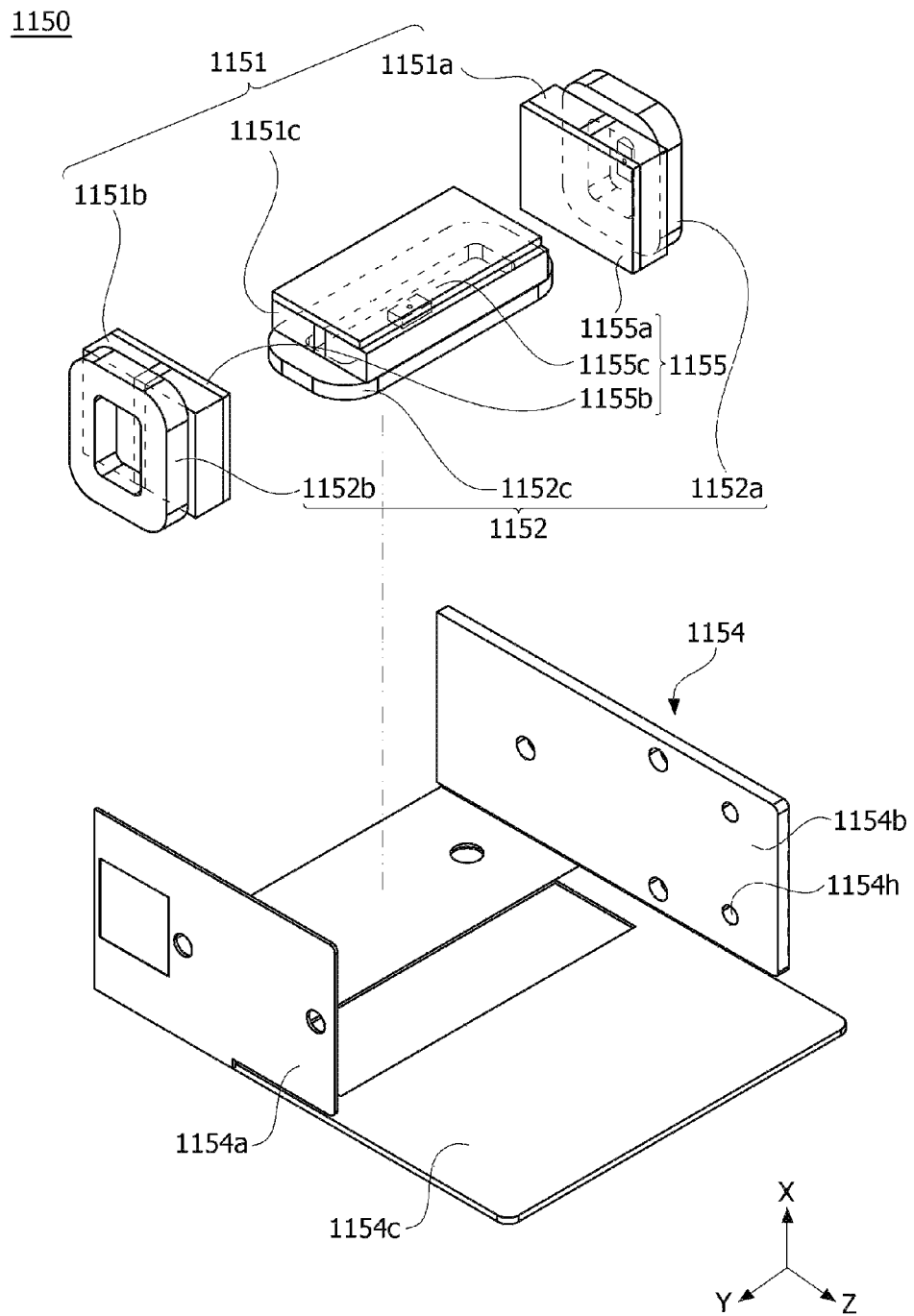
FIG. 10 is a view showing a first driving unit of a first camera actuator according to an embodiment.

FIG. 10 is a view showing a first driving unit of a first camera actuator according to an embodiment.

Referring to FIG. 10, the first driving unit 1150 includes the driving magnet 1151, the driving coil 1152, the Hall sensor unit 1153, the first substrate unit 1154, and the yoke unit 1155.

Also, as described above, the driving magnet 1151 may include a first magnet 1151a, a second magnet 1151b, and a third magnet 1151c, which provide driving force by electromagnetic force. Each of the first magnet 1151a, the second magnet 1151b, and the third magnet 1151c may be positioned on the outer surface of the holder 1131.

Also, the driving coil 1152 may include a plurality of coils. In an embodiment, the driving coil 1152 may include a first coil 1152a, a second coil 1152b, and a third coil 1152c.

The first coil 1152a may be positioned opposite to the first magnet 1151a. Thus, the first coil 1152a may be positioned in the first housing hole 1121a of the first housing side 1121 as described above. Also, the second coil 1152b may be positioned opposite to the second magnet 1151b. Thus, the second coil 1152b may be positioned in the second housing hole 1122a of the second housing side 1122 as described above.

The second camera actuator according to an embodiment may control the mover 1130 to rotate on the first axis (X-axis direction) or the second axis (Y-axis direction) by electromagnetic force between the driving magnet 1151 and the driving coil 1152, thereby minimizing the occurrence of a decenter or tilt phenomenon upon OIS implementation and providing the best optical characteristics.

In addition, according to an embodiment, the OIS may be implemented through the tilting guide part 1141 of the rotation unit 1140 disposed between the first housing 1120 and the mover 1130, so that it is possible to eliminate the size limitation of the actuator and provide the ultra-slim and ultra-small camera actuator and the camera module including the same.

The first substrate unit 1154 may include a first substrate side 1154a, a second substrate side 1154b, and a third substrate side 1154c.

The first substrate side 1154a and the second substrate side 1154b may be disposed to face each other. In addition, the third substrate side 1154c may be positioned between the first substrate side 1154a and the second substrate side 1154b.

Also, the first substrate side 1154a may be positioned between the first housing side and the shield can, and the second substrate side 1154b may be positioned between the second housing side and the shield can. In addition, the third substrate side 1154c may be positioned between the third housing side and the shield can, and may be a lower surface of the first substrate unit 1154.

The first substrate side 1154a may be combined with and electrically connected to the first coil 1152a. In addition, the first substrate side 1154a may be combined with and electrically connected to the first Hall sensor 1153a.

The second substrate side 1154b may be combined with and electrically connected to the second coil 1152b. In addition, the second substrate side 1154b may be combined with and electrically connected to the first Hall sensor.

The third substrate side 1154c may be combined with and electrically connected to the third coil 1152c. In addition, the third substrate side 1154c may be combined with and electrically connected to the second Hall sensor 1153b.

The yoke unit 1155 may include a first yoke 1155a, a second yoke 1155b, and a third yoke 1155c. The first yoke 1155a may be positioned in the first mounting recess and combined with the first magnet 1151a. In addition, the second yoke 1155b may be positioned in the second mounting recess and combined with the second magnet 1151b. In addition, the third yoke 1155c may be positioned in the third mounting recess and combined with the third magnet 1151c. The first to third yokes 1155a to 1155c allow the first to third magnets 1151a to 1151c to be easily placed in the first to third mounting recesses and combined with the housing.

Figure 11A:
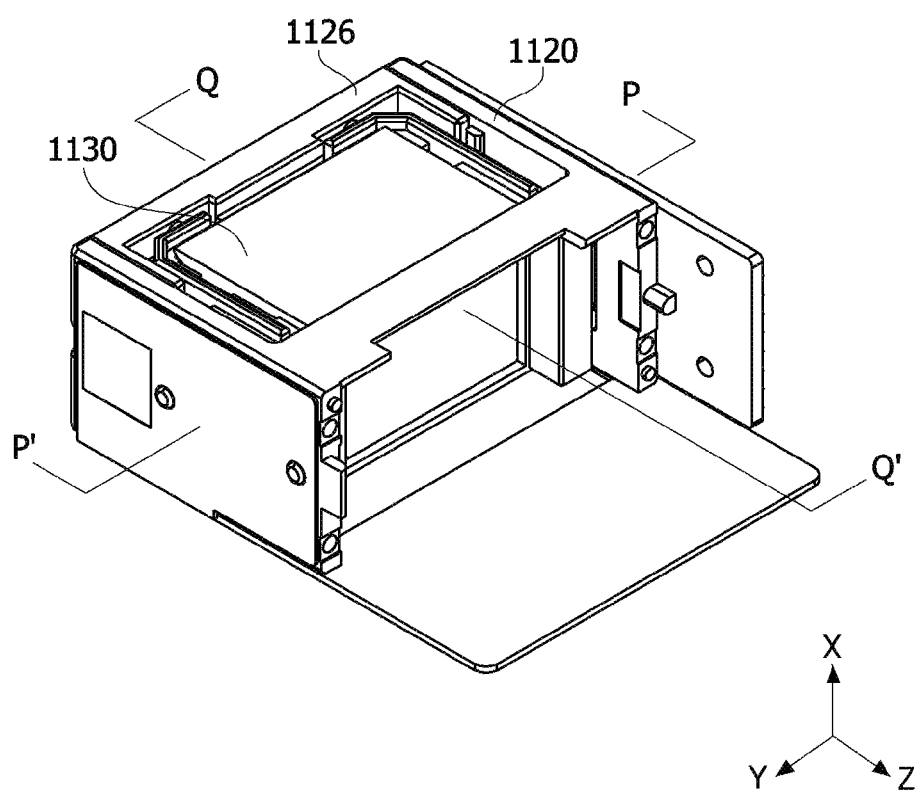
FIG. 11A is a perspective view of a first camera actuator according to an embodiment.
Figure 11B:
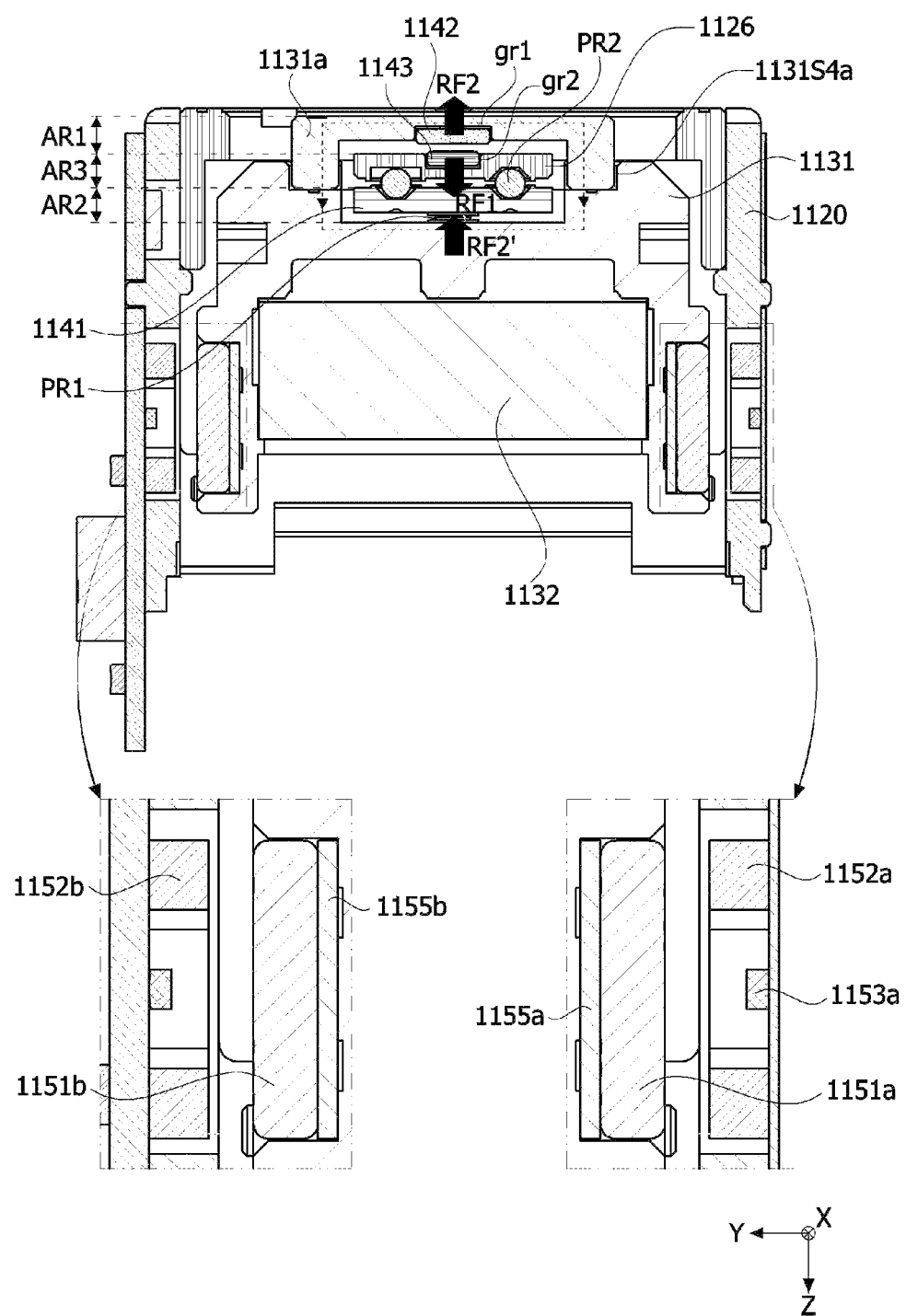
FIG. 11B is a cross-sectional view taken along line PP' in FIG. 11A.
Figure 11C:
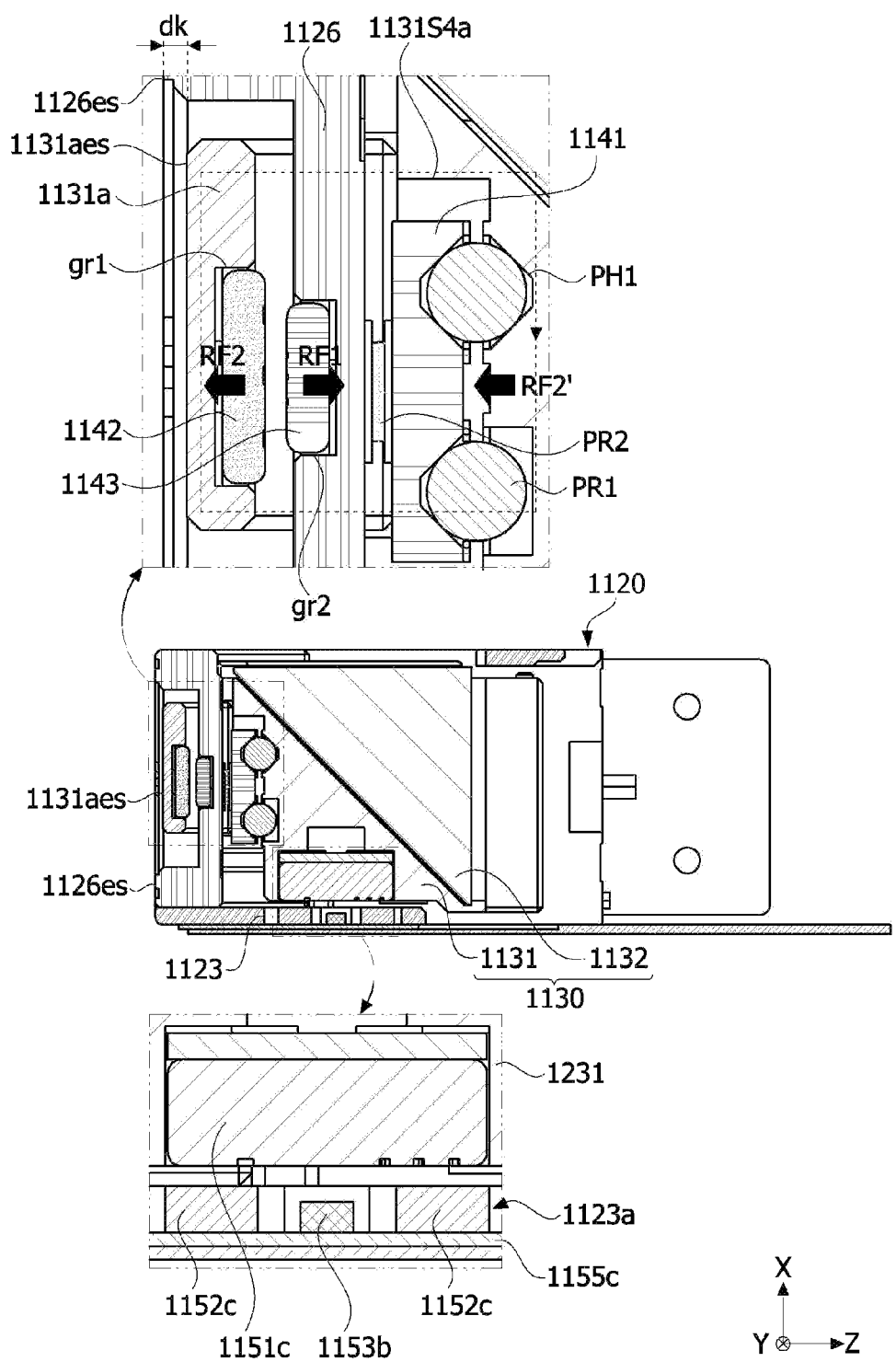
FIG. 11C is a cross-sectional view taken along line QQ' in FIG. 11A.

FIG. 11A is a perspective view of a first camera actuator according to an embodiment, FIG. 11B is a cross-sectional view taken along line PP' in FIG. 11A, and FIG. 11C is a cross-sectional view taken along line QQ' in FIG. 11A.

Referring to FIGS. 11A to 11C, the first coil 1152a may be located on the first housing side 1121, and the first magnet 1151a may be located on the first holder outer surface 1131S1 of the holder 1131. Thus, the first coil 1152a and the first magnet 1151a may be positioned to face each other. The first magnet 1151a may at least partially overlap with the first coil 1152a in the second direction (Y-axis direction).

In addition, the second coil 1152b may be located on the second housing side 1122, and the second magnet 1151b may be located on the second holder outer surface 1131S2 of the second holder 1131. Thus, the second coil 1152b and the second magnet 1151b may be positioned to face each other. The second magnet 1151b may at least partially overlap with the second coil 1152b in the second direction (Y-axis direction).

In addition, the first coil 1152a and the second coil 1152b may overlap in the second direction (Y-axis direction), and the first magnet 1151a and the second magnet 1151b may overlap in the second direction (Y-axis direction).

With this configuration, the electromagnetic force applied to the outer surface of the holder (the first holder outer surface and the second holder outer surface) is located on a parallel axis in the second direction (Y-axis direction), so that the X-axis tilt can be performed accurately and precisely.

In addition, the second protrusions PR2a and PR2b of the tilting guide part 1141 may come into contact with the first member 1126 of the first housing 1120. The second protrusion PR2 may be placed in the second protrusion hole PH2 formed on one side of the first member 1126. Also, when the X-axis tilt is performed, the second protrusions PR2a and PR2b may be reference axes (or rotational axes) of the tilt. Therefore, the tilting guide part 1141 and the mover 1130 may move along the second direction.

In addition, as described above, the first Hall sensor 1153a may be located outside for electrical connection and combination with the first substrate unit 1154. However, it is not limited to this position.

In addition, the third coil 1152c may be located on the third housing side 1123, and the third magnet 1151c may be located on the third holder outer surface 1131S3 of the holder 1131. The third coil 1152c and the third magnet 1151c may overlap at least in part in the first direction (X-axis direction). Therefore, the strength of the electromagnetic force between the third coil 1152c and the third magnet 1151c can be easily controlled.

As described above, the tilting guide part 1141 may be located on the fourth holder outer surface 1131S4 of the holder 1131. In addition, the tilting guide part 1141 may be placed in the fourth mounting recess 1131S4a on the fourth holder outer surface. As described above, the fourth mounting recess 1131S4a may include the first area AR1, the second area AR2, and the third area AR3.

The second member 1131a may be disposed in the first area AR1, and the second member 1131a may have the first groove gr1 formed on the inner surface of the second member 1131a. In addition, the second magnetic body 1142 is disposed in the first groove gr1 as described above, and the repulsive force RF2 generated from the second magnetic body 1142 may be transferred to the fourth mounting recess 1131S4a of the holder 1131 through the second member 1131a (RF2'). Therefore, the holder 1131 may apply force to the tilting guide part 1141 in the same direction as the repulsive force RF2 generated by the second magnetic body 1142.

The first member 1126 may be disposed in the second area AR2. The first member 1126 may have the second groove gr2 facing the first groove gr1. In addition, the first member 1126 may include the second protrusion hole PH2 disposed on a surface corresponding to the second groove gr2. Also, the repulsive force RF1 generated by the first magnetic body 1143 may be applied to the first member 1126. Thus, the first member 1126 and the second member 1131a may press the tilting guide part 1141 disposed between the first member 1126 and the holder 1131 through the generated repulsive forces RF1 and RF2'. Therefore, even after the holder is tilted in the X-axis or the Y-axis by the current applied to the first and second coils or the third coil 1152c, a combination among the holder 1131, the first housing 1120, and the tilting guide part 1141 can be maintained.

The tilting guide part 1141 may be disposed in the third area AR3. As described above, the tilting guide part 1141 may include the first protrusion PR1 and the second protrusion PR2. In this case, the first protrusion PR1 and the second protrusion PR2 may be disposed on the second surface 1141b and the first surface 1141a of the base BS, respectively. As such, even in other embodiments described below, the first protrusion PR1 and the second protrusion PR2 may be variously positioned on facing surfaces of the base BS.

The first protrusion hole PH1 may be located in the fourth mounting recess 1131S4a. Also, the first protrusion PR1 of the tilting guide part 1141 may be accommodated in the first protrusion hole PH1. Thus, the first protrusion PR1 may be in contact with the first protrusion hole PH1.

The maximum diameter of the first protrusion hole PH1 may correspond to the maximum diameter of the first protrusion PR1. This may be equally applied to the second protrusion hole PH2 and the second protrusion PR2. That is, the maximum diameter of the second protrusion hole PH2 may correspond to the maximum diameter of the second protrusion PR2. Also, the second protrusion PR2 may be in contact with the second protrusion hole PH2. With this configuration, the first axis tilt based on the first protrusion PR1 and the second axis tilt based on the second protrusion PR2 can easily occur, and the tilt radius can be improved.

In addition, the tilting guide part 1141 may be arranged side by side with the second member 1131a and the first member 1126 in the third direction (Z-axis direction), so that the tilting guide part 1141 may overlap with the optical member 1132 in the first direction (X-axis direction). Specifically, in an embodiment, the first protrusion PR1 may overlap with the optical member 1132 in the first direction (X-axis direction). Furthermore, at least a part of the first protrusion PR1 may overlap with the third coil 1152c or the third magnet 1151c in the first direction (X-axis direction). That is, in the camera actuator according to an embodiment, each protrusion, which is a central axis of tilt, may be located adjacent to the center of gravity of the mover 1130. Thus, the tilting guide part may be located adjacent to the center of gravity of the holder. Therefore, the camera actuator according to an embodiment can minimize the moment value for tilting the holder and minimize the consumption of current applied to the coil unit to tilt the holder, thereby improving power consumption and device reliability.

In addition, the second magnetic body 1142 and the first magnetic body 1143 may not overlap with the third coil 1152c or the optical member 1132 in the first direction (X-axis direction). In other words, in an embodiment, the second magnetic body 1142 and the first magnetic body 1143 may be spaced apart from the third coil 1152c or the optical member 1132 in the third direction (Z-axis direction). Thus, the third coil 1152c can minimize the magnetic force transferred from the second magnetic body 1142 and the first magnetic body 1143. Therefore, the camera actuator according to an embodiment can easily perform up and down driving (Y-axis tilt) and can minimize power consumption.

Furthermore, as described above, the second Hall sensor 1153b located inside the third coil 1152c may detect a change in magnetic flux, so that position sensing between the third magnet 1151c and the second Hall sensor 1153b may be performed. In this case, the offset voltage of the second Hall sensor 1153b may be changed according to the influence of the magnetic field formed from the second magnetic body 1142 and the first magnetic body 1143.

In the first camera actuator according to an embodiment, the second member 1131a, the second magnetic body 1142, the first magnetic body 1143, the first member 1126, the tilting guide part 1141, and the holder 1131 may be arranged sequentially in the third direction. However, because the second magnetic body is located in the second member and the first magnetic body is located in the first member, the second member, the first member, the tilting guide part, and the holder may be arranged in order.

In an embodiment, the second magnetic body 1142 and the first magnetic body 1143 may have a separation distance from the holder 1131 (or optical member 1132) in the third direction greater than a separation distance between the tilting guide parts 1141. Thus, the second Hall sensor 1153b under the holder 1131 may also be spaced apart from the second magnetic body 1142 and the first magnetic body 1143 by a predetermined distance. Therefore, the influence of the magnetic field formed by the second magnetic body 1142 and the first magnetic body 1143 is minimized in the second Hall sensor 1153b, so that it is possible to inhibit the Hall voltage from being saturated as it is concentrated in a positive or negative direction. That is, this configuration allows the Hall electrode to have a range in which Hall calibration can be performed. Furthermore, while the temperature is also affected by the electrode of the Hall sensor, and the resolving power of the camera lens varies according to the temperature, in the embodiment, it is possible to inhibit the Hall voltage from concentrating positively or negatively and compensate for the resolving power of the lens, thereby easily inhibiting the deterioration of the resolving power.

In addition, a circuit design for compensating for an offset with respect to the output (i.e., Hall voltage) of the second Hall sensor 1153b can be easily made.

In addition, according to an embodiment, a portion of the tilting guide part 1141 relative to the fourth holder outer surface of the holder 1131 may be located outside the fourth holder outer surface.

The tilting guide part 1141 may be placed in the fourth mounting recess 1131S4a based on the base BS, except for the first protrusion PR1 and the second protrusion PR2. In other words, the length of the base BS in the third direction (Z-axis direction) may be smaller than the length of the fourth mounting recess 1131S4a in the third direction (Z-axis direction). With this configuration, a reduction in size can be easily achieved.

In addition, the maximum length of the tilting guide part 1141 in the third direction (Z-axis direction) may be greater than the length of the fourth mounting recess 1131S4a in the third direction (Z-axis direction). Therefore, as described above, the end of the second protrusion PR2 may be positioned between the fourth holder outer surface and the first member 1126. That is, at least a portion of the second protrusion PR2 may be positioned in a direction opposite to the third direction (Z-axis direction) of the holder 1131. In other words, the holder 1131 may be spaced a predetermined distance from the end of the second protrusion PR2 (the portion in contact with the second protrusion hole) in the third direction (Z-axis direction).

In addition, the front surface 1131aes of the second member 1131a according to an embodiment may be spaced apart from the front surface 1126es of the second member 1126. In particular, the front surface 1131aes of the second member 1131a according to an embodiment may be positioned toward the third direction (Z-axis direction) from the front surface 1126es of the second member 1126. Alternatively, the front surface 1131aes of the second member 1131a according to an embodiment may be located inside the front surface 1126es of the second member 1126. To this end, the first member 1126 may have an inwardly extended and bent structure. Also, a partial region of the second member 1131a may be located in a groove formed by the extended and bent structure of the first member 1126 described above.

With this configuration, because the second member 1131a is located inside the second member 1126, space efficiency can be improved and reduction in size can be realized.

Furthermore, even when driving (tilting or rotating the mover 1130) by electromagnetic force is performed, the second member 1131a does not protrude outside the first member 1126, thus blocking contact with surrounding elements. Therefore, reliability can be improved.

In addition, a predetermined separation space may exist between the second magnetic body 1142 and the first magnetic body 1143. In other words, the second magnetic body 1142 and the first magnetic body 91143 may face each other with the same polarity.

Figure 12A:
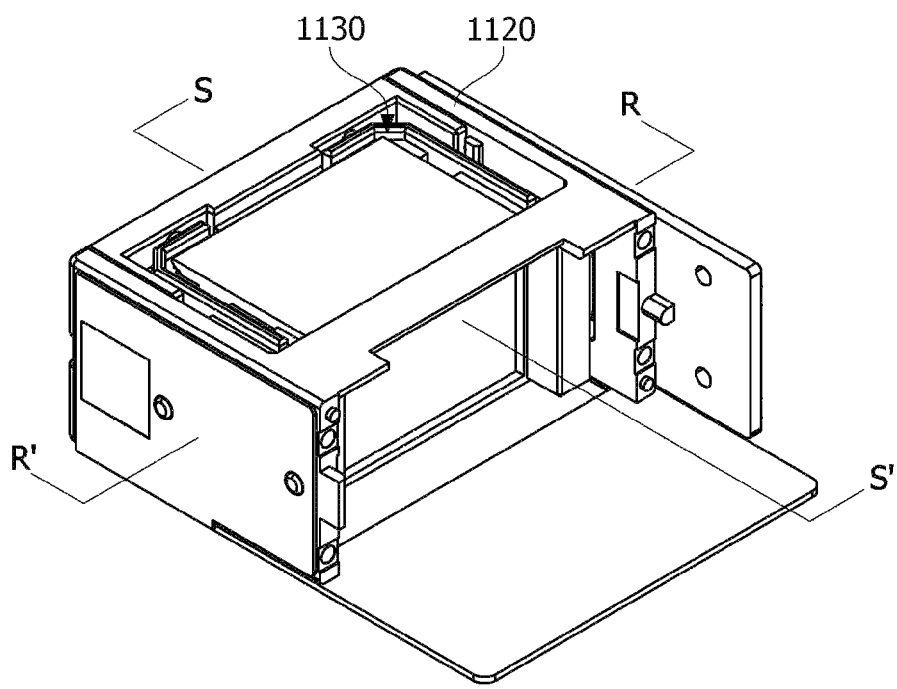
FIG. 12A is a perspective view of a first camera actuator according to an embodiment.
Figure 12B:
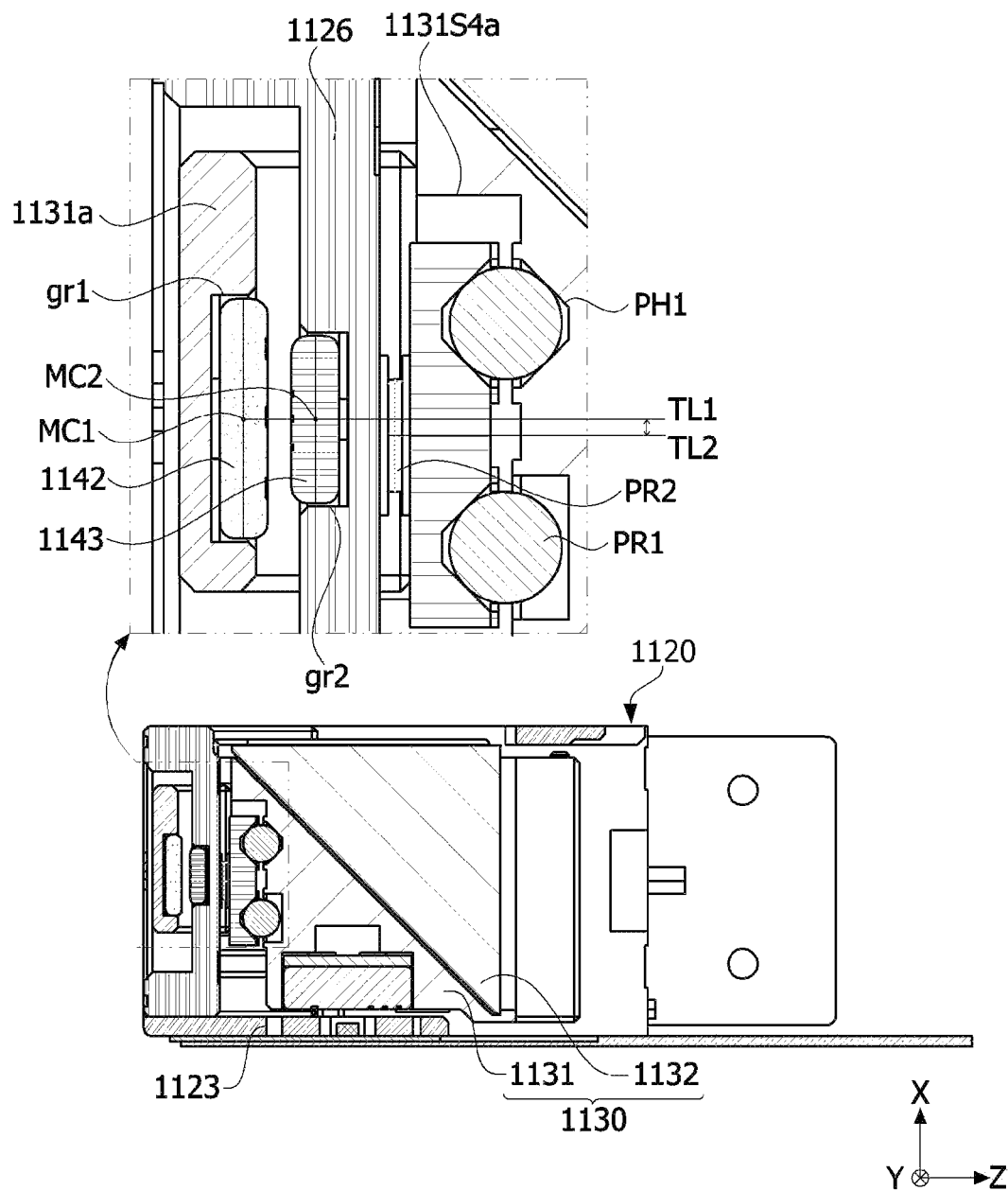
FIG. 12B is a cross-sectional view taken along line SS' in FIG. 12A.
Figure 12C:
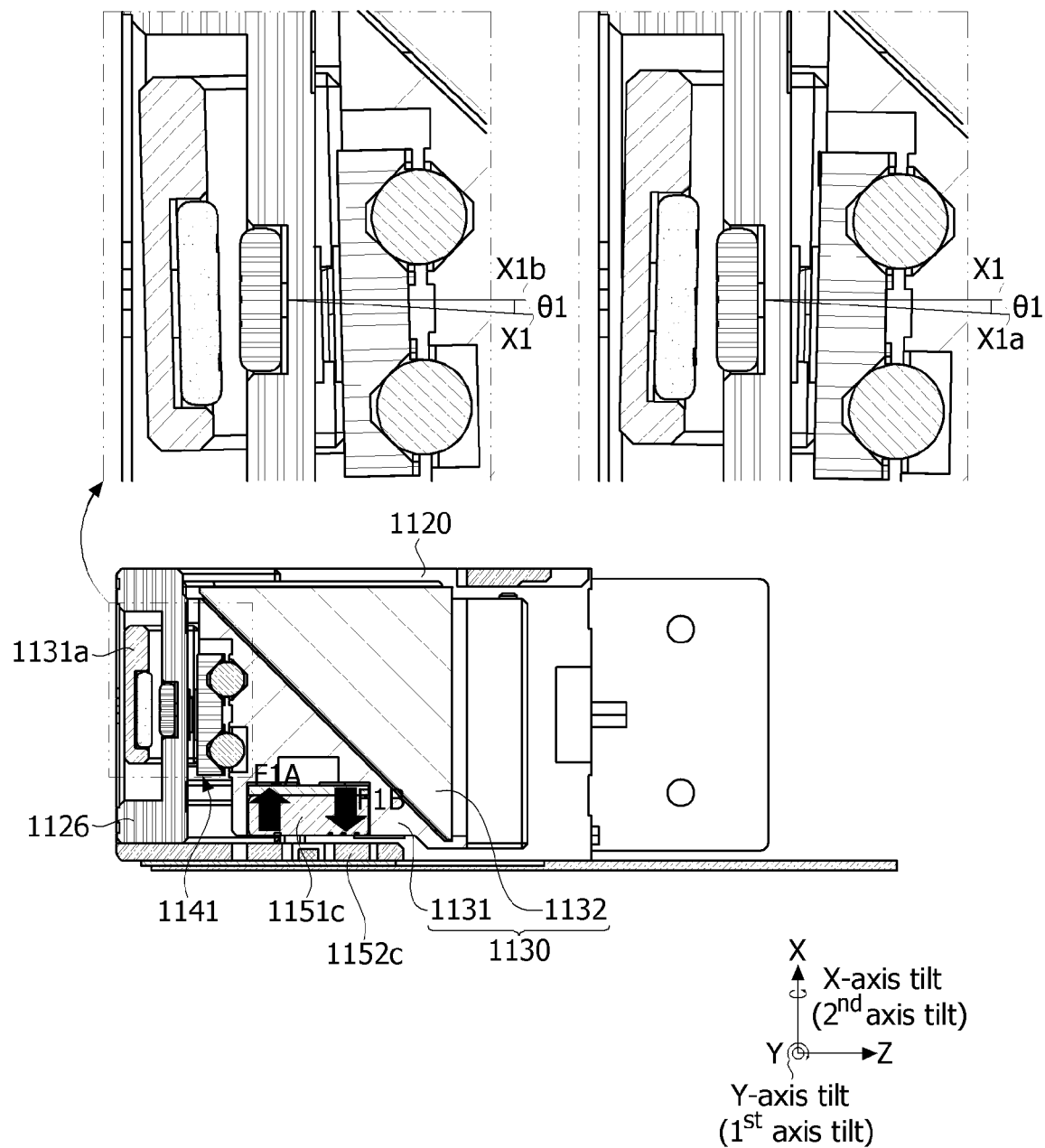
FIG. 12C is an exemplary view of movement of the first camera actuator shown in FIG. 12B.

FIG. 12A is a perspective view of a first camera actuator according to an embodiment, FIG. 12B is a cross-sectional view taken along line SS' in FIG. 12A, and FIG. 12C is an exemplary view of movement of the first camera actuator shown in FIG. 12B.

Referring to FIGS. 12A to 12C, the Y-axis tilt may be performed by the first camera actuator according to an embodiment. That is, the OIS can be implemented through rotation in the first direction (X-axis direction).

In an embodiment, the third magnet 1151c disposed below the holder 1131 may form an electromagnetic force with the third coil 1152c to tilt or rotate the mover 1130 in the second direction (Y-axis direction).

Specifically, the repulsive force between the second magnetic body 1142 and the first magnetic body 1143 may be transferred to the second member 1131a and the first member 1126 and finally transferred to the tilting guide part 1141 disposed between the first member 1126 and the holder 1131. Thus, the tilting guide part 1141 may be pressed by the mover 1130 and the first housing 1120 by the aforementioned repulsive force.

In addition, the second protrusion PR2 may be supported by the first member 1126. At this time, in an embodiment, the tilting guide part 1141 may be rotated or tilted with respect to the second protrusion PR2 protruding toward the first member 1126 as a reference axis (or rotation axis), that is, in the second direction (Y-axis direction). In other words, the tilting guide part 1141 may be rotated or tilted in the first direction (X-axis direction) by using the second protrusion PR2 protruding toward the first member 1126 as a reference axis (or rotation axis).

For example, the mover 1130 is rotated (X1→X1a) in the X-axis direction at a first angle θ1 by the first electromagnetic forces F1A and F1B between the third magnet 1151c disposed in the third mounting recess and the third coil unit 1152c disposed on the third substrate side, thereby realizing the OIS implementation.

Conversely, the mover 1130 is rotated (X1→X1b) in a direction opposite to the X-axis direction at a first angle θ1 by the first electromagnetic forces F1A and F1B between the third magnet 1151c disposed in the third mounting recess and the third coil unit 1152c disposed on the third substrate side, thereby realizing the OIS implementation.

The first angle θ1 may be, but is not limited to, +1° to +3°.

In addition, the center MC1 of the second magnetic body 1142 and the center MC2 of the first magnetic body 1143 may be arranged side by side along the third direction (Z-axis direction). In other words, the center line TL1 connecting the center MC1 of the second magnetic body 1142 and the center MC2 of the first magnetic body 1143 may be parallel to the third direction (Z-axis direction).

Also, the bisector TL2 that bisects the second protrusion PR2 and corresponds to the third direction (Z-axis direction) may be parallel to the center line TL1. In other words, the bisector TL2 may be a line that bisects the second protrusion PR2 in the first direction (X-axis direction), and may be plural.

In an embodiment, the bisector TL2 may be spaced apart from the center line TL1 in the first direction (X-axis direction). The bisector TL2 may be located above the center line TL1. With this configuration, a separation distance between the third coil 1152c or the third magnet 1151c may increase, so that the holder can more accurately perform two-axis tilt. Furthermore, when current is not applied to the coil, the position of the holder can be maintained the same.

Specifically, because the center MC1 of the second magnetic body 1142 and the center MC2 of the first magnetic body 1143 are spaced apart from the bisector TL2 in the first direction (X-axis direction), a force (e.g., repulsive force) between the magnetic body 1142 and the first magnetic body 1143 may act at a distance from the bisector TL2 corresponding to the optical axis in the first direction (X-axis direction). This force creates momentum in the mover 1130. However, if the center MC1 of the second magnetic body 1142 and the center MC2 of the first magnetic body 1143 are located on the bisector TL2, there is a problem that the positions of the tilting guide part and the second magnetic body 1142 are not maintained after tilting. That is, because the camera actuator according to an embodiment inhibits the center MC1 of the second magnetic body 1142 and the center MC2 of the first magnetic body 1143 from being disposed on the bisector TL2, it is possible to maintain the positions of the tilting guide part and the second magnetic body 1142 after tilting or rotating.

In another embodiment, the center MC1 of the second magnetic body 1142 and the center MC2 of the first magnetic body 1143 may be spaced apart from each other in the first direction (X-axis direction).

In addition, the center MC1 of the second magnetic body 1142 and the center MC2 of the first magnetic body 1143 may not be located on the bisector TL2. For example, the center MC1 of the second magnetic body 1142 and the center MC2 of the first magnetic body 1143 may be positioned above the bisector TL2.

As a result, a separation distance from the third coil 1152c or the third magnet 1151c increases, so that the holder can more accurately perform two-axis tilt. Furthermore, when current is not applied to the coil, the position of the holder can be maintained the same.

In addition, the second magnetic body 1142 and the first magnetic body 1143 may have different lengths in the first direction (X-axis direction).

In an embodiment, the area of the second magnetic body 1142 combined with the second member 1131a and tilted together with the mover 1130 may be larger than that of the first magnetic body 1143. For example, the length of the second magnetic body 1142 in the first direction (X-axis direction) may be greater than the length of the first magnetic body 1143 in the first direction (X-axis direction). Also, the length of the second magnetic body 1142 in the second direction (Y-axis direction) may be greater than the length of the first magnetic body 1143 in the second direction (Y-axis direction). In addition, the first magnetic body 1143 may be positioned within an imaginary straight line extending both ends of the second magnetic body 1142 in the third direction.

With this configuration, even if one magnetic body (e.g., the second magnetic body) is tilted during tilting or rotation, it is possible to easily inhibit the generation of a force other than a vertical force due to tilting. That is, even if the second magnetic body is tilted up and down together with the mover 1130, a force (e.g., repulsive force or attractive force) opposing the tilt may not be received from the first magnetic body 1143. Thus, driving efficiency can be improved.

Figure 13A:
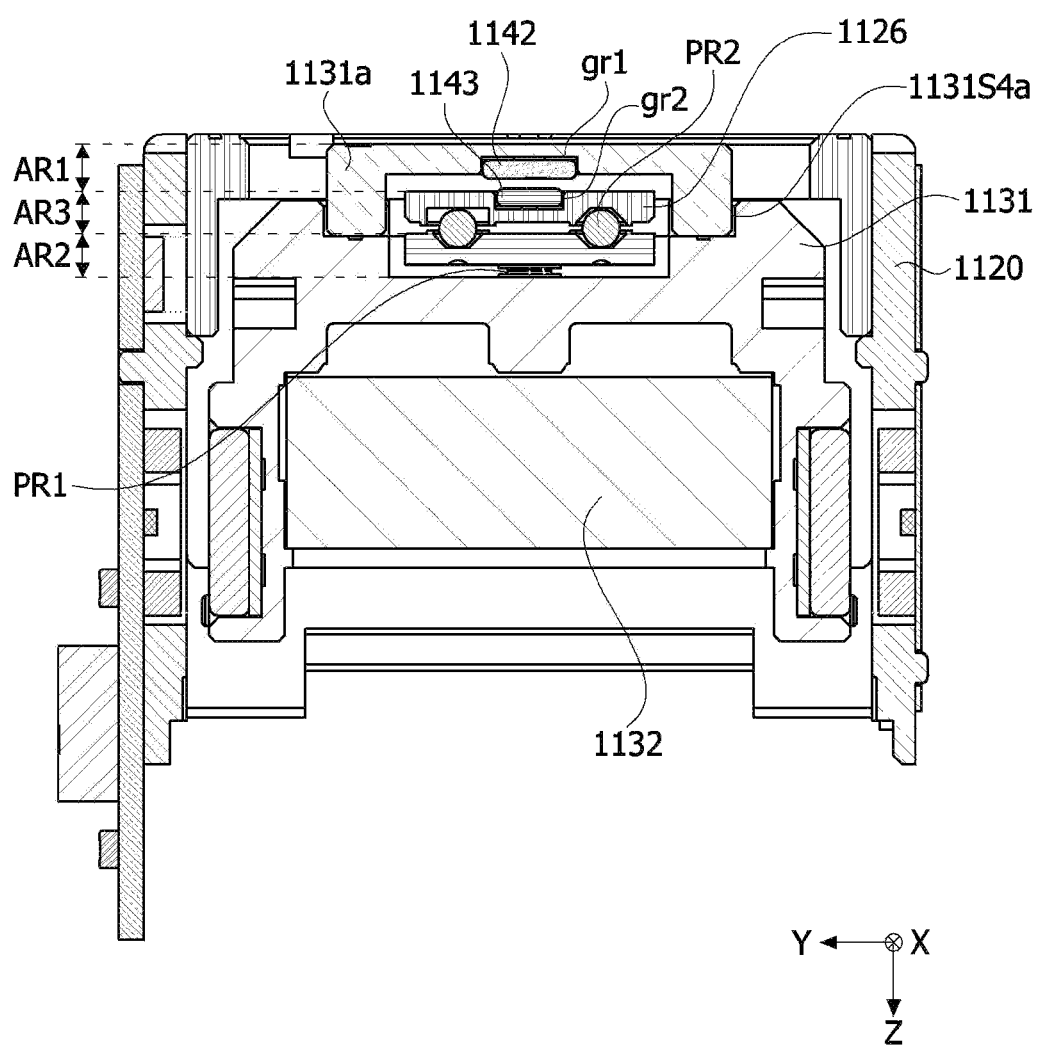
FIG. 13A is a cross-sectional view taken along line RR' in FIG. 12A.
Figure 13B:
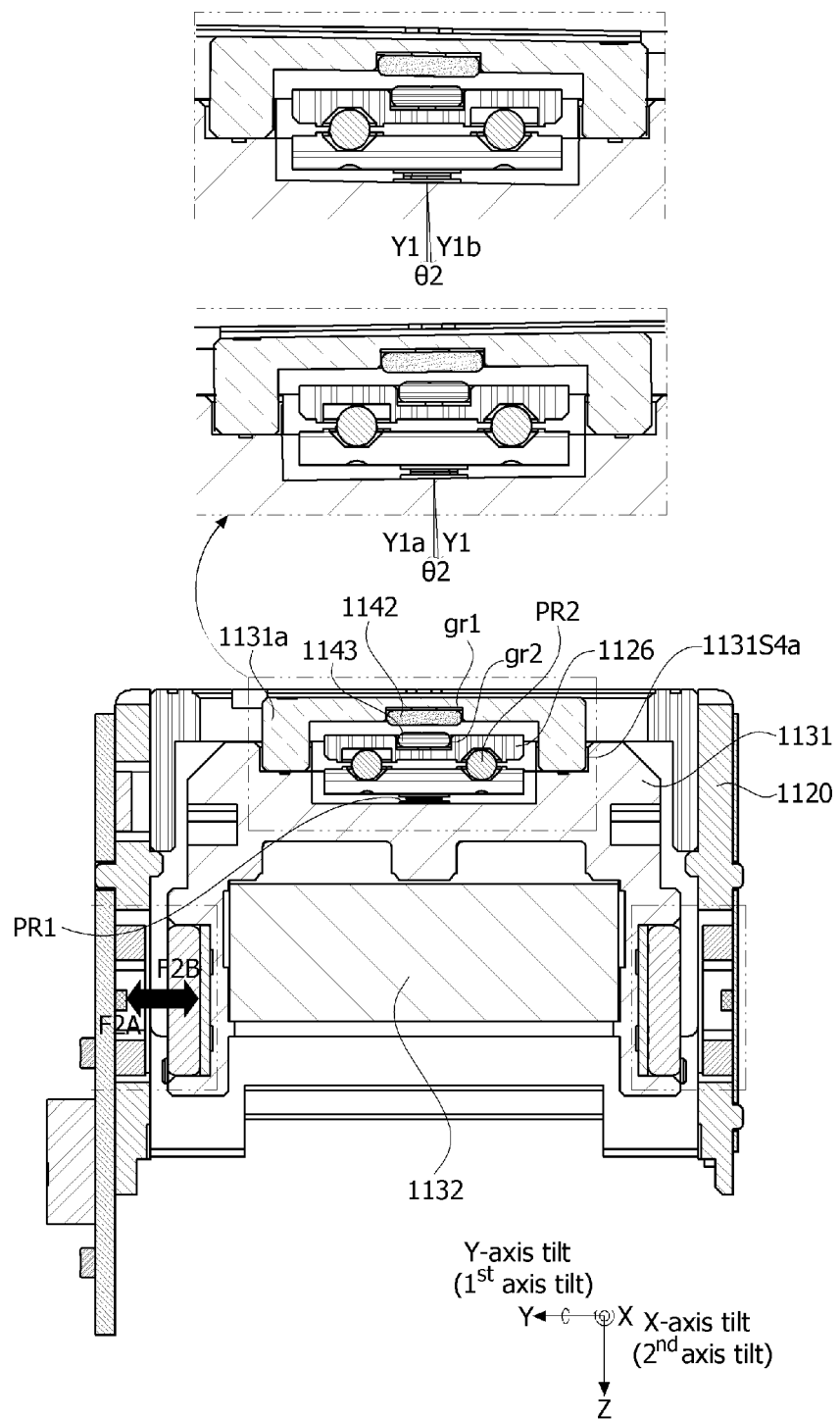
FIG. 13B is an exemplary view of movement of the first camera actuator shown in FIG. 13A.

FIG. 13A is a cross-sectional view taken along line RR' in FIG. 12A, and FIG. 13B is an exemplary view of movement of the first camera actuator shown in FIG. 13A.

Referring to FIGS. 13A and 13B, the X-axis tilt may be performed. That is, the OIS can be implemented while the mover 1130 tilts or rotates in the Y-axis direction.

In an embodiment, the first magnet 1151a and the second magnet 1151b disposed on the holder 1131 may form an electromagnetic force with the first coil 1152a and the second coil 1152b, respectively, thereby tilting or rotating the tilting guide part 1141 and the mover 1130 based on the first direction (X-axis direction).

Specifically, the repulsive force between the second magnetic body 1142 and the first magnetic body 1143 may be transferred to the first member 1126 and the holder 1131 and finally transferred to the tilting guide part 1141 disposed between the holder 1131 and the first member 1126. Thus, the tilting guide part 1141 may be pressed by the mover 1130 and the first housing 1120 by the aforementioned repulsive force.

In addition, the first-first protrusion PR1a and the first-second protrusion PR1b may be spaced apart in the first direction (X-axis direction) and supported by the first protrusion hole PH1 formed in the fourth mounting recess 1131S4a of the holder 1131. Also, in an embodiment, the tilting guide part 1141 may be rotated or tilted with respect to the first protrusion PR1 protruding toward the holder 1131 (e.g., toward the third direction) as a reference axis (or rotation axis), that is, in the first direction (X-axis direction).

For example, the mover 1130 is rotated (Y1→Y1a) in the Y-axis direction at a second angle θ2 by the second electromagnetic forces F2A and F2B between the first and second magnets 1151*a* and 1151*b* disposed in the first mounting recess and the first and second coil units 1152*a* dna 1152*b* disposed on the first and second substrate sides, thereby realizing the OIS implementation. Also, the mover 1130 is rotated (Y1→Y1*b*) in a direction opposite to the Y-axis direction at a second angle θ2 by the second electromagnetic forces F2A and F2B between the first and second magnets 1151*a* and 1151*b* disposed in the first mounting recess and the first and second coil units 1152*a* dna 1152*b* disposed on the first and second substrate sides, thereby realizing the OIS implementation. The second angle θ2 may be, but is not limited to, +1° to +3°.

Here, the second electromagnetic forces F2A and F2B may be generated in the third direction or in a direction opposite to the third direction, unlike shown. In addition, although the electromagnetic force is applied to the coil, the coil is combined with a fixed housing in this specification, and therefore it will be described that the magnet and the holder combined with the magnet are moved by the electromagnetic force. Also, the electromagnetic force will be described based on the direction in which the magnet and holder are moved. For example, when the first coil receives the electromagnetic force in a direction opposite to the third direction (Z-axis direction), the first magnet and one side of the holder 1131 adjacent to the first magnet receive force by the electromagnetic force in the third direction (Z-axis direction). Also, when the second coil receives the electromagnetic force in the third direction (Z-axis direction), the second magnet and the other side of the holder 1131 adjacent to the second magnet receive force by the electromagnetic force in the opposite direction to the third direction (Z-axis direction). As a result, the holder 1131 may move by receiving force in the 'F2A' direction, as shown. In the opposite case, the holder 1131 may move by receiving force in the 'F2B' direction. Accordingly, the second electromagnetic forces F2A and F2B are the electromagnetic forces generated by the first and second coils and the first and second magnets as described above, and correspond to the moving force of the holder.

As such, the second actuator according to an embodiment may control the mover 1130 to rotate in the first direction (X-axis direction) or the second direction (Y-axis direction) by the electromagnetic force between the driving magnet in the holder and the driving coil disposed in the first housing, thereby minimizing the occurrence of a decenter or tilt phenomenon upon OIS implementation and providing the best optical characteristics. In addition, as described above, the 'Y-axis tilt' refers to rotation or tilt in the first direction (X-axis direction), and the 'X-axis tilt' refers to rotation or tilt in the second direction (Y-axis direction).

Figure 14:
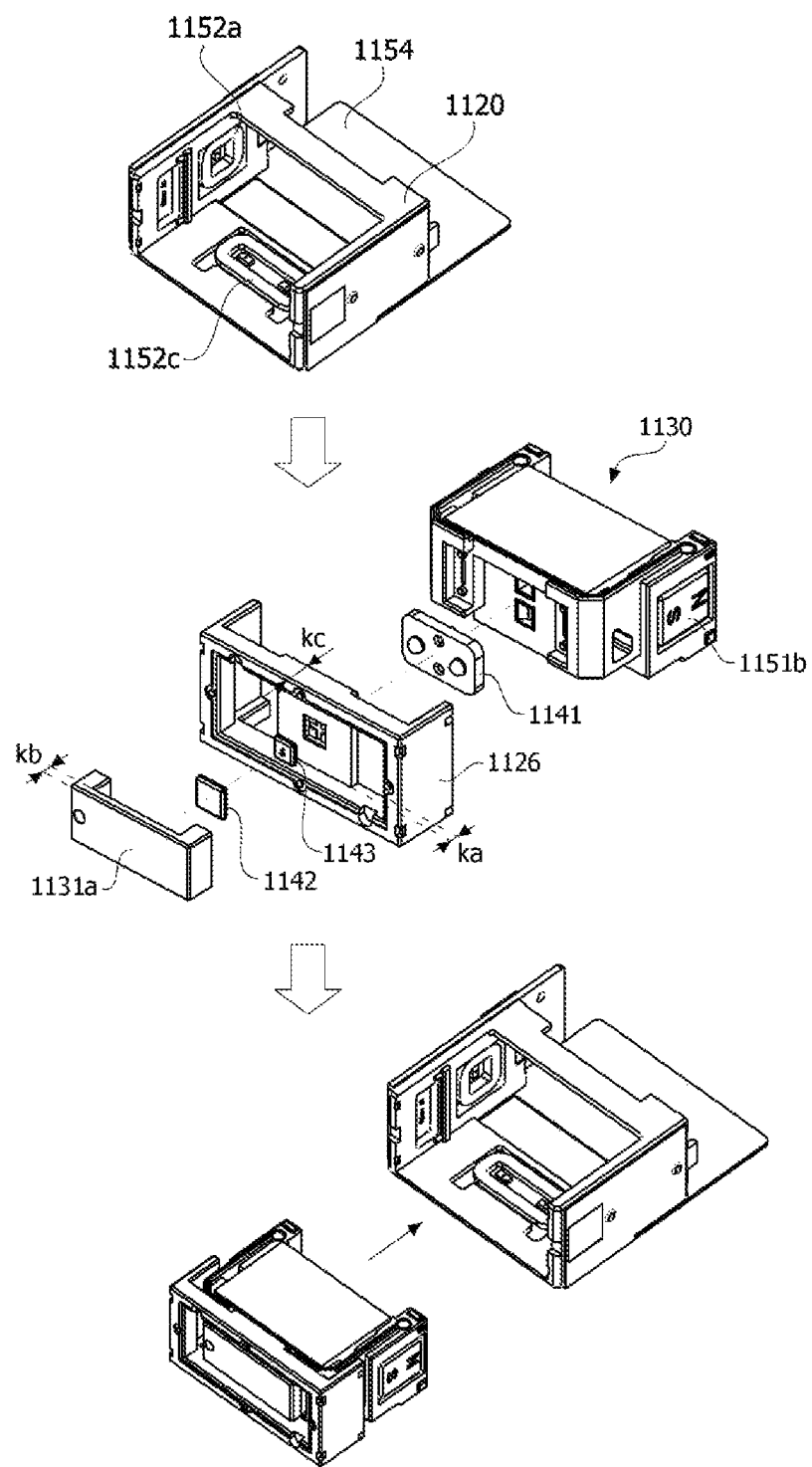
FIG. 14 is a view showing an assembly sequence of a first camera actuator according to an embodiment.

FIG. 14 is a view showing an assembly sequence of a first camera actuator according to an embodiment.

Referring to FIG. 14, a method of assembling the first camera actuator according to an embodiment may include a step of combining the first coil to the third coil and the first substrate unit with the first housing, a step of combining the first mover 1130, the tilting guide part 1141, the first member 1126, and the second member 1131*a* with the first housing, and a step of inserting the combined mover 1130, the tilting guide part 1141, the first member 1126, and the second member 1131*a* into the first housing 1120.

In an embodiment, after the step of combining the first coil to the third coil and the first substrate unit with the first housing, the step of inserting the combined mover 1130, the tilting guide part 1141, the first member 1126, and the second member 1131*a* into the first housing 1120 may be performed. Accordingly, it is possible to minimize the influence of tolerances or foreign matter on the optical member or the holder, which occurs while the first to third coils and the first substrate unit are combined with the first housing. Also, the driving accuracy of the first camera actuator may be improved.

Further, because the mover 1130, the tilting guide part 1141, the first member 1126, and the second member 1131*a* are inserted laterally into the first housing 1120, for example, in the third direction (Z-axis direction), it is possible to minimize the shock applied to the mover 1130, the tilting guide part 1141, the first member 1126, and the second member 1131*a* compared to a vertical insertion case.

In addition, the sum of the length (ka) of the central portion (corresponding to the tilting guide part, overlapping in the third direction, or corresponding to the 'connection member' between the first through hole and the second through hole) of the first member 1126 in the third direction (Z-axis direction) and the length (kb) of the member base of the second member 1131*a* in the third direction (Z-axis direction) may be equal to or less than the length (kc) of upper and lower frames (corresponding to upper and lower members) connected to the central portion of the first member 1126 in the third direction (Z-axis direction). With this configuration, as described above, even when the second member 1131*a* tilts or rotates, it may not protrude outward from the outer surface of the first member 1126.

Also, as described above, the first member 1126 may be combined with the first housing 1120 to form one housing. For example, one housing may be composed of a first-first housing 11200 and a first-second housing which is the first member.

Figure 15:
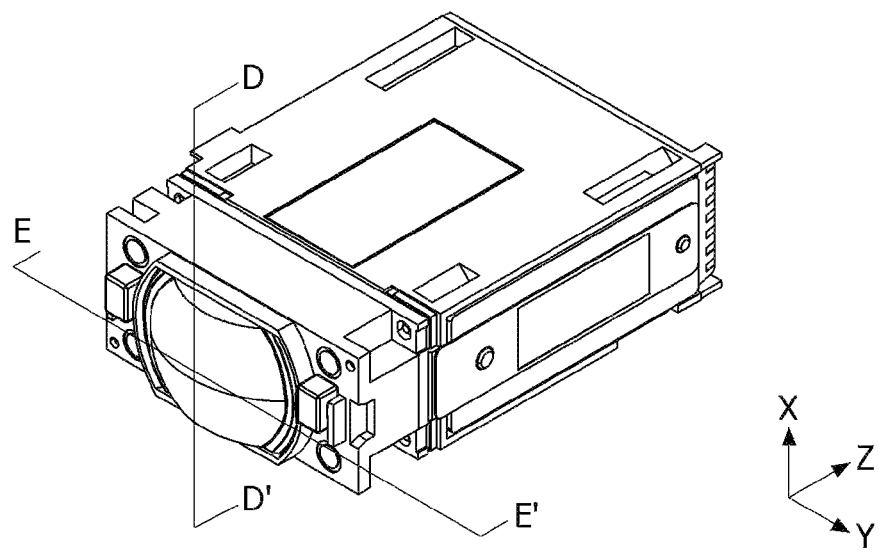
FIG. 15 is a perspective view of a second camera actuator according to an embodiment.
Figure 16:
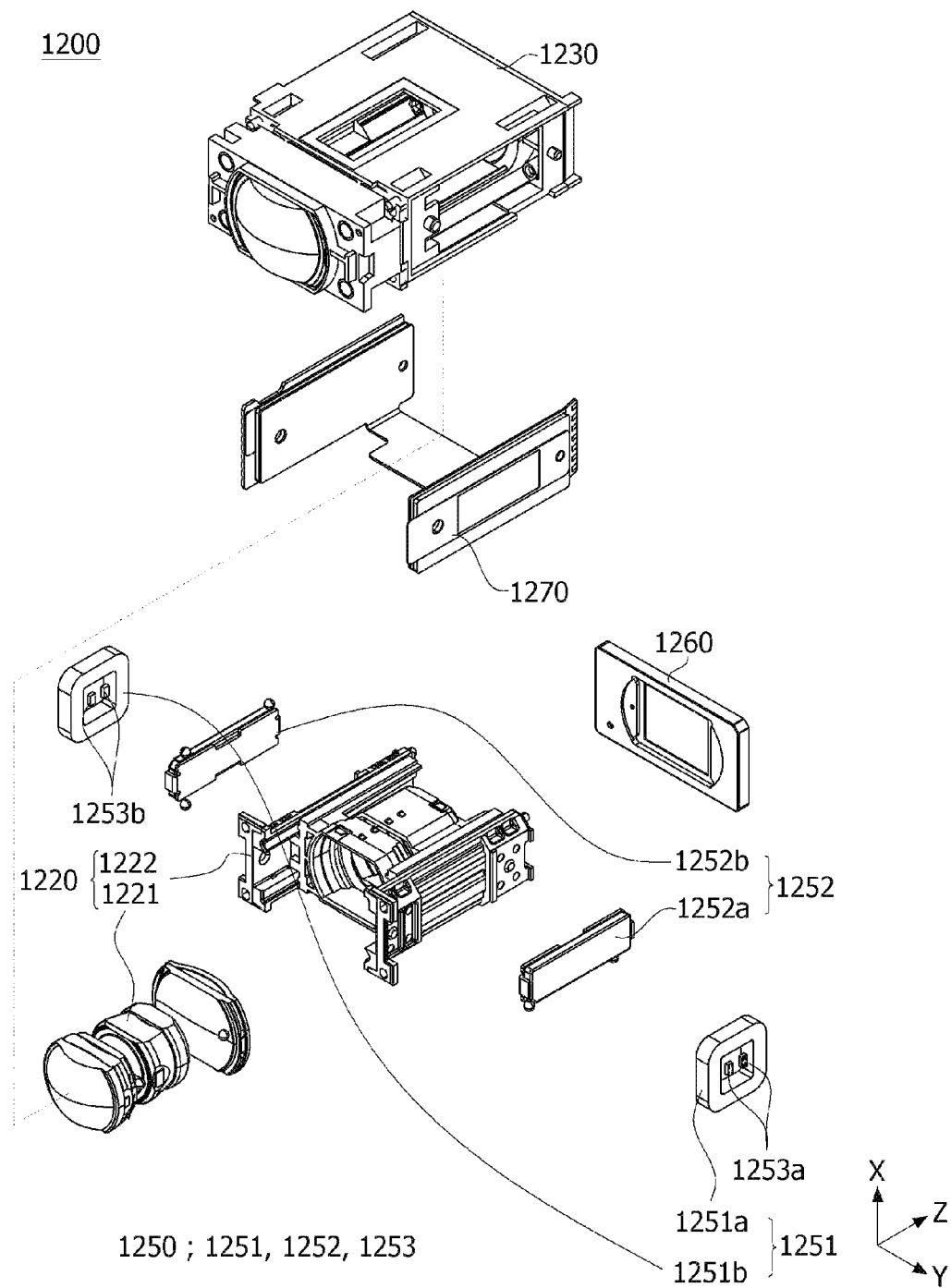
FIG. 16 is an exploded perspective view of a second camera actuator according to an embodiment.
Figure 17:
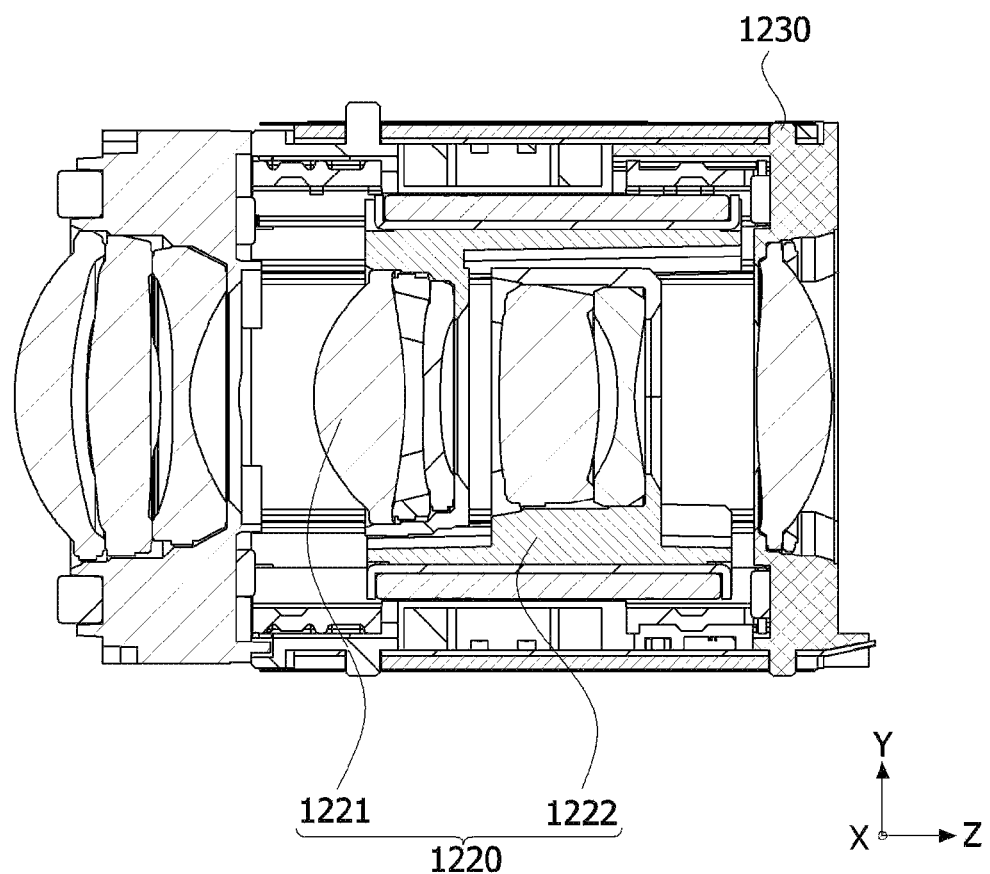
FIG. 17 is a cross-sectional view taken along line DD' in FIG. 15.
Figure 18:
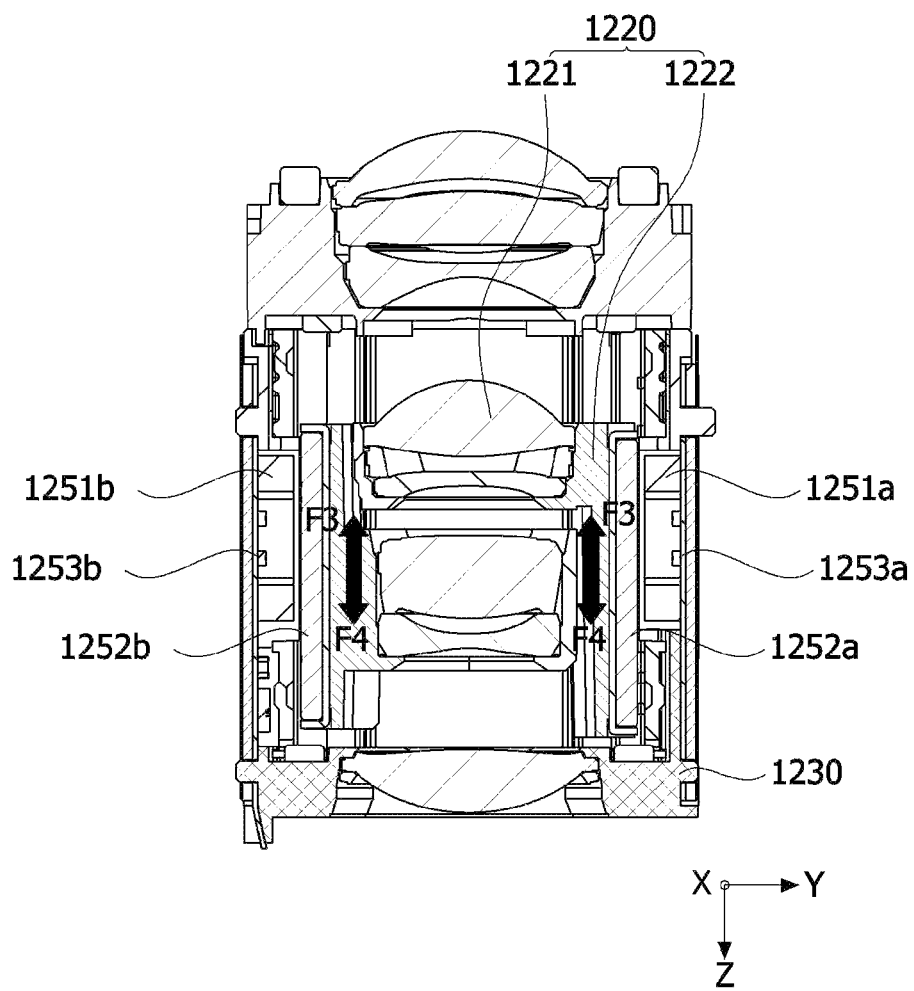
FIG. 18 is a cross-sectional view taken along line EE' in FIG. 15.

FIG. 15 is a perspective view of a second camera actuator according to an embodiment, FIG. 16 is an exploded perspective view of a second camera actuator according to an embodiment, FIG. 17 is a cross-sectional view taken along line DD' in FIG. 15, and FIG. 18 is a cross-sectional view taken along line EE' in FIG. 15.

Referring to FIGS. 15 to 18, the second camera actuator 1200 according to an embodiment may include a lens unit 1220, a second housing 1230, a second driving unit 1250, a base unit (not shown), and a second substrate unit 1270. In addition, the second camera actuator 1200 may further include a second shield can (not shown), an elastic part (not shown), and a bonding member (not shown). Also, the second camera actuator 1200 may further include an image sensor IS.

The second shield can (not shown) may be located in one area (e.g., outermost) of the second camera actuator 1200 to surround components (the lens unit 1220, the second housing 1230, the elastic part (not shown), the second driving unit 1250, the base unit (not shown), the second substrate unit 1270, and the image sensor IS) to be described below.

The second shield can (not shown) may block or reduce electromagnetic waves generated from the outside. Accordingly, the occurrence of malfunction in the second driving unit 1250 may be reduced.

The lens unit 1220 may be located in the second shield can (not shown). The lens unit 1220 may move in the third direction (Z-axis direction). Accordingly, the above-described AF function may be performed.

Specifically, the lens unit 1220 may include a lens assembly 1221 and a bobbin 1222.

The lens assembly 1221 may include at least one lens. In addition, the lens assembly 1221 may be plural, but hereinafter, only one will be described.

The lens assembly 1221 may be combined with the bobbin 1222 and move in the third direction (Z-axis direction) by electromagnetic force generated from a fourth magnet 1252a and a second magnet 1252b combined with the bobbin 1222.

The bobbin 1222 may have an opening area surrounding the lens assembly 1221. Also, the bobbin 1222 may be combined with the lens assembly 1221 by various methods. In addition, the bobbin 1222 may have a recess on a side surface, and may be combined with the fourth magnet 1252a and the second magnet 1252b through the recess. A bonding member or the like may be coated in the recess.

In addition, the bobbin 1222 may be combined with elastic parts (not shown) at the upper and rear ends. Thus, the bobbin 1222 may be supported by the elastic part (not shown) while moving in the third direction (Z-axis direction). That is, the bobbin 1222 may move in the third direction (Z-axis direction) while its position is maintained. The elastic part (not shown) may be made of a leaf spring.

The second housing 1230 may be disposed between the lens unit 1220 and the second shield can (not shown). Also, the second housing 1230 may be disposed to surround the lens unit 1220.

A hole may be formed on the side of the second housing 1230. A fourth coil 1251a and a fifth coil 1251b may be disposed in the hole. The hole may be positioned to correspond to the recess of the bobbin 1222 described above.

The fourth magnet 1252a may be positioned to face the fourth coil 1251a. Also, the second magnet 1252b may be positioned to face the fifth coil 1251b.

The elastic part (not shown) may include a first elastic member (not shown) and a second elastic member (not shown). The first elastic member (not shown) may be combined with the upper surface of the bobbin 1222. The second elastic member (not shown) may be combined with the lower surface of the bobbin 1222. In addition, the first elastic member (not shown) and the second elastic member (not shown) may be formed as leaf springs as described above. Also, the first elastic member (not shown) and the second elastic member (not shown) may provide elasticity for the movement of the bobbin 1222.

The second driving unit 1250 may provide driving forces F3 and F4 for moving the lens unit 1220 in the third direction (Z-axis direction). The second driving unit 1250 may include a driving coil 1251 and a driving magnet 1252.

The lens unit 1220 may move in the third direction (Z-axis direction) by the electromagnetic force formed between the driving coil 1251 and the driving magnet 1252.

The driving coil 1251 may include the fourth coil 1251a and the fifth coil 1251b. The fourth coil 1251a and the fifth coil 1251b may be disposed in the hole formed on the side of the second housing 1230. Also, the fourth coil 1251a and the fifth coil 1251b may be electrically connected to the second substrate unit 1270. Therefore, the fourth coil 1251a and the fifth coil 1251b may receive current through the second substrate unit 1270.

The driving magnet 1252 may include the fourth magnet 1252a and the fifth magnet 1252b. The fourth magnet 1252a and the fifth magnet 1252b may be disposed in the aforementioned recess of the bobbin 1222 and may be positioned to correspond to the fourth coil 1251a and the fifth coil 1251b.

The base unit (not shown) may be located between the lens unit 1220 and the image sensor IS. Components such as filters may be fixed to the base unit (not shown). Also, the base unit (not shown) may be disposed to surround the image sensor IS. With this configuration, because the image sensor IS is freed from foreign substances, the reliability of the device can be improved.

In addition, the second camera actuator may be a zoom actuator or an auto focus (AF) actuator. For example, the second camera actuator may support one or a plurality of lenses and perform an autofocusing function or a zooming function by moving the lens in response to a control signal from a predetermined controller.

Also, the second camera actuator may be a fixed zoom or continuous zoom. For example, the second camera actuator may provide the movement of the lens assembly 1221.

In addition, the second camera actuator may include a plurality of lens assemblies. For example, the second camera actuator may include at least one of a first lens assembly (not shown), a second lens assembly (not shown), a third lens assembly (not shown), and a guide pin (not shown). The above description may be applied to this. Accordingly, the second camera actuator may perform a high-magnification zooming function through the driving unit. For example, the first lens assembly (not shown) and the second lens assembly (not shown) may be a moving lens that moves through the driving unit and the guide pin (not shown), and the third lens assembly (not shown) may be, but is not limited to, a fixed lens. For example, the third lens assembly (not shown) may perform the function of a concentrator (focator) that images light at a specific position, and the first lens assembly (not shown) may perform the function of a variator that re-images the image formed by the third lens assembly to another position. Meanwhile, a magnification change may be large in the first lens assembly (not shown) because a distance to a subject or an image distance changes a lot, and the first lens assembly (not shown) which is a variator may perform an important role in changing the focal length or magnification of the optical system. On the other hand, an image point formed by the first lens assembly (not shown) which is a variator may be slightly different depending on a position. Therefore, the second lens assembly (not shown) may perform a position compensation function for the image formed by the variator. For example, the second lens assembly (not shown) may perform the function of a compensator that accurately forms, at an actual image sensor position, the image point formed by the first lens assembly (not shown) which is a variator.

The image sensor IS may be located inside or outside the second camera actuator. In an embodiment, as shown, the image sensor IS may be located inside the second camera actuator. The image sensor IS may receive light and convert the received light into an electrical signal. Also, the image sensor IS may include a plurality of pixels in an array form. Also, the image sensor IS may be positioned on the optical axis.

Figure 19:
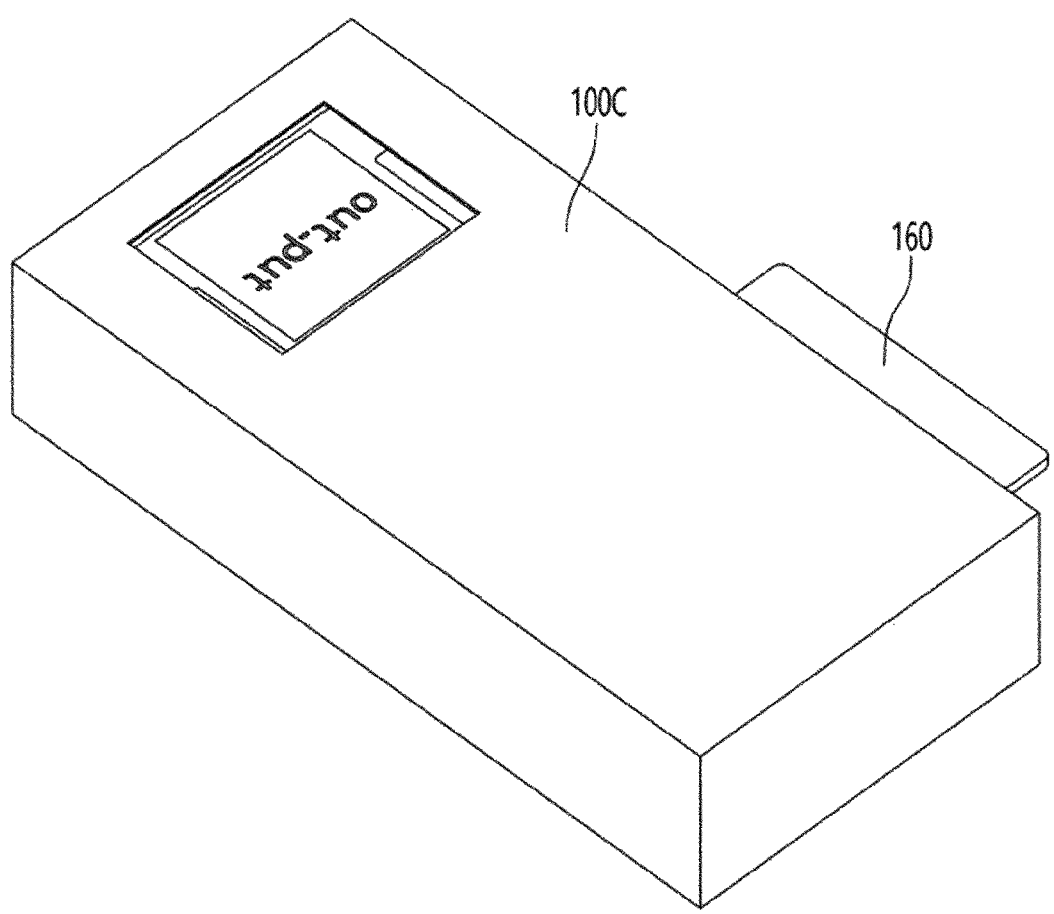
FIG. 19 is a perspective view of a camera module according to another embodiment.
Figure 20A:
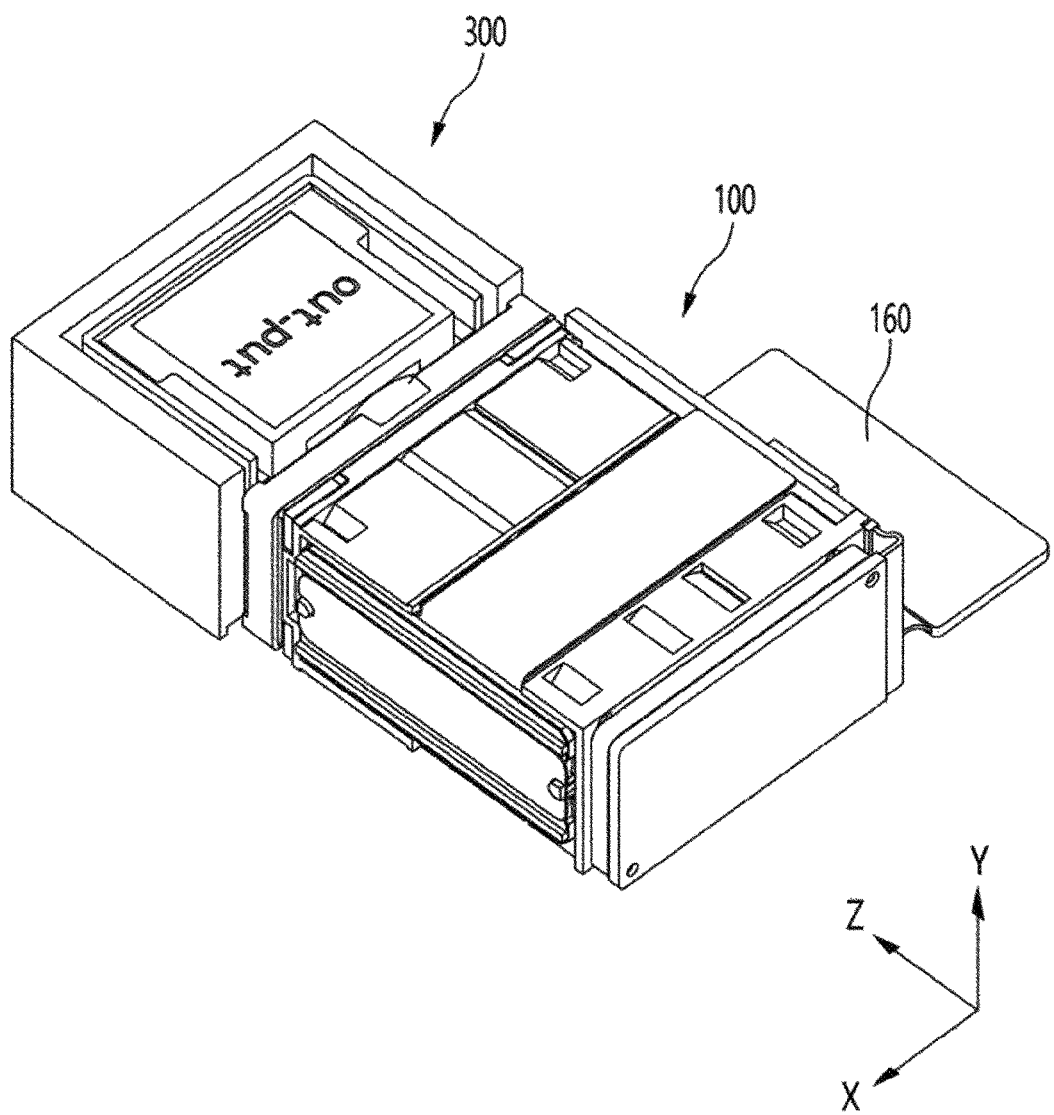
FIG. 20A is a perspective view of the camera module of FIG. 19 from which some components are omitted.
Figure 20B:
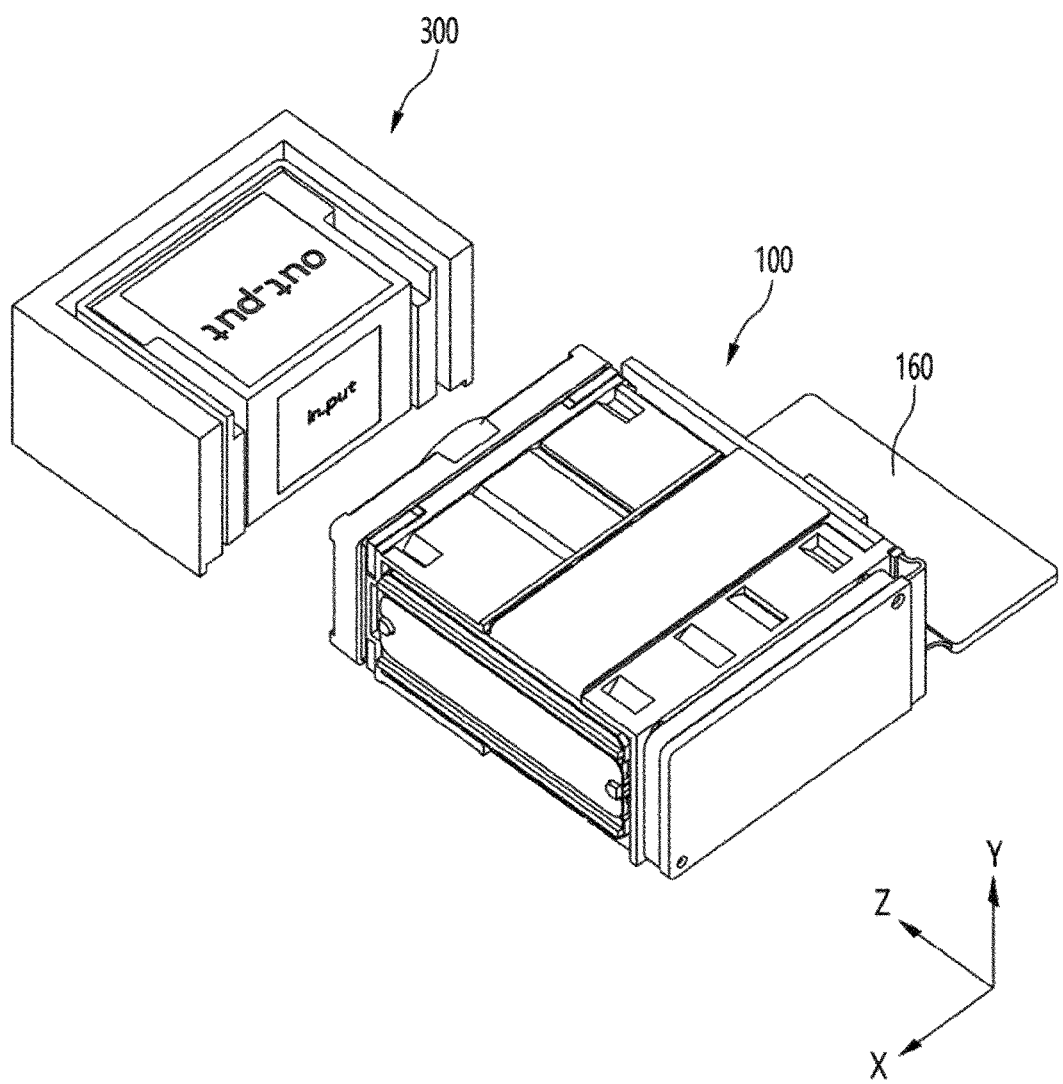
FIG. 20B is an exploded perspective view of the camera module of FIG. 20A.

FIG. 19 is a perspective view of a camera module according to another embodiment, FIG. 20A is a perspective view of the camera module of FIG. 19 from which some components are omitted, and FIG. 20B is an exploded perspective view of the camera module of FIG. 20A.

Referring to FIGS. 19, 20A, and 20B, a camera module 1000A according to another embodiment may include one or a plurality of camera actuators. For example, the camera module 1000A according to the embodiment may include a second camera actuator 100 and a first camera actuator 300. The camera module according to the embodiment may include a case 100c protecting the second camera actuator 100 and the first camera actuator 300. Here, the case 100c may correspond to the aforementioned cover. As described above, the camera module may be used interchangeably with a 'camera apparatus', a 'camera device', and the like.

The second camera actuator 100 may be electrically connected to a first substrate 160. The second camera actuator 100 may support one or a plurality of lenses and perform an auto focusing function or a zoom function by moving the lens in an optical axis direction, based on a control signal from a predetermined controller.

In addition, the first camera actuator 300 may be electrically connected to a second substrate (not shown). The second substrate may be electrically connected to the first substrate 160. The first camera actuator 300 may be an optical image stabilizer (OIS) actuator. In this case, light incident from the outside may be incident on the first camera actuator 300. In addition, the light incident on the first camera actuator 300 may change its path and be incident on the second camera actuator 100, and the light passing through the second camera actuator 100 may be transmitted to an optical sensor (not shown).

Hereinafter, the zoom or AF actuator as the second camera actuator 100 will be described first, and then the OIS actuator as the first camera actuator 300 will be described. Also, in this embodiment, the above description of the first camera actuator may be equally applied to the second camera actuator 100. In addition, in this embodiment, the above description of the second camera actuator may be equally applied to the first camera actuator 300.

<Second Camera Actuator 100>

Now, the second camera actuator 100 will be described.

Figure 21:
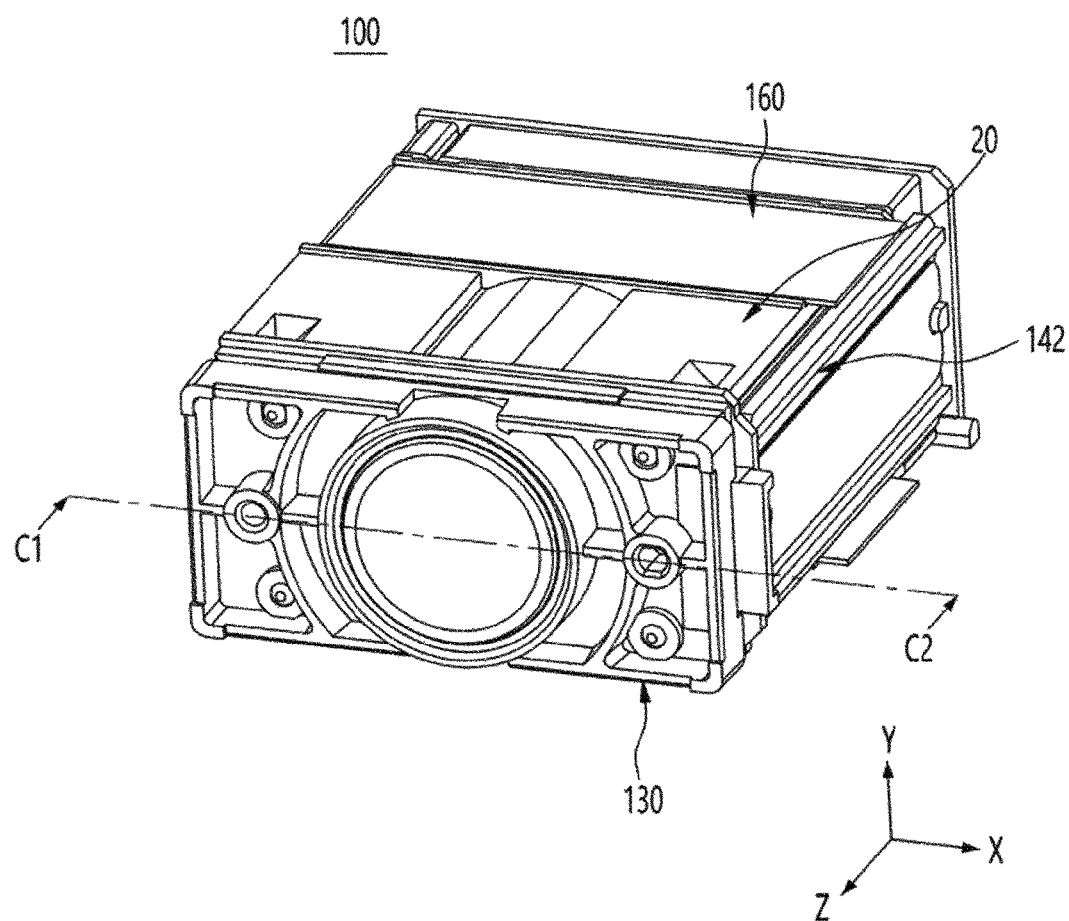
FIG. 21 is a perspective view of a first camera actuator according to an embodiment.
Figure 22:
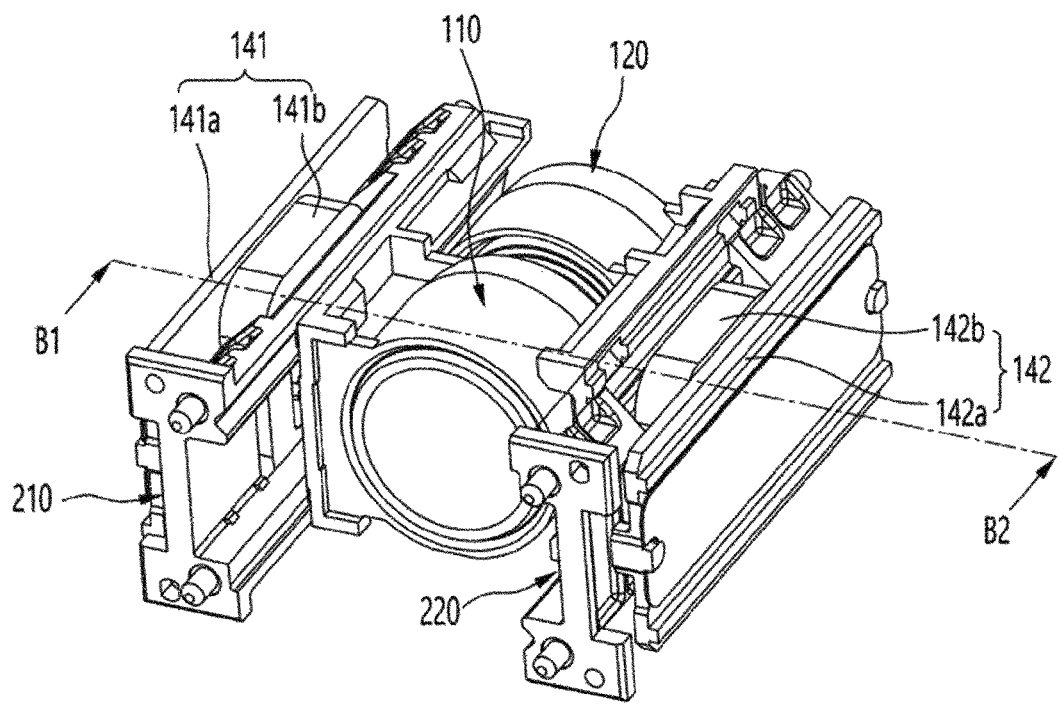
FIG. 22 is a perspective view of the camera actuator according to the embodiment shown in FIG. 21 from which some components are omitted.
Figure 23:
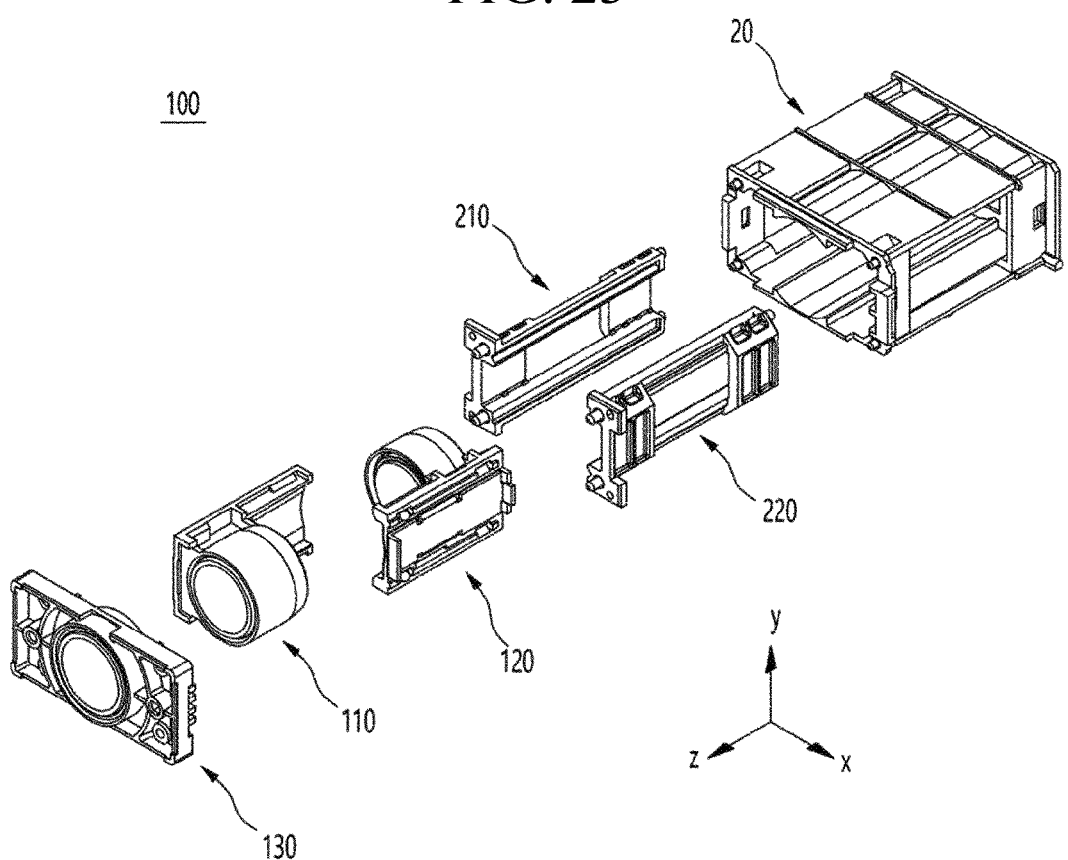
FIG. 23 is an exploded perspective view of the camera actuator according to the embodiment shown in FIG. 21 from which some components are omitted.

FIG. 21 is a perspective view of a second camera actuator 100 according to an embodiment, FIG. 22 is a perspective view of the camera actuator according to the embodiment shown in FIG. 21 from which some components are omitted, and FIG. 23 is an exploded perspective view of the camera actuator according to the embodiment shown in FIG. 21 from which some components are omitted.

Referring to FIG. 21, the second camera actuator 100 according to the embodiment may include a base 20, a first substrate 160 disposed outside the base 20, a fourth driving unit 142, and a third lens assembly 130.

FIG. 22 is a perspective view in which the base 20 and the first substrate 160 of FIG. 21 are omitted. Referring to FIG. 22, the second camera actuator 100 according to the embodiment may include a first guide part 210, a second guide part 220, a first lens assembly 110, a second lens assembly 120, a third driving unit 141, and a fourth driving unit 142.

The third driving unit 141 and the fourth driving unit 142 may include coils or magnets.

For example, when the third driving unit 141 and the fourth driving unit 142 include coils, the third driving unit 141 may include a first coil unit 141b and a third yoke 141a, and the fourth driving unit 142 may include a second coil unit 142b and a fourth yoke 142a.

Alternatively, the third driving unit 141 and the fourth driving unit 142 may include magnets. However, the description is based on the coil.

In the directions of the x-y-z axes shown in FIG. 23, as described above, the z-axis may refer to an optical axis direction or its parallel direction, the xz plane may indicate the ground, the x-axis may refer to a direction perpendicular to the z-axis on the ground (xz plane), and the y-axis may refer to a direction perpendicular to the ground.

Referring to FIG. 23, the second camera actuator 100 according to the embodiment may include a base 20, a first guide part 210, a second guide part 220, a first lens assembly 110, a second lens assembly 120, and a third lens assembly 130. The base 20 may correspond to the aforementioned second housing. Also, the second lens assembly 120 and the third lens assembly 130 may correspond to the lens assembly of the above-described second camera actuator. Also, the first guide part 210 and the second guide part 220 may correspond to the above-described guide pin. Also, the third driving unit 141 and the fourth driving unit 142 may correspond to the above-described fourth and fifth coils or the above-described fourth and fifth magnets.

For example, the second camera actuator 100 according to the embodiment may include the base 20, the first guide part 210 disposed on one side of the base 20, the second guide part 220 disposed on the other side of the base 20, the first lens assembly 110 corresponding to the first guide part 210, the second lens assembly 120 corresponding to the second guide part 220, a first ball bearing 117 (see FIG. 25A) disposed between the first guide part 210 and the first lens assembly 110, and a second ball bearing (not shown) disposed between the second guide part 220 and the second lens assembly 120.

In addition, the embodiment may include the third lens assembly 130 disposed in front of the first lens assembly 110 in the optical axis direction.

Hereinafter, specific features of the camera module according to the embodiment will be described in detail with reference to the drawings.

<Guide Part>

Referring to FIGS. 22 and 23, the embodiment may include the first guide part 210 disposed adjacent to a first sidewall of the base 20, and the second guide part 220 disposed adjacent to a second sidewall of the base 20. The first and second sidewalls of the base 20 may form an accommodation space therein and may be disposed facing each other with the accommodation space interposed therebetween. In addition, the first guide part 210 and the second guide part 220 may be disposed in the accommodation space formed through the first and second sidewalls of the base 20. Specifically, the first guide part 210 may be disposed adjacent to the inner surface of the first sidewall of the base 20 in the accommodation space. In addition, the second guide part 220 may be disposed adjacent to the inner surface of the second sidewall of the base 20 in the accommodation space.

The first guide part 210 may be disposed between the first lens assembly 110 and the first sidewall of the base 20.

The second guide part 220 may be disposed between the second lens assembly 120 and the second sidewall of the base 20. The first and second sidewalls of the base may be disposed to face each other.

According to the embodiment, as the lens assembly is driven in a state where the first guide part 210 and the second guide part 220, which are precisely numerically controlled in the base, are combined with each other, frictional torque is reduced to reduce frictional resistance. Thus, there are technical effects such as improvement of driving force during zooming, reduction of power consumption, and improvement of control characteristics.

Therefore, according to the embodiment, there are technical effects that can significantly improve image quality or resolution by minimizing frictional torque during zooming while inhibiting lens decent, lens tilt, and misalignment of the central axis of the lens group and image sensor.

In a typical case where a guide rail is arranged on the base itself, there is a technical problem that it is difficult to manage the dimensions due to occurrence of gradient depending on an injection direction, and the friction torque increases and the driving force decreases when the injection is not performed properly.

However, according to the embodiment, because the first guide part 210 and the second guide part 220 formed and assembled separately from the base 20 are employed separately without the guide rail disposed on the base itself, there is a special technical effect that can inhibit the occurrence of gradient depending on the injection direction.

The base 20 may be injected in the Z-axis direction. In a typical case where the rail is integrally formed with the base, there is a problem in that the straight line of the rail is distorted due to a gradient occurring as the rail is injected in the Z-axis direction.

According to the embodiment, because the first guide part 210 and the second guide part 220 are injected separately from the base 20, it is possible to significantly inhibit the occurrence of gradient compared to the typical case, resulting in a special technical effect that enables precise injection and inhibits the occurrence of gradient due to injection.

In the embodiment, the first guide part 210 and the second guide part 220 are injected in the X-axis, and the injection length may be shorter than the base 20. In this case, when rails 212 and 222 are disposed on the first guide part 210 and the second guide part 220, the occurrence of gradient during injection can be minimized and there is a technical effect that the possibility of the straight line of the rail being distorted is low.

Figure 24:
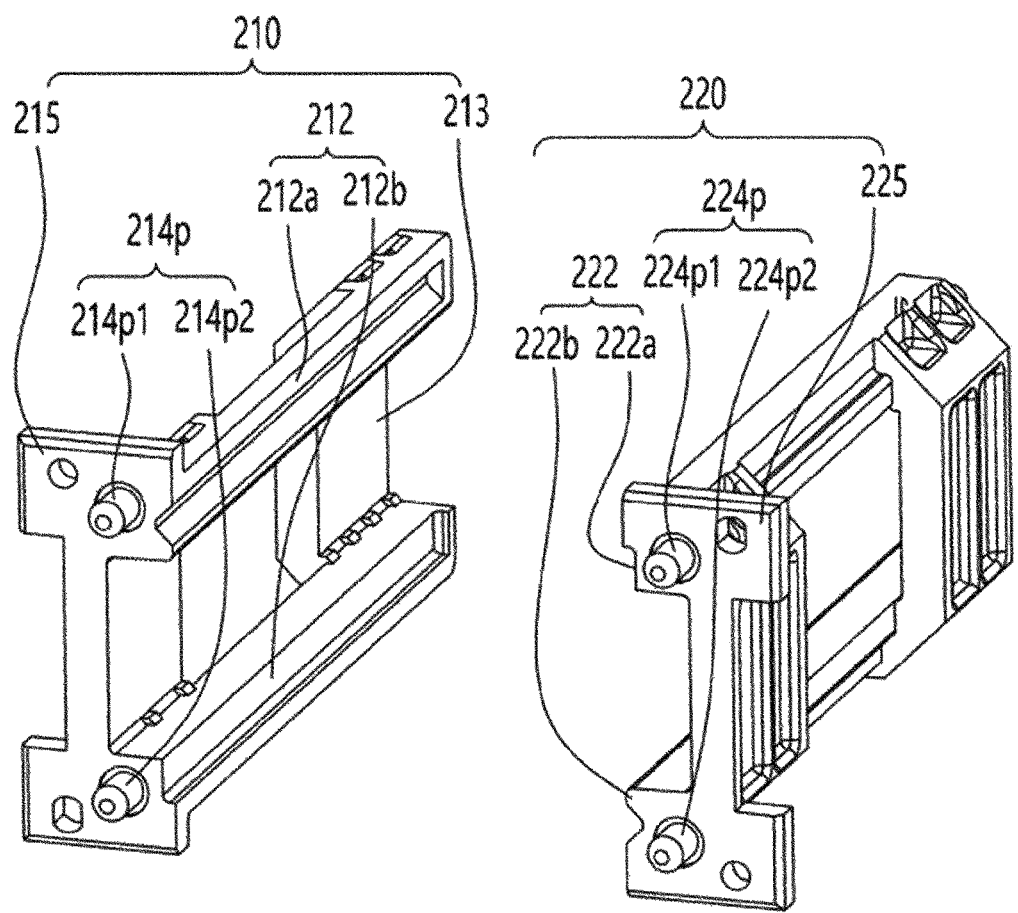
FIG. 24 is an enlarged perspective view of a first guide part and a second guide part in a camera actuator according to an embodiment.

FIG. 24 is an enlarged perspective view of a first guide part 210 and a second guide part 220 in a camera actuator according to an embodiment.

Referring to FIG. 24, in the embodiment, the first guide part 210 may include a single or a plurality of first rails 212. Also, the second guide part 220 may include a single or a plurality of second rails 222.

For example, the first rail 212 of the first guide part 210 may include a first-first rail 212a and a first-second rail 212b. The first guide part 210 may include a first support part 213 between the first-first rail 212a and the first-second rail 212b.

According to the embodiment, because each lens assembly has rails, there is a technical effect of securing the movement accuracy of the lens assembly with the other rail even if one rail is distorted.

In addition, according to the embodiment, because each lens assembly has two rails, even if there is an issue of the frictional force of the ball, which will be described later, on one rail, the rolling drive proceeds smoothly on the other rail, and there is a technical effect of securing a driving force for the movement of the lens assembly.

The first rail 212 may be connected from one surface to the other surface of the first guide part 210.

The camera actuator according to the embodiment and the camera module including the same can solve the problem of lens decentering or tilting during zooming, and can properly align and adjust spacing between a plurality of lens groups. Therefore, there is a technical effect of significantly improving image quality or resolution by inhibiting a change in angle of view or out of focus.

For example, according to the embodiment, because the first guide part 210 includes the first-first rail 212a and the first-second rail 212a, and the first-first rail 212a and the first-second rail 212a guide the first lens assembly 110, there is a technical effect of increasing alignment accuracy.

In addition, according to the embodiment, because each lens assembly has rails, there are technical effects that can secure a wide distance between balls, which will be described later, improve driving force, inhibit magnetic field interference, and inhibit tilting in a stationary or moving state of the lens assembly.

The first guide part 210 may include a first guide protrusion 215 extending in a lateral direction perpendicular to the extending direction of the first rail 212.

A first protrusion 214p may be included on the first guide protrusion 215. For example, the first protrusion 214p may include a first-first protrusion 214p1 and a first-second protrusion 214p2.

Also, referring to FIG. 24, in the embodiment, the second guide part 220 may include a single or a plurality of second rails 222.

For example, the second rail 222 of the second guide part 220 may include a second-first rail 222a and a second-second rail 222b. The second guide part 220 may include a second support part (not shown) between the second-first rail 222a and the second-second rail 222b.

The second rail 222 may be connected from one surface to the other surface of the second guide part 220.

In addition, the second guide part 220 may include a second guide protrusion 225 extending in a lateral direction perpendicular to a direction in which the second rail 222 extends.

A second protrusion 224p including a second-first protrusion 224p1 and a second-second protrusion 224p2 may be included on the second guide protrusion 225.

The first-first protrusion 214p1 and the first-second protrusion 214p2 of the first guide part 210 and the second-first protrusion 224p1 and the second-second protrusion 224p2 of the second guide part 220 may be combined with the third lens assembly 130 to be described later.

According to the embodiment, because the first guide part 210 includes the first-first rail 212a and the first-second rail 212b, and the first-first rail 212a and the first-second rail 212b guide the first lens assembly 110, there is a technical effect of increasing alignment accuracy.

In addition, according to the embodiment, because the second guide part 220 includes the second-first rail 222a and the second-second rail 222b, and the second-first rail 222a and the second-second rail 222b guide the second lens assembly 120, there is a technical effect of increasing alignment accuracy.

In addition, because each lens assembly has rails, there is a technical effect of securing the movement accuracy of the lens assembly with the other rail even if one rail is distorted.

In addition, according to the embodiment, because each lens assembly has rails, there are technical effects that can secure a wide distance between balls, which will be described later, improve driving force, inhibit magnetic field interference, and inhibit tilting in a stationary or moving state of the lens assembly.

In addition, according to the embodiment, because each lens assembly has rails, even if there is an issue of the frictional force of the ball, which will be described later, on one rail, the rolling drive proceeds smoothly on the other rail, and there is a technical effect of securing a driving force.

In addition, according to the embodiment, because the first guide part 210 and the second guide part 220 are formed and assembled separately from the base 20 without the guide rail disposed on the base itself, there is a special technical effect that can inhibit the occurrence of gradient depending on the injection direction of the integral structure of the base and the guide rail.

In a typical case where a guide rail is arranged on the base itself, there is a technical problem that it is difficult to manage the dimensions due to occurrence of gradient depending on an injection direction, and the friction torque increases and the driving force decreases when the injection is not performed properly.

Figure 25A:
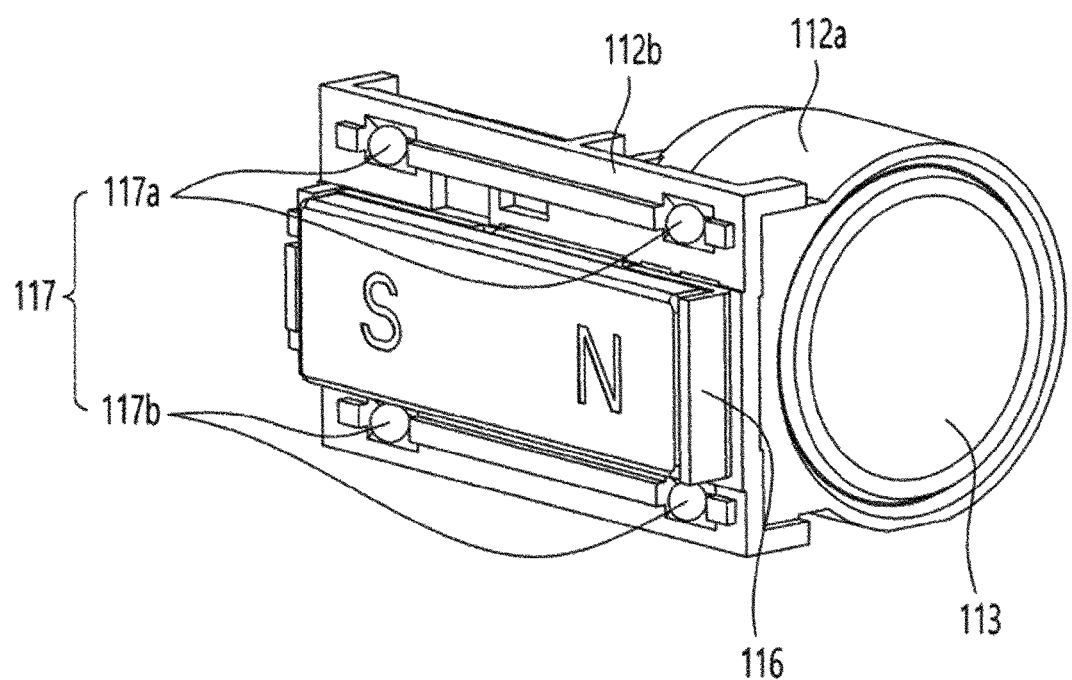
FIG. 25A is a perspective view of a first lens assembly in the camera actuator according to the embodiment shown in FIG. 23.
Figure 25B:
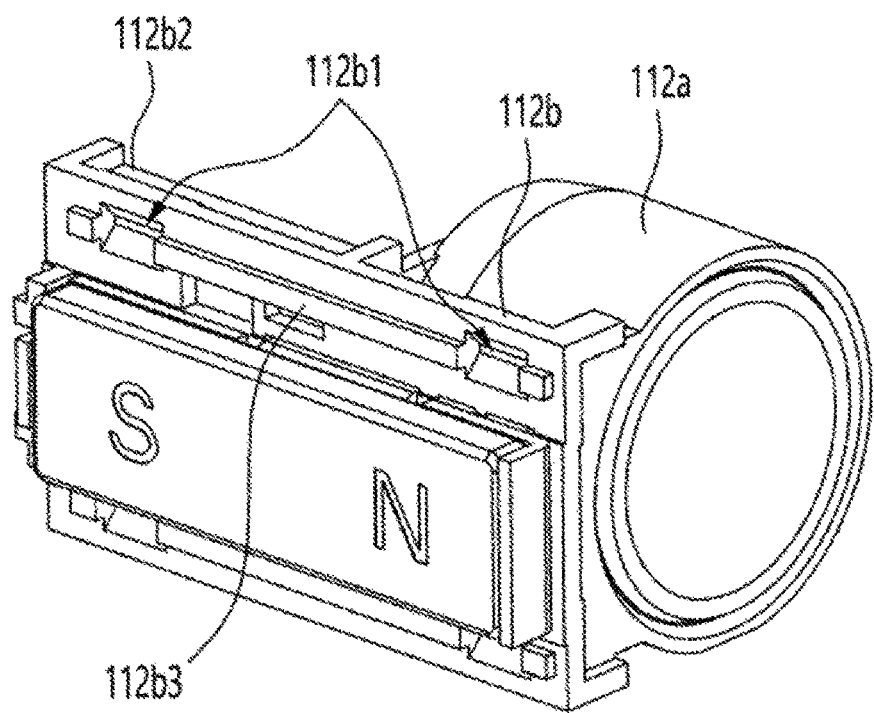
FIG. 25B is a perspective view of the first lens assembly shown in FIG. 25A from which some components are removed.

FIG. 25A is a perspective view of a first lens assembly in the camera actuator according to the embodiment shown in FIG. 23, and FIG. 25B is a perspective view of the first lens assembly shown in FIG. 25A from which some components are removed.

Referring to FIG. 24, the embodiment may include the first lens assembly 110 moving along the first guide part 210 and the second lens assembly 120 moving along the second guide part 220.

Referring to FIG. 25A, the first lens assembly 110 may include a first lens barrel 112a in which a first lens 113 is disposed, and a first driving unit housing 112b in which a first driving unit 116 is disposed. The first lens barrel 112a and the first driving unit housing 112b may be a first housing, and the first housing may have a barrel or tubular shape. The first driving unit 116 may be, but is not limited to, a magnet driving unit, and a coil may be disposed in some cases.

In addition, the second lens assembly 120 may include a second lens barrel (not shown) in which a second lens (not shown) is disposed, and a second driving unit housing (not shown) in which a second driving unit (not shown) is disposed. The second lens barrel (not shown) and the second driving unit housing (not shown) may be a second housing, and the second housing may have a barrel or tubular shape. The second driving unit may be, but it not limited to, a magnet driving unit, and a coil may be disposed in some cases. In this case, the second lens assembly 120 may have substantially the same structure as the first lens assembly 110, and thus a detailed description thereof will be omitted.

The first driving unit 116 may correspond to the two first rails 212 and the second driving unit may correspond to the two second rails 222.

In the embodiment, the lens assembly may be driven or moved using a single ball or a plurality of balls. For example, in the embodiment, the first ball bearing 117 disposed between the first guide part 210 and the first lens assembly 110 and a second ball bearing (not shown) disposed between the second guide part 220 and the second lens assembly 120 may be included.

For example, in the embodiment, the first ball bearing 117 may include a single or a plurality of first-first ball bearings 117a disposed at an upper portion of the first driving unit housing 112b and a single or a plurality of first-second ball bearings 117b disposed at a lower portion of the first driving unit housing 112b.

In the embodiment, the first-first ball bearing 117a among the first ball bearings 117 may move along the first-first rail 212a, which is one of the first rails 212, and the first-second ball bearing 117b among the first ball bearings 117 may move along the first-second rail 212b, which is the other of the first rails 212.

The camera actuator according to the embodiment and the camera module including the same can solve the problem of lens decentering or tilting during zooming, and can properly align and adjust spacing between a plurality of lens groups. Therefore, there is a technical effect of significantly improving image quality or resolution by inhibiting a change in angle of view or out of focus.

For example, according to the embodiment, because the first guide part includes the first-first rail and the first-second rail, and the first-first rail and the first-second rail guide the first lens assembly 110, there is a technical effect of increasing the accuracy of aligning the second lens assembly 110 and the optical axis when the first lens assembly 110 moves.

Referring to FIG. 25B, in the embodiment, the first lens assembly 110 may have a first assembly groove 112b1 in which the first ball bearing 117 is disposed. The second lens assembly 120 may have a second assembly groove (not shown) in which the second ball is disposed.

The first assembly groove 112b1 of the first lens assembly 110 may be plural. In this case, a distance between two first assembly grooves 112b1 among the plurality of first assembly grooves 112b1 in the optical axis direction may be greater than a thickness of the first lens barrel 112a.

In the embodiment, the first assembly groove 112b1 of the first lens assembly 110 may have a V shape. Also, the second assembly groove (not shown) of the second lens assembly 120 may have a V shape. The first assembly groove 112b1 of the first lens assembly 110 may have, other than the V shape, a U shape or a shape that contacts the first ball bearing 117 at two or three points. Also, the second assembly groove (not shown) of the second lens assembly 120 may have, other than the V shape, a U shape or a shape that contacts the first ball bearing 117 at two or three points. By these various shapes, distortion due to tolerance can be easily solved.

Figure 26:
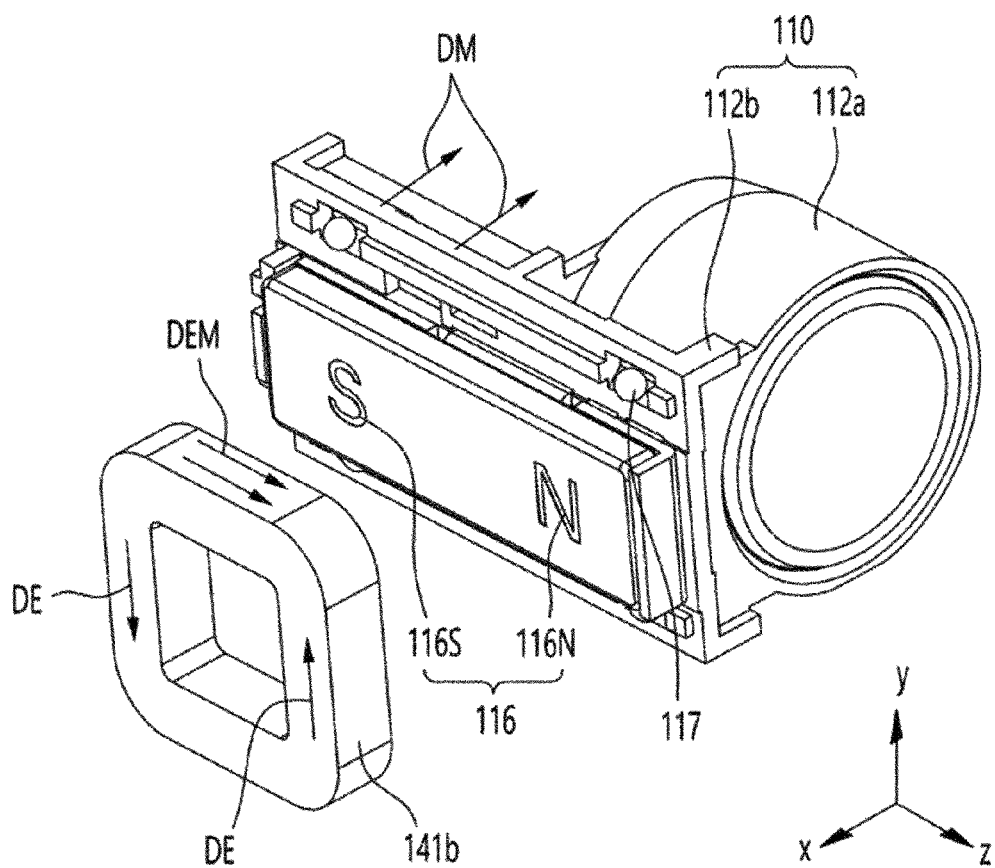
FIG. 26 is an exemplary view of driving in a camera actuator according to an embodiment.

FIG. 26 is an exemplary view of driving in a camera actuator according to an embodiment.

An interaction in which electromagnetic force (DEM) is generated between the first driving unit 116, which is a magnet driving unit, and the first coil unit 141b in the camera actuator according to the embodiment will be described with reference to FIG. 26.

As shown in FIG. 26, in the camera actuator according to the embodiment, the magnetization type of the first driving unit 116 may be a perpendicular magnetization type. For example, in the embodiment, both the N pole 116N and the S pole 116S of the magnet may be magnetized to face the first coil unit 141b. Accordingly, the N pole 116N and the S pole 116S of the magnet may be respectively disposed to correspond to a region in which current flows in the y-axis direction perpendicular to the ground in the first coil unit 141b. In this embodiment, the first driving unit 116 may correspond to any one of the above-described fourth and fifth magnets, and the second driving unit 126 may correspond to the other of the fourth and fifth magnets. Also, in this embodiment, the first to fourth driving units correspond to the magnets and coils of the above-described second driving unit.

Referring to FIG. 26, in the embodiment, when the magnetic force (DM) is applied in the opposite direction to the x-axis from the N pole 116N of the first driving unit 116 (the direction of the magnetic force may be the positive or negative direction of the illustrated direction), and when the current (DE) flows in the y-axis direction in the first coil unit 141b region corresponding to the N pole 116N, the electromagnetic force (DEM) acts in the z-axis direction in accordance with Fleming's left hand rule.

In addition, in the embodiment, when the magnetic force (DM) is applied in the x-axis direction from the S pole 116S of the first driving unit 116, and when the current (DE) flows in the direction opposite to the y-axis perpendicular to the ground in the first coil unit 141b corresponding to the S pole 116S, the electromagnetic force (DEM) acts in the z-axis direction in accordance with Fleming's left-hand rule (the direction of the electromagnetic force may be the positive or negative direction of the illustrated direction).

At this time, because the third driving unit 141 including the first coil unit 141b is in a fixed state, the first lens assembly 110, which is a mover in which the first driving unit 116 is disposed, may move back and forth along the rail of the first guide part 210 in a direction parallel to the z-axis direction by the electromagnetic force (DEM) depending on the current direction. The electromagnetic force (DEM) may be controlled in proportion to the current (DE) applied to the first coil unit 141b.

Likewise, in the camera actuator according to the embodiment, the electromagnetic force (DEM) between the second magnet (not shown) and the second coil unit 142b is generated, so that the second lens assembly 120 can move along the rail of the second guide part 220 to be parallel to the optical axis.

<First Substrate>

Figure 27A:
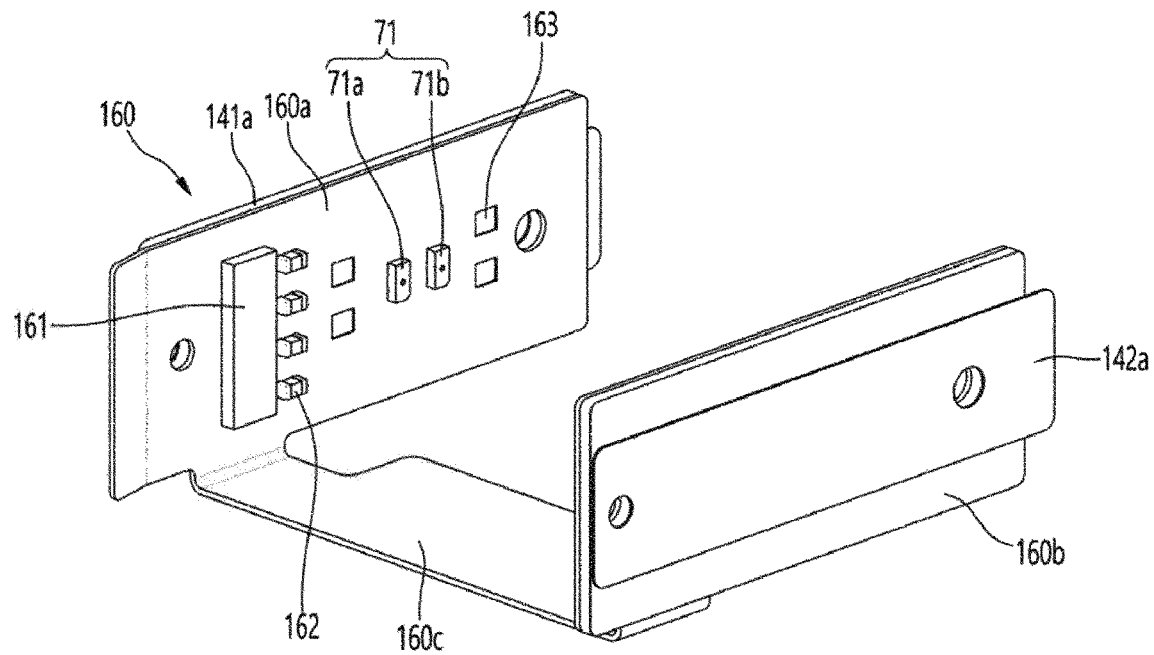
FIG. 27A is a perspective view of a first substrate from which a first coil unit is removed according to the first embodiment, viewed from a first direction.
Figure 27B:
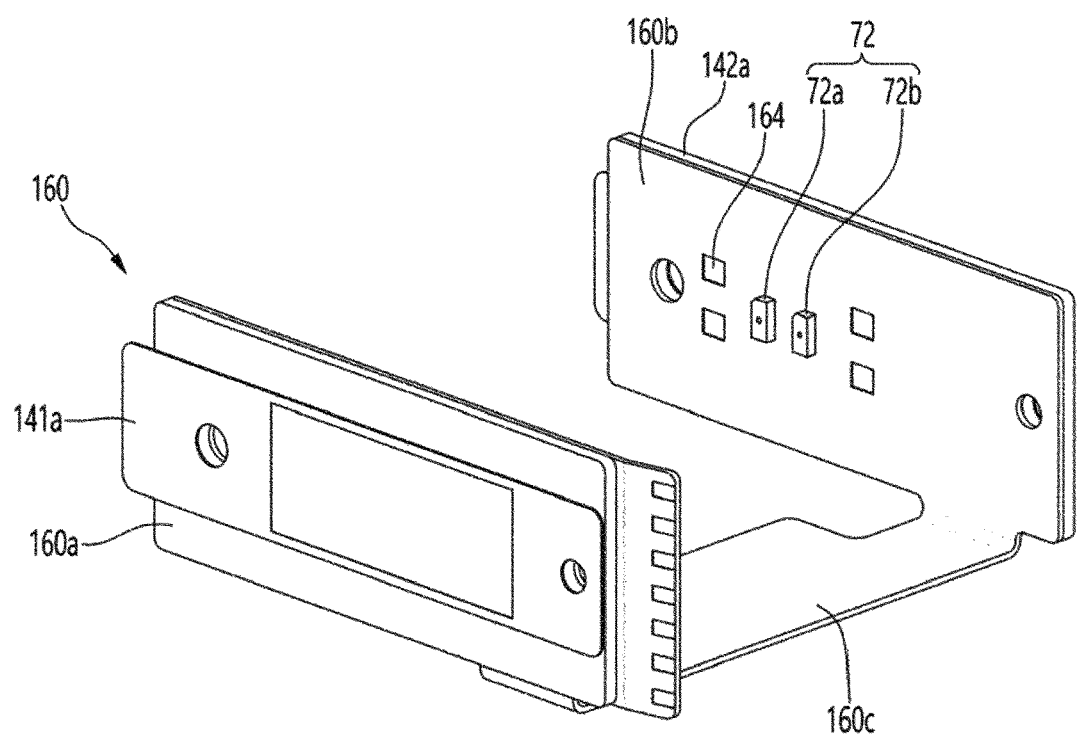
FIG. 27B is a perspective view of the first substrate from which the first coil unit is removed according to the first embodiment, viewed from a second direction.
Figure 27C:
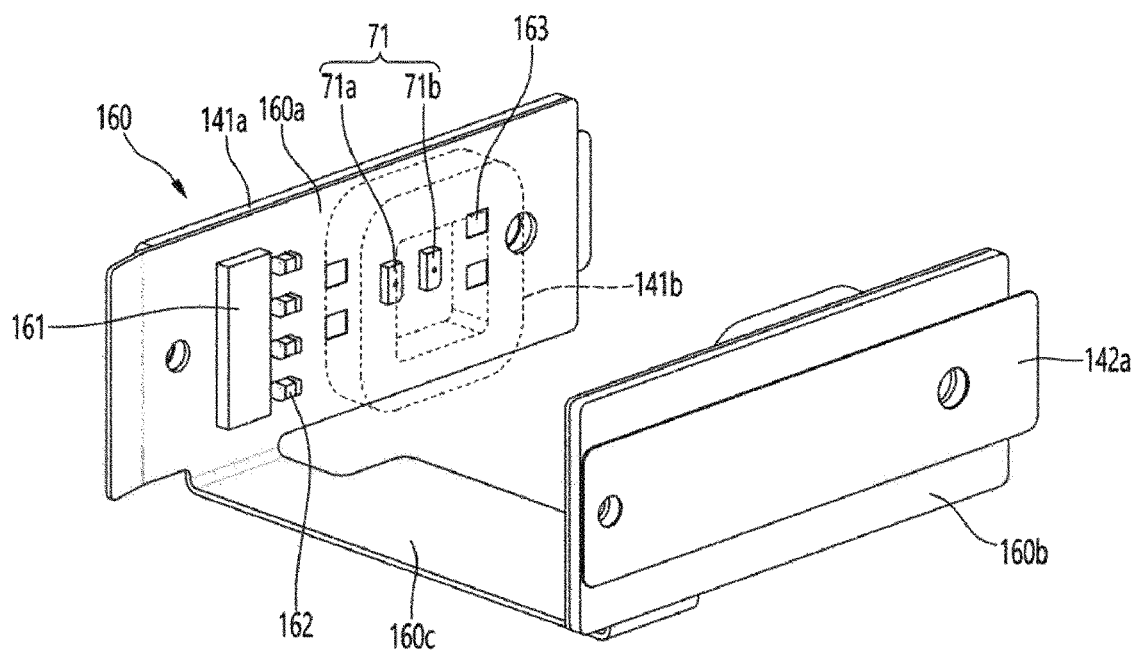
FIG. 27C is a perspective view showing the first substrate on which the first coil unit is disposed according to the first embodiment.
Figure 28A:
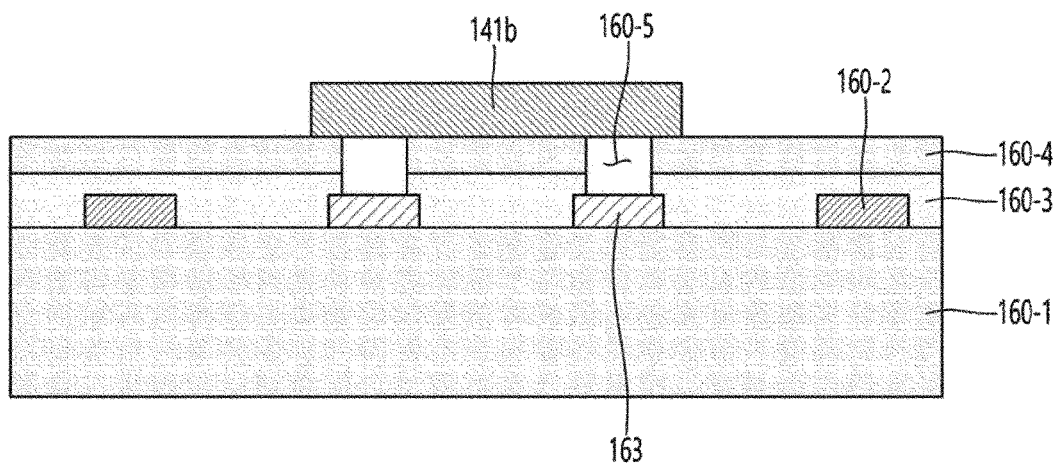
FIG. 28A is a cross-sectional view of the first substrate according to the first embodiment.
Figure 28B:
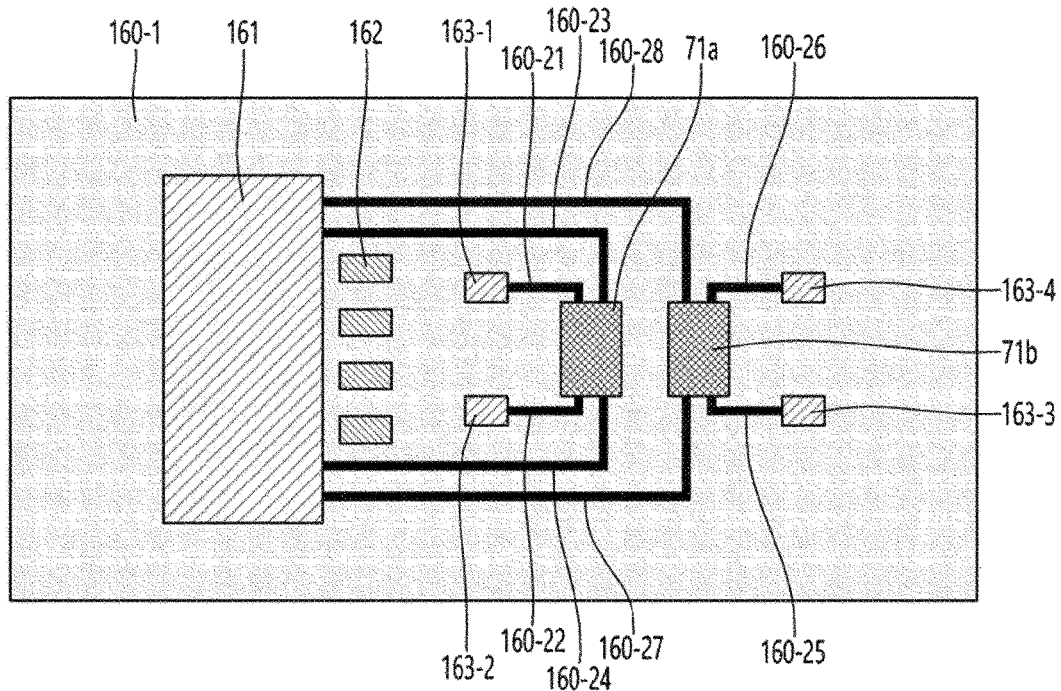
FIG. 28B is a plan view of the first substrate from which the first coil unit is removed according to the first embodiment.
Figure 28C:
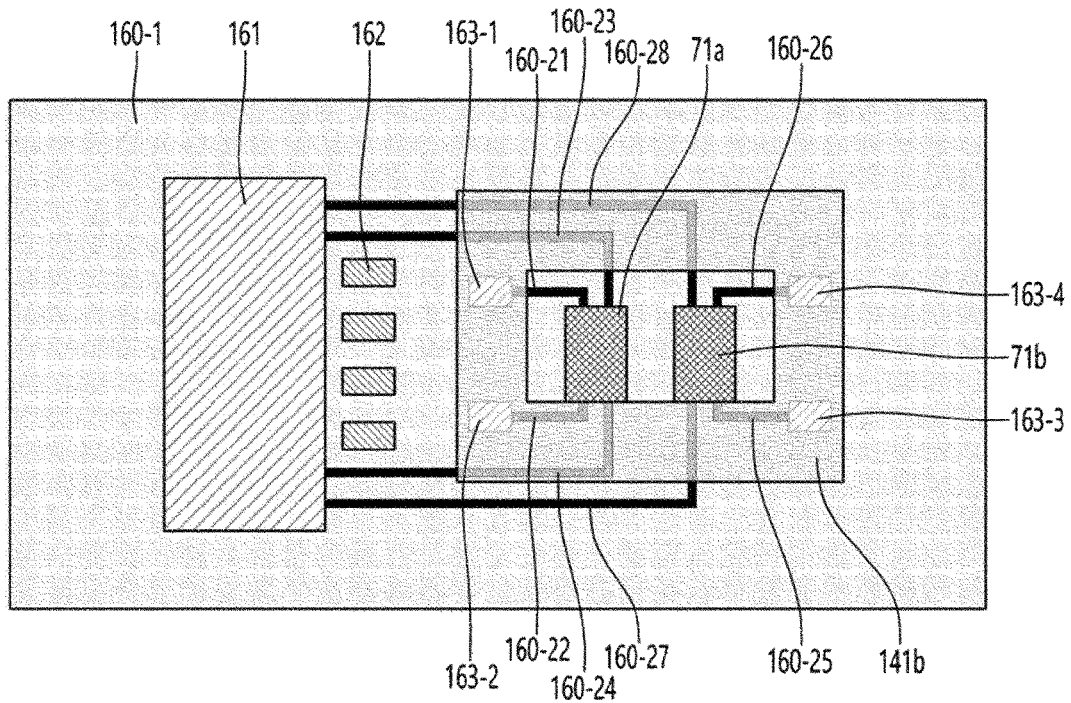
FIG. 28C is a plan view of the first substrate on which the first coil unit is disposed according to the first embodiment.

FIG. 27A is a perspective view of a first substrate from which a first coil unit is removed according to the first embodiment, viewed from a first direction, FIG. 27B is a perspective view of the first substrate from which the first coil unit is removed according to the first embodiment, viewed from a second direction, FIG. 27C is a perspective view showing the first substrate on which the first coil unit is disposed according to the first embodiment, FIG. 28A is a cross-sectional view of the first substrate according to the first embodiment, FIG. 28B is a plan view of the first substrate from which the first coil unit is removed according to the first embodiment, and FIG. 28C is a plan view of the first substrate on which the first coil unit is disposed according to the first embodiment.

Hereinafter, the first substrate according to the first embodiment will be described with reference to FIGS. 27A to 28C. The first substrate may correspond to the above-described second substrate unit.

Prior to the description of the first board, when AF or Zoom is implemented, a plurality of lens assemblies are driven by electromagnetic force between a magnet and a coil. In order to obtain positional information of the lens assembly, a position detection sensor may be placed inside the winding of the coil. Here, the position detection sensor may be a magnetic sensor capable of detecting a change in magnetic force. For example, the position detection sensor may be, but is not limited to, a Hall sensor. However, in the following description, it is assumed that the position detection sensor is a Hall sensor.

The Hall sensor is disposed inside the winding of the coil, and the inside of the winding of the coil may be a hollow part of the coil. The Hall sensor may obtain positional information of the lens assembly by detecting a change in magnetic flux of a magnet disposed in the lens assembly.

However, typically, the driver IC and the Hall sensor for controlling the movement of the lens assembly are disposed on separate substrates. In this case, the mounting state of the Hall sensor can be tested by measuring the Hall resistance of the Hall sensor in a mounted state. However, recently, both the driver IC and the Hall sensor are mounted on a single substrate for the purpose of slimming the camera module, control accuracy, or the like. Also, the Hall sensor mounted on the substrate is connected to the driver IC.

In this case, a plurality of pads are formed on the substrate, and all of the pads are connected to the driver IC. Also, the Hall sensor is only connected to the driver IC and is not directly connected to the Hall sensor.

Here, the Hall sensor is mounted on the first substrate 160 through surface mount technology (SMT) or the like. In this case, about 3% to 4% of short-circuit defects occur in the SMT process of the Hall sensor. However, the substrate has no pad connected to the Hall sensor, so that there is a problem in that a mounting state of the Hall sensor cannot be tested. That is, checking the mounting state of the Hall sensor is made through the measurement of Hall resistance, and in order to check the mounting state of the Hall sensor, a test should be performed through a pad connected to the driver IC. However, because the pad is connected to the Hall sensor through the driver IC rather than directly connected to the Hall sensor, a direct test of the Hall sensor is impossible.

Accordingly, in the embodiment, a test pad directly connected to the Hall sensor is formed on the first substrate 160 to test the mounting state of the Hall sensor.

The first substrate 160 may be connected to a predetermined power supply unit (not shown) to supply power to each of the third driving unit 141 and the fourth driving unit 142. Specifically, the first substrate 160 may include the first coil unit 141b of the third driving unit 141. In addition, the first substrate 160 may supply power to the first coil unit 141b. Also, the first substrate 160 may include the second coil unit 142b of the fourth driving unit 142. In addition, the first substrate 160 may supply power to the second coil unit 142b. The first substrate 160 may include a circuit board having an electrically connectible wiring pattern, such as a rigid printed circuit board (Rigid PCB), a flexible printed circuit board (Flexible PCB), and a rigid flexible printed circuit board (Rigid Flexible PCB).

The first substrate 160 includes a first substrate area 160a, a second substrate area 160b, and a third substrate area 160c.

The first substrate area 160a may be disposed outside the first sidewall of the base 20. In addition, the second substrate area 160b may be disposed outside the second sidewall of the base 20. Also, the third substrate area 160c may connect the first substrate area 160a and the second substrate area 160b. The third substrate area 160c may be disposed outside the bottom portion of the base 20.

The driver IC 161 may be disposed on one surface of the first substrate area 160a. The driver IC 161 may receive sensing information obtained from a gyro sensor (not shown) and control the magnitude of current or voltage supplied to the first coil unit 141b by using the received sensing information. In addition, the driver IC 161 may control the magnitude of the current or voltage supplied to the first coil unit 141b, based on the zoom magnification or the focus position information corresponding to the zoom magnification. In addition, the driver IC 161 may receive sensing information obtained from a gyro sensor (not shown) and control the magnitude of current or voltage supplied to the second coil unit 142b by using the received sensing information. In addition, the driver IC 161 may control the magnitude of the current or voltage supplied to the first coil unit 142b, based on the zoom magnification or the focus position information corresponding to the zoom magnification.

On the first substrate area 160a, electronic components 162 other than the driver IC 161 may also be disposed. The electronic component 162 may be, but is not limited to, a capacitor. For example, the electronic component 162 may be a memory that stores control information for controlling the magnitude of current or voltage supplied to the first coil unit 141b or the second coil unit 142b.

Meanwhile, although it is depicted in the drawing that the driver IC 161 and the electronic component 162 are disposed in the first substrate area 160a of the first substrate 160, this is not a limitation. For example, the driver IC 161 and the electronic component 162 may be disposed on the second substrate area 160b of the first substrate 160. For example, one of the driver IC 161 and the electronic component 162 may be disposed on the first substrate area 160a of the first substrate 160, and the other may be disposed on the second substrate area 160*b* of the first substrate 160.

The first coil unit 141*b* of the third driving unit 141 is disposed in the first substrate area 160*a* of the first substrate 160.

In addition, the first Hall sensor 71 may be disposed in the inner region of the first coil unit 141*b*. In this case, in the embodiment, a plurality of first Hall sensors may be disposed in the inner region of the first coil unit 141*b*. For example, a first-first Hall sensor 71*a* and a first-second Hall sensor 71*b* spaced apart from each other in the optical axis direction may be disposed in the inner region of the first coil unit 141*b*. That is, as the zoom magnification of the camera module increases recently, the stroke of the lens assembly increases, and accordingly, it may be difficult to accurately detect the position of the lens assembly using only one Hall sensor. Therefore, in the embodiment, a plurality of Hall sensors are used to accurately detect the position within the stroke range of the lens assembly. However, the embodiment is not limited to the above. For example, the first Hall sensor 71 may be implemented with a single sensor, or may be implemented with three or more sensors. Hereinafter, the first Hall sensor 71 will be described as being composed of the first-first Hall sensor 71*a* and the first-second Hall sensor 71*b*.

Meanwhile, a first test pad 163 connected to the first Hall sensor 71 is disposed in the first substrate area 160*a*. The first test pad 163 may be configured in plural. For example, the number of first test pads 163 may be determined depending on the number of first Hall sensors 71. That is, two first test pads may be disposed in the first substrate area 160*a* to correspond to one Hall sensor. For example, the first Hall sensor 71 includes the first-first Hall sensor 71*a* and the first-second Hall sensor 71*b*, and thus the first test pad 163 may include four first test pads.

The four first test pads 163 may be disposed outside the first Hall sensor 71 on one surface of the first substrate area 160*a* of the first substrate 160. For example, the four first test pads 163 may be disposed to surround the first Hall sensor 71 at positions spaced apart from the first Hall sensor 71 by a predetermined distance.

Preferably, the four first test pads 163 may be disposed in a region corresponding to the first coil unit 141*b* on one surface of the first substrate area 160*a*. For example, the four first test pads 163 may be disposed to overlap with the first coil unit 141*b* on one side of the first substrate area 160*a*. Preferably, the four first test pads 163 may be disposed to overlap with a direction (e.g., the x-axis direction in FIG. 26) perpendicular to the optical axis.

Accordingly, at least a part of one surface of the first coil unit 141*b* may be disposed directly facing the four first test pads 163. This will be described in detail below.

That is, in order to test the mounting state of the first Hall sensor 71, the four first test pads 163 on the first substrate 160 should be exposed to the outside. In addition, after the test of the first Hall sensor 71 is completed, the exposed portion of the first test pad 163 should be covered with a protective member. For example, when the first test pad 163 contacts another component while being exposed to the outside, a short circuit may occur, resulting in a reliability problem.

In this case, in the embodiment, the first coil unit 141*b* is disposed on the first test pad 163. That is, the exposed portion of the first test pad 163 is covered with the first coil unit 141*b*, and thus the first coil unit 141*b* inhibits the first test pad 163 from contacting other components. Meanwhile, the first coil unit 141*b* includes a coil pattern and a protective member (or insulating member) disposed to surround the coil pattern, and this may solve problems caused by contact between the first coil unit 141*b* and the first test pad 163.

In addition, the second coil unit 142*b* of the fourth driving unit 142 is disposed in the second substrate area 160*b* of the first substrate 160.

In addition, the second Hall sensor 72 may be disposed in the inner region of the second coil unit 142*b*. In this case, in the embodiment, a plurality of second Hall sensors may be disposed in the inner region of the second coil unit 142*b*. For example, a second-first Hall sensor 72*a* and a second-second Hall sensor 72*b* spaced apart from each other in the optical axis direction may be disposed in the inner region of the second coil unit 142*b*.

Meanwhile, a second test pad 164 connected to the second Hall sensor 72 is disposed in the second substrate area 160*b*. The second test pad 164 may be configured in plurality. For example, the number of second test pads 164 may be determined depending on the number of second Hall sensors 72. That is, two second test pads may be disposed in the second substrate area 160*b* to correspond to one Hall sensor. For example, the second Hall sensor 72 includes the second-first Hall sensor 72*a* and the second-second Hall sensor 72*b*, and thus the second test pad 164 may include four second test pads.

The four second test pads 164 may be disposed outside the second Hall sensor 72 on one surface of the second substrate area 160*b* of the first substrate 160. For example, the four second test pads 164 may be disposed to surround the second Hall sensor 72 at positions spaced apart from the second Hall sensor 72 by a predetermined distance.

Preferably, the four second test pads 164 may be disposed in a region corresponding to the second coil unit 142*b* on one surface of the second substrate area 160*b*. For example, the four second test pads 164 may be disposed to overlap with the second coil unit 142*b* on one side of the second substrate area 160*b*. Preferably, the four second test pads 164 may be disposed to overlap with a direction (e.g., the x-axis direction in FIG. 26) perpendicular to the optical axis. That is, one surface of the second substrate area 160*b* may be a surface facing the outer surface of the second sidewall of the base 20. Also, the second test pad 164 may be disposed to overlap with the second coil unit 142*b* in a direction facing the second sidewall of the base 20.

Accordingly, at least a part of one surface of the second coil unit 142*b* may be disposed directly facing each of the four second test pads 164. This will be described in detail below.

That is, in order to test the mounting state of the second Hall sensor 72, the four second test pads 164 on the first substrate 160 should be exposed to the outside. In addition, after the test of the second Hall sensor 72 is completed, the exposed portion of the second test pad 164 should be covered with a protective member. For example, when the second test pad 164 contacts another component while being exposed to the outside, a short circuit may occur, resulting in a reliability problem.

In this case, in the embodiment, the second coil unit 142*b* is disposed on the second test pad 164. That is, the exposed portion of the second test pad 164 is covered with the second coil unit 142*b*, and thus the second test pad 164 inhibits the second test pad 164 from contacting other components. Meanwhile, the second coil unit 142*b* includes a coil pattern and a protective member (or insulating member) disposed to surround the coil pattern, and this may solve problems caused by contact between the second coil unit 142*b* and the second test pad 164.

Hereinafter, the arrangement structure of the first test pad 163 and the first coil unit 141b on the first substrate 160 will be described in detail.

The first substrate 160 includes an insulating unit. The insulating unit may include an insulating layer 160-1, a first protective layer 160-3, and a second protective layer 160-4, which will be described below.

Specifically, the first substrate 160 includes the insulating layer 160-1.

The insulating layer 160-1 may be rigid or flexible.

For example, the insulating layer 160-1 may include chemically tempered/semi-tempered glass such as soda lime glass or aluminosilicate glass, may include reinforced or soft plastic such as polyimide (PI), polyethylene terephthalate (PET), propylene glycol (PPG), or polycarbonate (PC), or may include sapphire.

In addition, the insulating layer 160-1 may be partially rigid or flexible. Therefore, the first substrate 160 may partially have a flat surface and partially have a curved surface being bendable. For example, the first substrate 160 may be partially bent with a random curvature or may be bent with a surface having a random curvature.

A circuit pattern may be disposed on the insulating layer 160-1. The circuit pattern may include a first mounting pad (not shown) on which the driver IC 161 is mounted. The circuit pattern may include a second mounting pad (not shown) on which the electronic component 162 is mounted. The circuit pattern may include the first test pad 163 connected to the first Hall sensor 71. In addition, the circuit pattern may include a connection wire 160-2 connecting between the first Hall sensor 71 and the first test pad 163 or between the first Hall sensor 71 and the driver IC 161.

The first protective layer 160-3 may be disposed on the insulating layer 160-1 to cover the circuit pattern. The first protective layer 160-3 may be disposed while exposing a surface of the first test pad 163 in the circuit pattern disposed on the insulating layer 160-1. Although not shown in the drawing, the first protective layer 160-3 may be disposed while exposing a coil pad (not shown) connected to the first coil unit 141b in the circuit pattern. In this case, the first protective layer 160-3 may be a solder resist.

The second protective layer 160-4 may be disposed on the first protective layer 160-3. The second protective layer 160-4 may be a coverlay. The second protective layer 160-4 may be disposed while exposing the first test pad 163 disposed on the insulating layer 160-1.

That is, an opening 160-5 exposing the surface of the first test pad 163 may be formed in the first protective layer 160-3 and the second protective layer 160-4. Also, the first test pad 163 may be exposed in one direction of the first substrate 160 through the opening 160-5. This one direction may be a direction facing the outer surface of the first sidewall of the base 20. That is, the opening 160-5 may include a first opening region formed in the first protective layer 160-3 and a second opening region formed in the second protective layer 160-3.

Meanwhile, the first coil unit 141b may be disposed on the second protective layer 160-4. In this case, at least a portion of the first coil unit 141b may overlap with the opening 160-5 formed in the first protective layer 160-3 and the second protective layer 160-4. That is, the opening 160-5 formed in the first protective layer 160-3 and the second protective layer 160-4 may be covered by the first coil unit 141b.

That is, in the embodiment, in a state where the first Hall sensor 71 is mounted as described above, a test for the mounting state may be performed by using the first test pad 163 exposed through the opening 160-5 and measuring the resistance of the first Hall sensor 71. When the test for the mounting state of the first Hall sensor 71 is completed, the first coil unit 141b is disposed on the opening 160-5. That is, in the embodiment, the exposed portion of the first test pad 163 is covered using the first coil unit 141b.

According to this, in the embodiment, an additional protective layer for protecting the first test pad 163 is unnecessary, the manufacturing process can be simplified by not having to perform an additional process for forming the protective layer, and the manufacturing cost caused by the removal of the protective layer can be reduced. In addition, in the embodiment, because the first test pad 163 or the protective layer protecting the first test pad 163 does not have to be exposed to the outside, a design improvement effect can be obtained, and thus a degree of design freedom can be secured.

In addition, although FIG. 28A shows only the arrangement structure of the first test pad 163 and the first coil unit 141b in the first substrate area 160a, similarly, the second test pad 164 and the second coil unit 142b may be disposed in the second substrate area 160b.

Meanwhile, referring to FIGS. 28B and 28C, the connection wire 160-2 is formed on the insulating layer 160-1 of the first substrate 160. The connection wire 160-2 may connect the first Hall sensor 71 and the first test pad 163. Also, the connection wire 160-2 may connect the first Hall sensor 71 and the driver IC 161.

In this case, the first Hall sensor 71 includes the first-first Hall sensor 71a and the first-second Hall sensor 71b. Also, each of the Hall sensors 71a and 71b includes a plurality of terminals.

That is, the first-first Hall sensor 71a includes an input terminal and an output terminal. Typically, the input terminal of the first-first Hall sensor 71a is only one terminal connected to the driver IC 161.

Unlike this, the input terminal of the first-first Hall sensor 71a in the embodiment may include a first-first input terminal (not shown) and a first-second input terminal (not shown). In addition, the output terminal of the first-first Hall sensor 71a in the embodiment may include a first-first output terminal (not shown) and a first-second output terminal (not shown).

In addition, the connection wire 160-2 may include a first connection wire 160-21 connecting the first-first input terminal and a first-first test pad 163-1 among the first test pads 163. Therefore, in the embodiment, the state of the input terminal of the first-first Hall sensor 71a may be tested through the first-first test pad 163-1.

Also, the connection wire 160-2 may include a third connection wire 160-23 connecting the first-second input terminal and the driver IC 161. Therefore, the driver IC 161 may input a signal to the first-first Hall sensor 71a through the third connection wire 160-23.

In addition, the connection wire 160-2 may include a second connection wire 160-22 connecting the first-first output terminal and a first-second test pad 163-2 among the first test pads 163. Therefore, in the embodiment, the state of the output terminal of the first-first Hall sensor 71a may be tested through the first-second test pad 163-2.

Also, the connection wire 160-2 may include a fourth connection wire 160-24 connecting the first-second output terminal and the driver IC 161. Therefore, the driver IC 161 may receive a signal outputted from the first-first Hall sensor 71a through the fourth connection wire 160-24.

Also, the first-second Hall sensor 71b includes an input terminal and an output terminal. In the embodiment, the input terminal of the first-second Hall sensor 71b may include a second-first input terminal (not shown) and a second-second input terminal (not shown). Also, in the embodiment, the output terminal of the first-second Hall sensor 71b may include a second-first output terminal (not shown) and a second-second output terminal (not shown).

In addition, the connection wire 160-2 may include a fifth connection wire 160 connecting the second-first input terminal and a first-third test pads 163-3 among the first test pads 163. Therefore, in the embodiment, the state of the input terminal of the first-second Hall sensor 71b may be tested through the first-third test pad 163-3. In this case, the first-first test pad 163-1 and the first-third test pad 1693-3 may be disposed in diagonal directions with the first Hall sensor 71 interposed therebetween. Accordingly, in the embodiment, mutual interference between the plurality of first Hall sensors 71 can be minimized.

Also, the connection wire 160-2 may include a seventh connection wire 160-27 connecting the second-second input terminal and the driver IC 161. Therefore, the driver IC 161 may input a signal to the first-second Hall sensor 71b through the seventh connection wire 160-27.

In addition, the connection wire 160-2 may include a sixth connection wire 160 connecting the second-first output terminal and a first-fourth test pads 163-4 among the first test pads 163. Therefore, in the embodiment, the state of the output terminal of the first-second Hall sensor 71b may be tested through the first-fourth test pad 163-4.

Also, the connection wire 160-2 may include an eighth connection wire 160-28 connecting the second-second output terminal and the driver IC 161. Therefore, the driver IC 161 may receive a signal outputted from the first-second Hall sensor 71b through the eighth connection wire 160-28. In addition, as shown in FIG. 28C, the first coil unit 141b is disposed on the first test pad 163 in the embodiment, so that first coil unit 141b can protect the exposed surface of the first test pad 163.

Figure 29A:
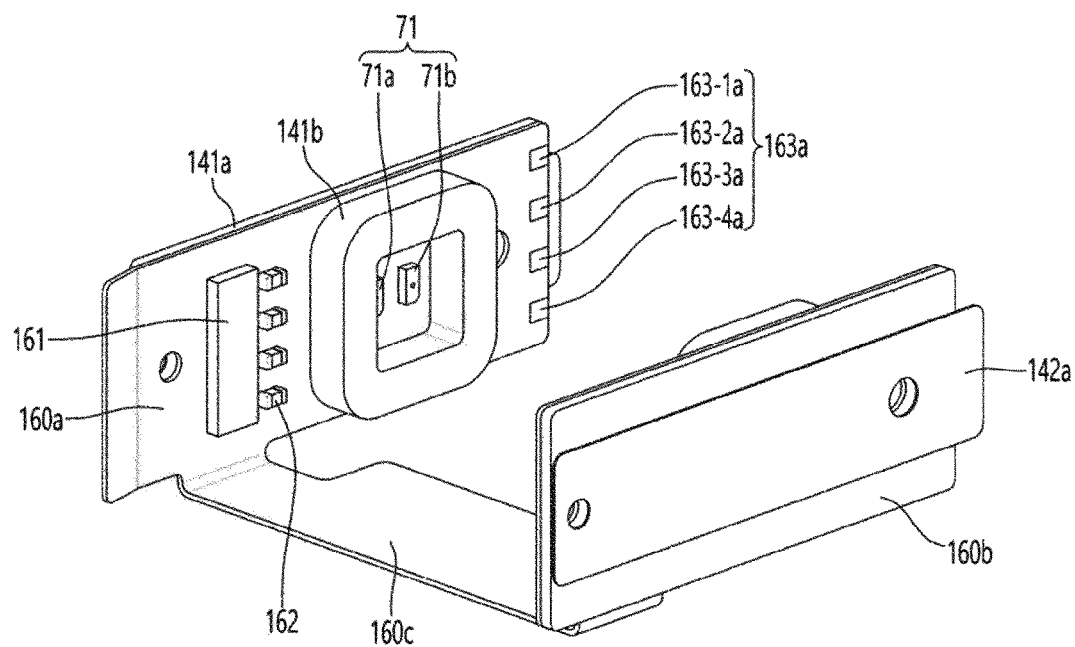
FIG. 29A is a perspective view of a first substrate from which a first coil unit is removed according to the second embodiment, viewed from a first direction.
Figure 29B:
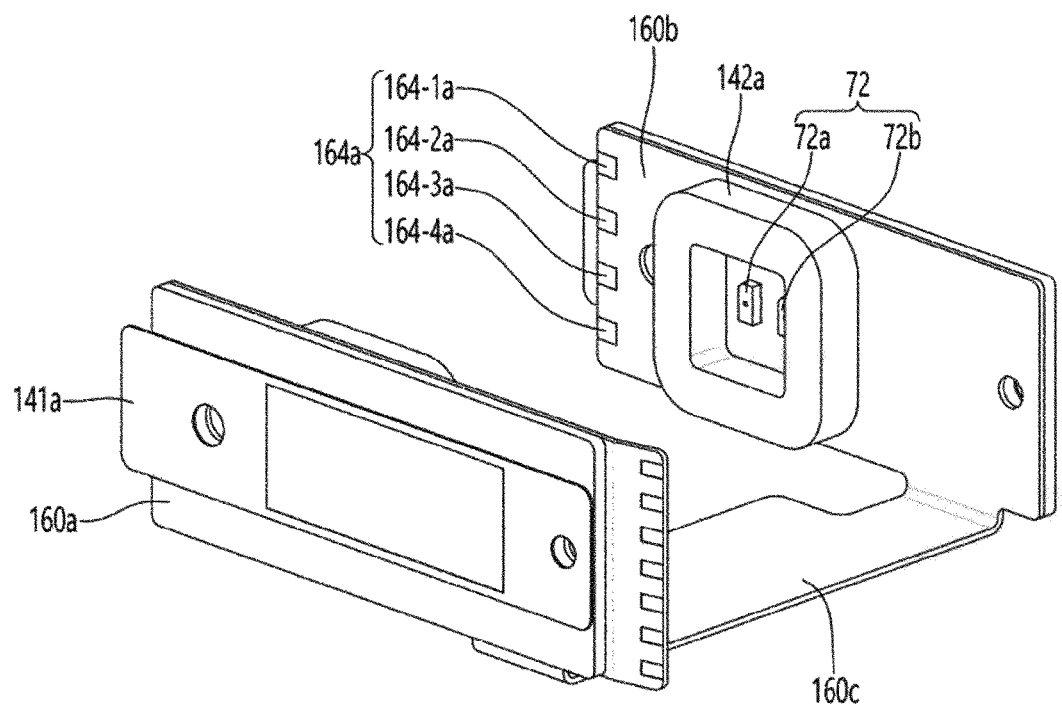
FIG. 29B is a perspective view of the first substrate from which the first coil unit is removed according to the second embodiment, viewed from a second direction.
Figure 29C:
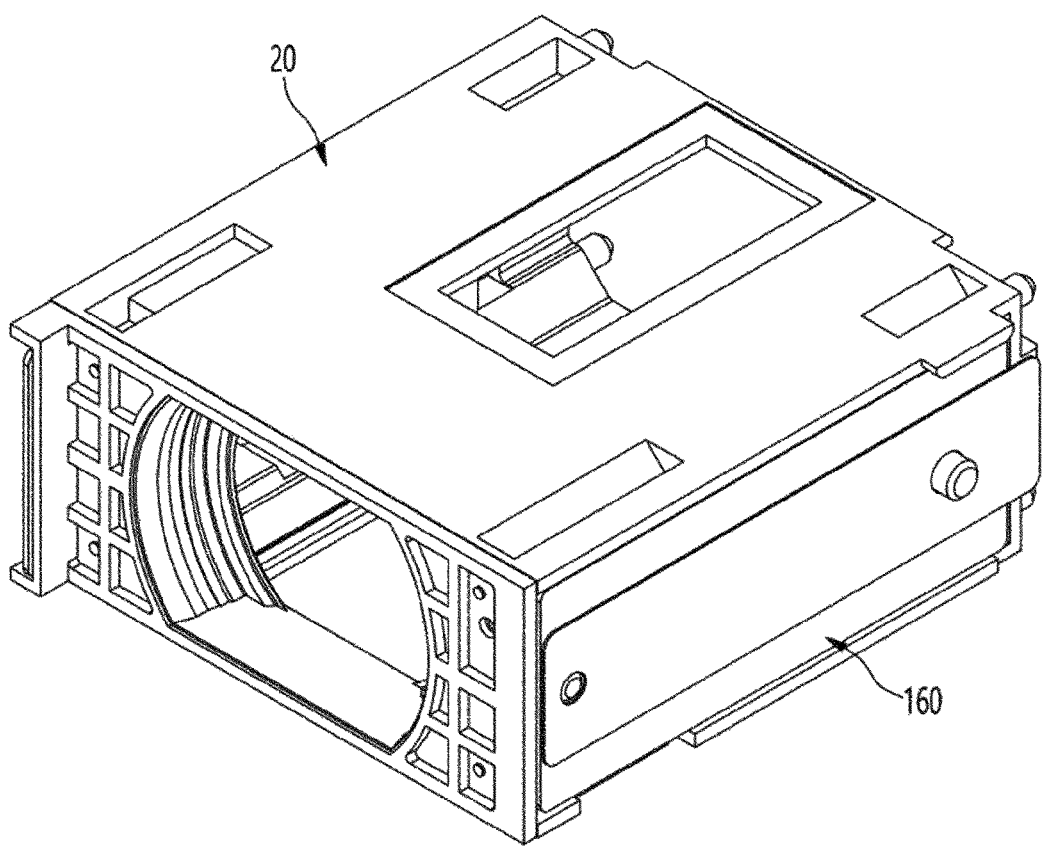
FIG. 29C is a view of a combination of the first substrate and a base according to the second embodiment.
Figure 29D:
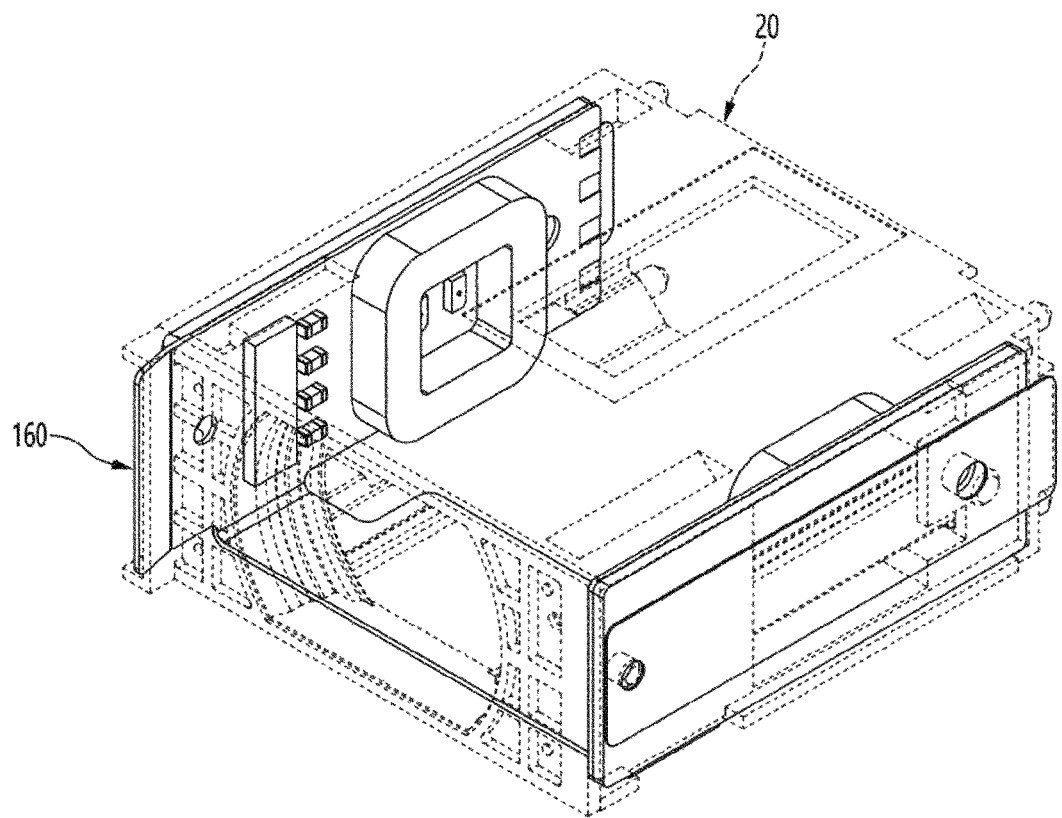
FIG. 29D is a view showing a structure of the first substrate in a state where the base is combined according to the second embodiment.

FIG. 29A is a perspective view of a first substrate from which a first coil unit is removed according to the second embodiment, viewed from a first direction, FIG. 29B is a perspective view of the first substrate from which the first coil unit is removed according to the second embodiment, viewed from a second direction, FIG. 29C is a view of a combination of the first substrate and a base according to the second embodiment, and FIG. 29D is a view showing a structure of the first substrate in a state where the base is combined according to the second embodiment.

Referring to FIGS. 29A to 29D, the first and second test pads in the second embodiment may be disposed in a region that does not overlap with the first coil unit 141b and the second coil unit 141b on the first substrate 160.

That is, in the first embodiment, the first test pad 163 and the second test pad 164 are disposed in a region overlapping with the first coil unit 141b and the second coil unit 142b on the first substrate 160.

Unlike this, in the second embodiment, the first test pad 163a and the second test pad 164a may be disposed to be spaced apart from the first coil unit 141b and the second coil unit 142b on the optical axis.

The first test pad 163a includes first-first to first-fourth test pads 163-1a, 163-2a, 163-3a, and 163-4a. Two of the first-first to first-fourth test pads 163-1a, 163-2a, 163-3a, and 163-4a are connected to the first-first Hall sensor 71a, and the other two are connected to the first-second Hall sensor 71b.

The second test pad 164a includes second-first to second-fourth test pads 164-1a, 164-2a, 164-3a, and 164-4a. Two of the second-first to second-fourth test pads 164-1a, 164-2a, 164-3a, and 164-4a are connected to the second-first Hall sensor 72a, and the other two are connected to the second-second Hall sensor 72b.

In this case, a separate protective layer may be disposed on the first test pad 163a and the second test pad 164a in the second embodiment.

However, in the embodiment, the base 20 is used to protect the exposed surfaces of the first test pad 163a and the second test pad 164a.

That is, as shown in FIGS. 29C and 29D, the first sidewall and the second sidewall of the base 20 are disposed on the exposed surfaces of the first test pad 163a and the second test pad 164a. In addition, the first sidewall and the second sidewall are disposed to cover the exposed surfaces (preferably, the opening 160-5 of the first and second protective layers 160-3 and 160-4) of the first test pad 163a and the second test pad 164a. Therefore, outer sides of the first and second sidewalls of the base 20 may be disposed to contact the second protective layer 160-4 and cover the opening 160-5.

Therefore, even in the second embodiment, a separate protective layer filling the opening 160-5 is unnecessary.

In other words, in the first embodiment, the opening 160-5 is covered by the first coil unit 141b and the second coil unit 142b, and in the second embodiment, the opening 160-5 is covered by both sidewalls of the base 20.

Meanwhile, as described above, the first Hall sensor 71 and the second Hall sensor 72 are disposed inside the windings of the first coil unit 141b and the second coil unit 142b, and the inside of the windings may be a hollow part of the coil. The first Hall sensor 71 and the second Hall sensor 72 may obtain positional information of the lens assembly by sensing a change in magnetic flux of a magnet disposed in the lens assembly.

By the way, when the first Hall sensor 71 and the second Hall sensor 72 are located inside the first coil unit 141b and the second coil unit 142b, a distance between the Hall sensor and the magnet is determined by the heights of the first coil unit 141b and the second coil unit 142b.

Typically, there is a thrust required for the movement of the lens assembly, and in order to secure this thrust, the height of the coil is required to be greater than a predetermined height.

However, when the height of the coil increases, the distance between the Hall sensor and the magnet increases due to the increased coil. As a result, there is a technical contradiction in that because the magnetic flux of the magnet is blocked, the sensitivity of the magnetic flux detected by the Hall sensor disposed inside the coil is weakened. Conversely, when the height of the coil is reduced, the electromagnetic force between the magnet and the coil is weakened, resulting in a decrease in thrust for driving AF or zoom.

In addition, a decrease in thrust or a decrease in the sensitivity of the Hall sensor all cause issues in the accuracy of camera control and also cause a decenter or tilt phenomenon of the camera module that may directly affect the safety or life of a user, a driver or a pedestrian.

Therefore, embodiments are intended to provide a camera actuator capable of increasing thrust and also increasing the sensitivity of a Hall sensor, and provide a camera module including the camera actuator.

Figure 30A:
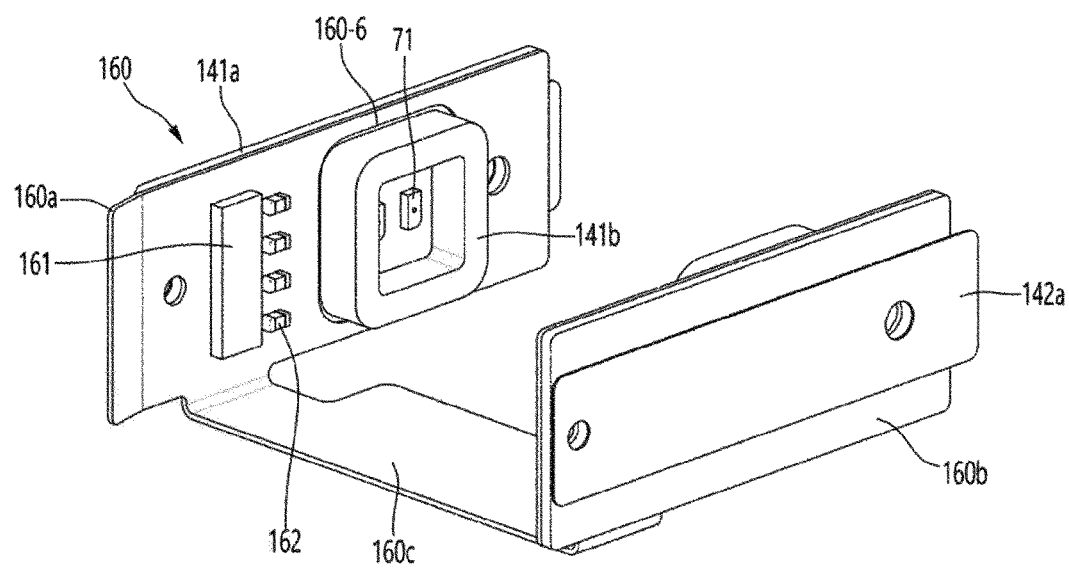
FIG. 30A is a perspective view showing a first substrate on which a coil unit is disposed according to the third embodiment.
Figure 30B:
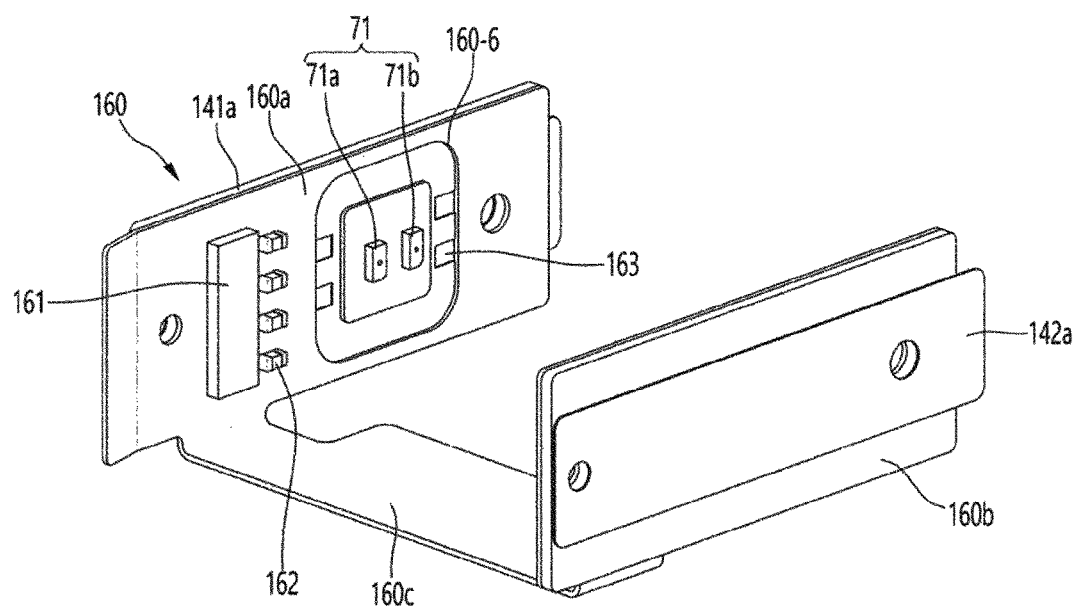
FIG. 30B is a perspective view showing the first substrate from which the coil unit is removed according to the third embodiment.
Figure 30C:
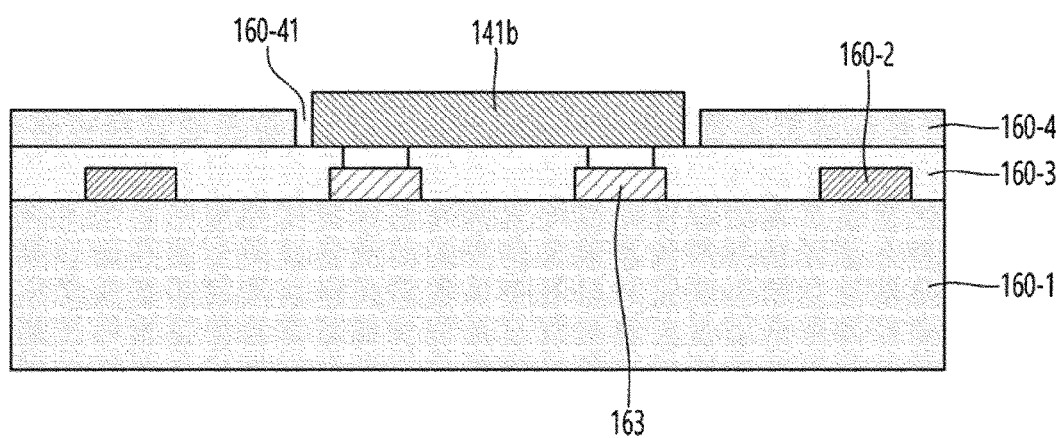
FIG. 30C is a cross-sectional view of the first substrate according to the third embodiment.

FIG. 30A is a perspective view showing a first substrate on which a coil unit is disposed according to the third embodiment, FIG. 30B is a perspective view showing the first substrate from which the coil unit is removed according to the third embodiment, and FIG. 30C is a cross-sectional view of the first substrate according to the third embodiment.

Prior to this description, in the embodiment, the first lens assembly 110 may include the first driving unit 116 and the third driving unit 141, and the second lens assembly 120 may include the second driving unit 126 and the fourth driving unit 142.

The first driving unit 116 and the second driving unit 126 may be, but are not limited to, magnet driving units, and the third driving unit 141 and the fourth driving unit 142 may be, but are not limited to, coil driving units.

In the first lens assembly 110 of the camera actuator according to the embodiment, the first driving unit 116 may include the first magnet 116b and the first yoke 116a, and the third driving unit 141 may include the first coil unit 141b and the third yoke 141a.

Also, in the second lens assembly 120 of the camera actuator according to the embodiment, the second driving unit 126 may include the second magnet 126b and the second yoke 126a, and the fourth driving unit 142 may include the second coil unit 142b and the fourth yoke 142a.

Referring to FIGS. 30A to 30C, a mounting recess 160-6 is formed in each of regions of the first substrate 160 where the first coil unit 141b and the second coil unit 142b are disposed. Also, in the embodiment, the first coil unit 141b and the second coil unit 142b are disposed in the mounting recesses 160-6.

Accordingly, in the embodiment, the positions of the first coil unit 141b and the second coil unit 142b may be disposed away from the magnet by the depth of the mounting recess 160-6. Also, in the embodiment, the first magnet 116b facing the first coil unit 141b may be disposed to be closer to the first Hall sensor 71 by the depth of the mounting recess 160-6.

In other words, the first coil unit 141b and the first magnet 116b should be spaced apart from each other by a certain distance. In the embodiment, the mounting recess 160-6 is formed on the first substrate 160, and the first coil unit 141b is disposed in the mounting recess 160-6. Therefore, the first magnet 116b may be disposed close to the first Hall sensor 71 by the depth of the mounting recess 160-6. In other words, in the embodiment, the distance between the first Hall sensor 71 and the first magnet 116b may be closer by the depth of the mounting recess 160-6 compared to a comparative example.

Also, in the embodiment, the second magnet 126b facing the second coil unit 142b may be disposed close to the second Hall sensor 72 by the depth of the mounting recess 160-6.

In other words, the second coil unit 142b and the second magnet 126b should be spaced apart from each other by a certain distance. In the embodiment, the mounting recess 160-6 is formed on the first substrate 160, and the second coil unit 142b is disposed in the mounting recess 160-6. Therefore, the second magnet 126b may be disposed close to the second Hall sensor 72 by the depth of the mounting recess 160-6. In other words, in the embodiment, the distance between the second Hall sensor 72 and the second magnet 126b may be closer by the depth of the mounting recess 160-6 compared to a comparative example.

In this case, the mounting recess 160-6 may be a region where the second protective layer 160-4 is removed on the first substrate 160.

In other words, in the first embodiment, the first coil unit 141b and the second coil unit 142b are disposed on the second protective layer 160-4.

Contrary to this, in the second embodiment, the first coil unit 141b and the second coil unit 142b may be disposed on the first protective layer 160-3.

That is, the second protective layer 160-4 is not disposed covering the entire surface of the first protective layer 160-3, but it may include an open region (corresponding to the mounting recess) that opens a region where the first coil unit 141b and the second coil unit 142b. Also, the first coil unit 141b and the second coil unit 142b may be disposed in the open region of the second protective layer 160-4.

Figure 31:
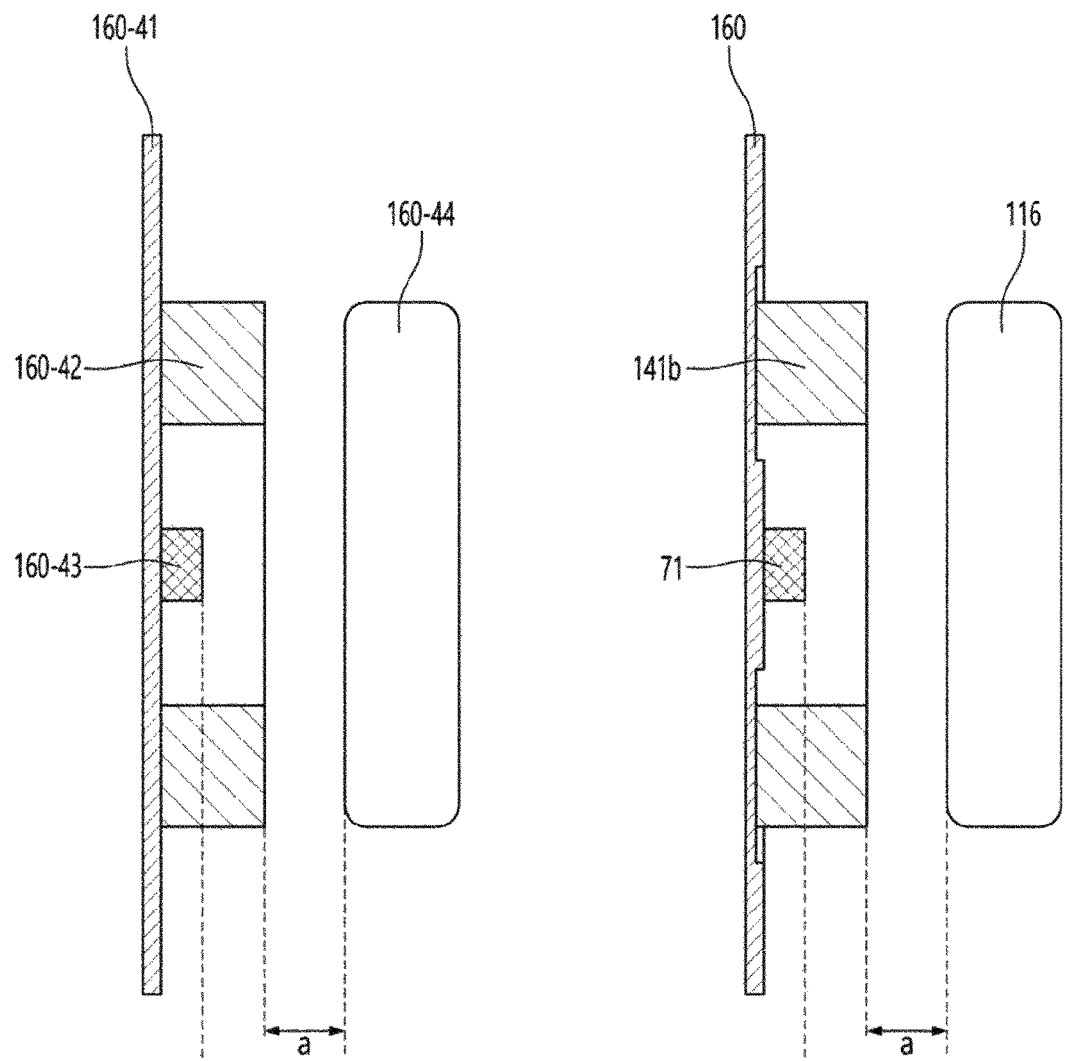
FIG. 31 is a view comparing a separation distance between a Hall sensor and a magnet in an embodiment and a comparative example.

FIG. 31 is a view comparing a separation distance between a Hall sensor and a magnet in an embodiment and a comparative example.

In FIG. 31, (a) shows the arrangement structure of the driving unit in the comparative example, and (b) shows the arrangement structure of the driving unit in the embodiment.

Referring to (a) of FIG. 31, in the comparative example, the first coil unit 160-42 and the Hall sensor 160-43 are disposed on the first substrate 160-41. Also, the first magnet 160-44 is disposed apart from the first coil unit 160-42 by a distance 'a'. In this case, the first coil unit 160-42 and the first magnet 160-44 may be spaced apart from each other by a first distance DH1.

Referring to (b) of FIG. 31, in the embodiment, the first coil unit 141b and the first Hall sensor 71 are disposed on the first substrate 160. In this case, the first substrate 160 includes the mounting recess 160-6. Also, the first coil unit 141b may be disposed in the mounting recess 160-6. Also, in the embodiment, the first magnet 116b is disposed apart from the first coil unit 141b by a distance 'a'. In this case, in the embodiment, the first Hall sensor 71 and the first magnet 116b may be spaced apart by a second distance DH2 smaller than the first distance DH1.

In other words, when the separation distance between the first coil unit and the first magnet is equal in the embodiment and the comparative example, it is possible in the embodiment to reduce the distance between the first Hall sensor 71 and the first magnet 116b by the depth of the mounting recess 160-6 compared to the comparative example. Accordingly, in the embodiment, as the distance between the first Hall sensor 71 and the first magnet 116b decreases, the position measurement sensitivity of the Hall sensor can be improved, and thus reliability can be improved. In other words, when the depth of the mounting recess 160-6 is 'b', the first distance DH1 may be greater than the second distance DH2 by 'b'.

Figure 32:
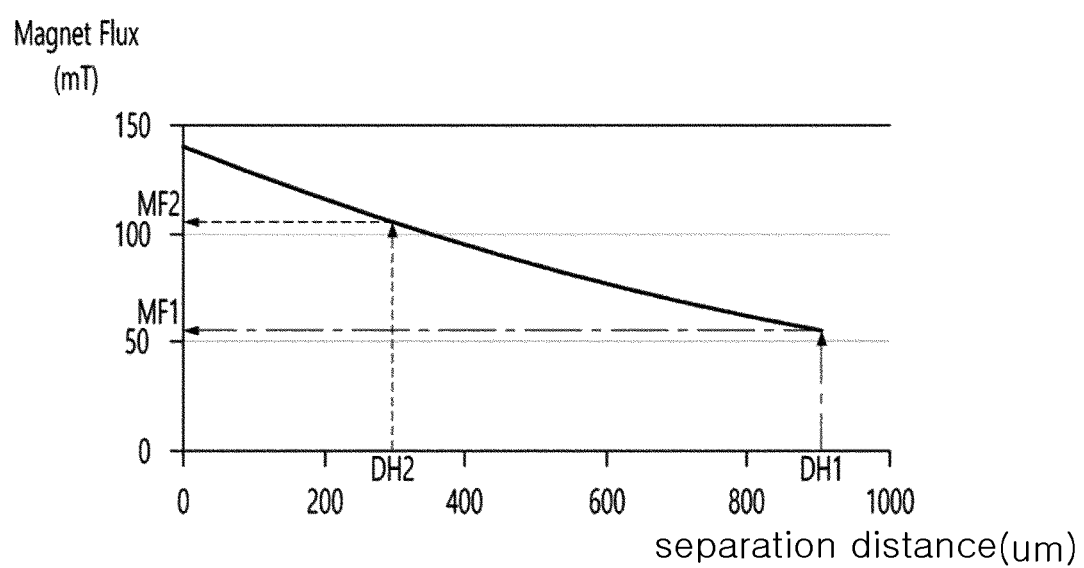
FIG. 32 is magnetic flux data according to a separation distance between a magnet and a Hall sensor in an embodiment and a comparative example.

FIG. 32 is magnetic flux data according to a separation distance between a magnet and a Hall sensor in an embodiment and a comparative example.

Referring to FIG. 32, in the embodiment, the distance between the first magnet and the first hall sensor may be reduced by the depth of the mounting recess 160-6.

For example, in the embodiment, the second distance DH2 has 400 μm or less, and thus can be secured twice or more shorter than that of the comparative example. Accordingly, compared to the comparative example, there is a unique technical effect of securing the magnetic flux between the first magnet 116b and the first Hall sensor 71 up to about 150 (mT) approximately three times higher than that of the comparative example.

Accordingly, the camera actuator according to the embodiment and the camera module including the same have a unique technical effect of increasing the thrust and also increasing the sensitivity of the Hall sensor.

Next, embodiments are intended to provide a camera actuator capable of inhibiting magnetic field interference between magnets mounted on each lens assembly when a plurality of lens assemblies are driven by electromagnetic force between magnets and coils for AF or zoom implementation, and provide a camera module including the camera actuator.

In addition, embodiments are intended to provide a camera actuator capable of inhibiting detachment of a magnet and a yoke, and provide a camera module including the camera actuator.

Figure 33:
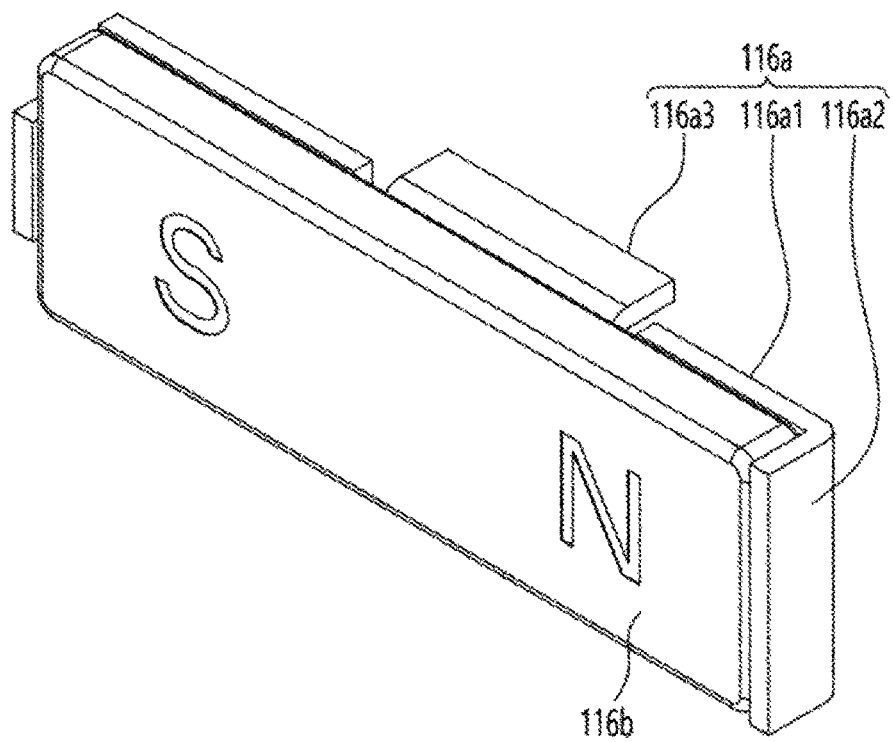
FIG. 33 is a perspective view of a first driving unit in a camera actuator according to an embodiment.

FIG. 33 is a perspective view of a first driving unit 116 in a camera actuator according to an embodiment.

Referring to FIG. 33, in the embodiment, the first driving unit 116 may include a first magnet 116b and a first yoke 116a, and the first yoke 116a may include a first support part 116a1 and a first side protrusion 116a2 extending from the first support part 116a1 to a side surface of the first magnet 116b.

The first side protrusion 116a2 may be disposed on both side surfaces of the first magnet 116b.

In addition, the first yoke 116a may include a first fixing protrusion 116a3 extending in a direction different from that of the first side protrusion 116a2, for example, in the opposite direction.

The first fixing protrusion 116a3 may be disposed at an intermediate position of the first support part 116a1, but this is not a limitation.

Similarly, in the embodiment, the second driving unit 126 may include a second magnet 126b and a second yoke 126a, and the second yoke 126a may include a second support part (not shown) and a second side protrusion extending from the second support part to a side surface of the second magnet 126b.

The second side protrusion may be disposed on both side surfaces of the second magnet 126b. In addition, the second yoke 126a may include a second fixing protrusion (not shown) extending in a direction different from that of the second side protrusion, for example, in the opposite direction. The second fixing protrusion may be disposed at an intermediate position of the second support part, but this is not a limitation.

Typically, when implementing AF or zoom, a plurality of lens assemblies are driven by electromagnetic force between magnets and coils, and there is a problem in that magnetic field interference occurs between magnets mounted on each lens assembly. Due to this magnetic field interference between magnets, there is a problem in that the AF or zoom operation is not performed properly and the thrust is reduced.

In addition, there is a problem of causing decentering or tilting due to magnetic field interference between magnets.

If such magnetic field interference causes an issue with the precision of camera control, thrust lowering, a decentering or tilt phenomenon, it may be directly related to the safety or life of the user, driver or pedestrian.

<First Camera Actuator 300>

Hereinafter, a second camera actuator according to an embodiment will be described.

Figure 34A:
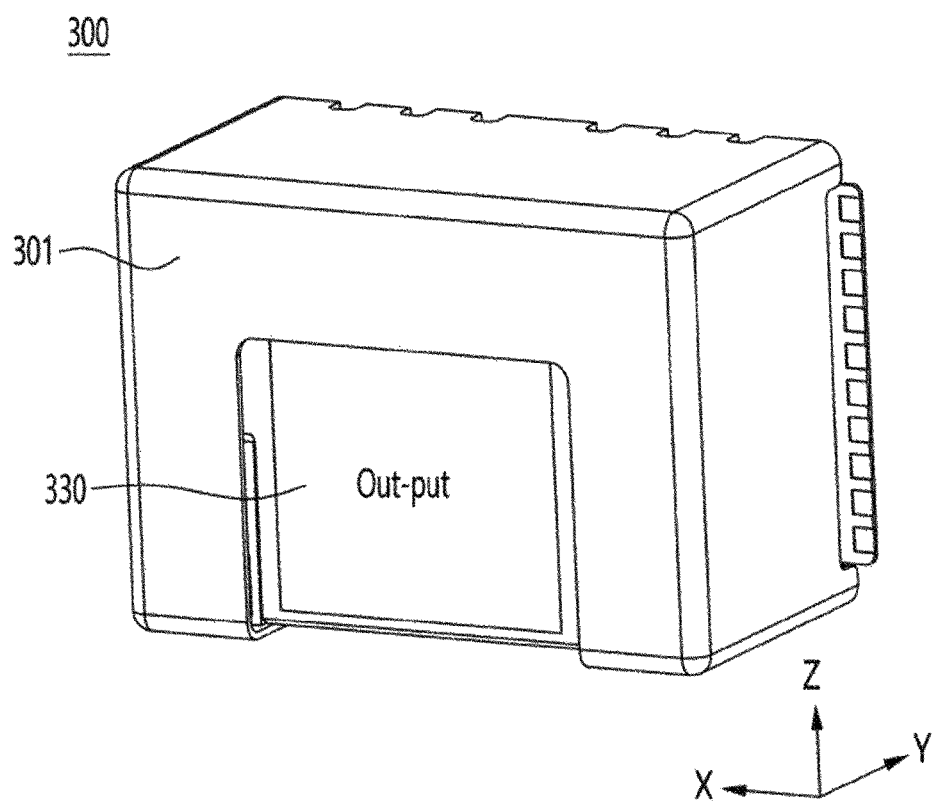
FIG. 34A is a perspective view of a second camera actuator of a camera module according to an embodiment.
Figure 34B:
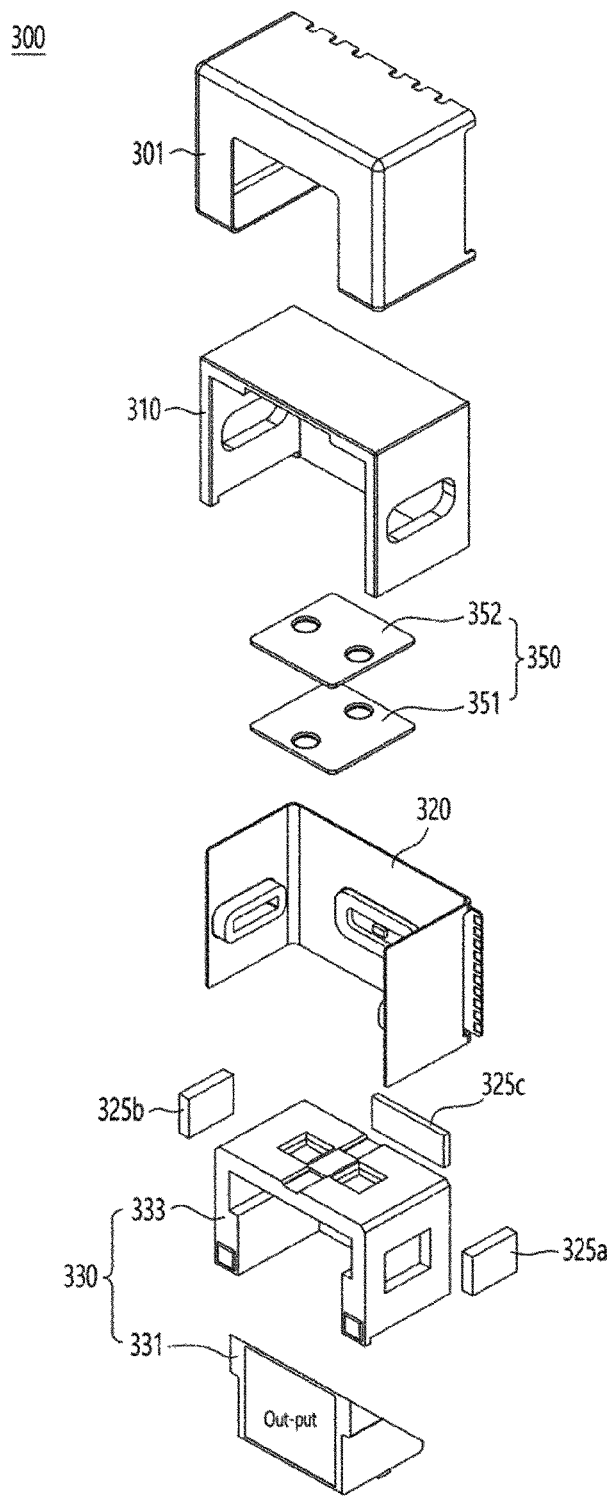
FIG. 34B is an exploded perspective view of a second camera actuator according to an embodiment.

FIG. 34A is a perspective view of a second camera actuator of a camera module according to an embodiment, and FIG. 34B is an exploded perspective view of a second camera actuator according to an embodiment.

Referring to FIGS. 34A and 34B, the first camera actuator 300 according to the embodiment may include a housing 310, an image shake control unit 320 disposed on the housing 310, and a mover 330 disposed on the image shake control unit 320. The image shake control unit 320 may correspond to the above-described first driving unit (1150 in FIG. 5).

In addition, the first camera actuator 300 may further include a cover member 301. The cover member 301 may have an accommodation space therein, and at least one side surface thereof may be open. For example, the cover member 301 may have a structure in which a plurality of side surfaces connected to each other are open. In detail, the cover member 301 may have a structure in which a front surface through which light is incident from the outside, a lower surface corresponding to the second camera actuator 100, and a rear surface opposite to the front surface are open, and may provide an optical travel path of the mover 330 to be described later.

Furthermore, for the same terms as the terms used in the first camera actuator of FIGS. 1 to 18 described above, the above description may be equally applied.

The cover member 301 may include a rigid material. For example, the cover member 301 may include a material such as resin or metal, and may support the housing 310 disposed in the accommodation space. For example, the cover member 301 may be disposed to surround and support the housing 310, the image shake control unit 320, and the mover 330.

In detail, the mover 330, which will be described later, can move in the first direction and/or the second direction by the image shake control unit 320. In this case, the cover member 301 can fix the housing and the image shake control unit 320 to set positions, so that a more accurate light travel path can be provided. Also, the cover member 301 may inhibit the housing 310 from escaping to the outside of the first camera actuator 300 by the elastic force of the elastic member 350. The cover member 301 may be omitted depending on the arrangement relationship of the housing 310, the image shake control unit 320, and the mover 330.

FIGS. 35A to 38B are perspective views of respective components of a second camera actuator.

Referring to FIGS. 35A to 38B, the first camera actuator 300 may include the housing 310, the image shake control unit 320, the mover 330, a tilting guide part 350, and a pulling magnet 360. In detail, the image shake control unit 320 may include a driver circuit board 321, a plurality of coil units 323, and a plurality of magnets 325, and the mover 330 may include an optical member 331 and a holder 333. The mover 330 may correspond to the above-described mover.

According to the embodiment, by having the image shake control unit 320 disposed on the housing 310, there is a technical effect capable of providing an ultra-slim and ultra-small camera actuator and a camera module including the same.

In addition, according to the embodiment, by disposing the image shake control unit 320 below the mover 330, there is a technical effect of securing a sufficient amount of light by eliminating the size restriction of the lens in the lens assembly of the optical system when implementing the OIS.

In addition, according to the embodiment, by including the image shake control unit 320 stably disposed on the housing 310 and controlling the mover 330 to be tiled on the first axis or the second axis, there is a technical effect of minimizing the occurrence of a decenter or tilt phenomenon upon OIS implementation and providing the best optical characteristics.

In addition, according to the embodiment, unlike typically moving a plurality of solid lenses, by including the image shake control unit 320 and realizing the OIS by controlling the mover 330 to be tiled to the first axis or the second axis, there is a technical effect of implementing the OIS with low power consumption.

Hereinafter, each component of the first camera actuator 300 will be described in detail with reference to FIGS. 35A to 38B.

<Image Shake Control Unit>

Figure 35A:
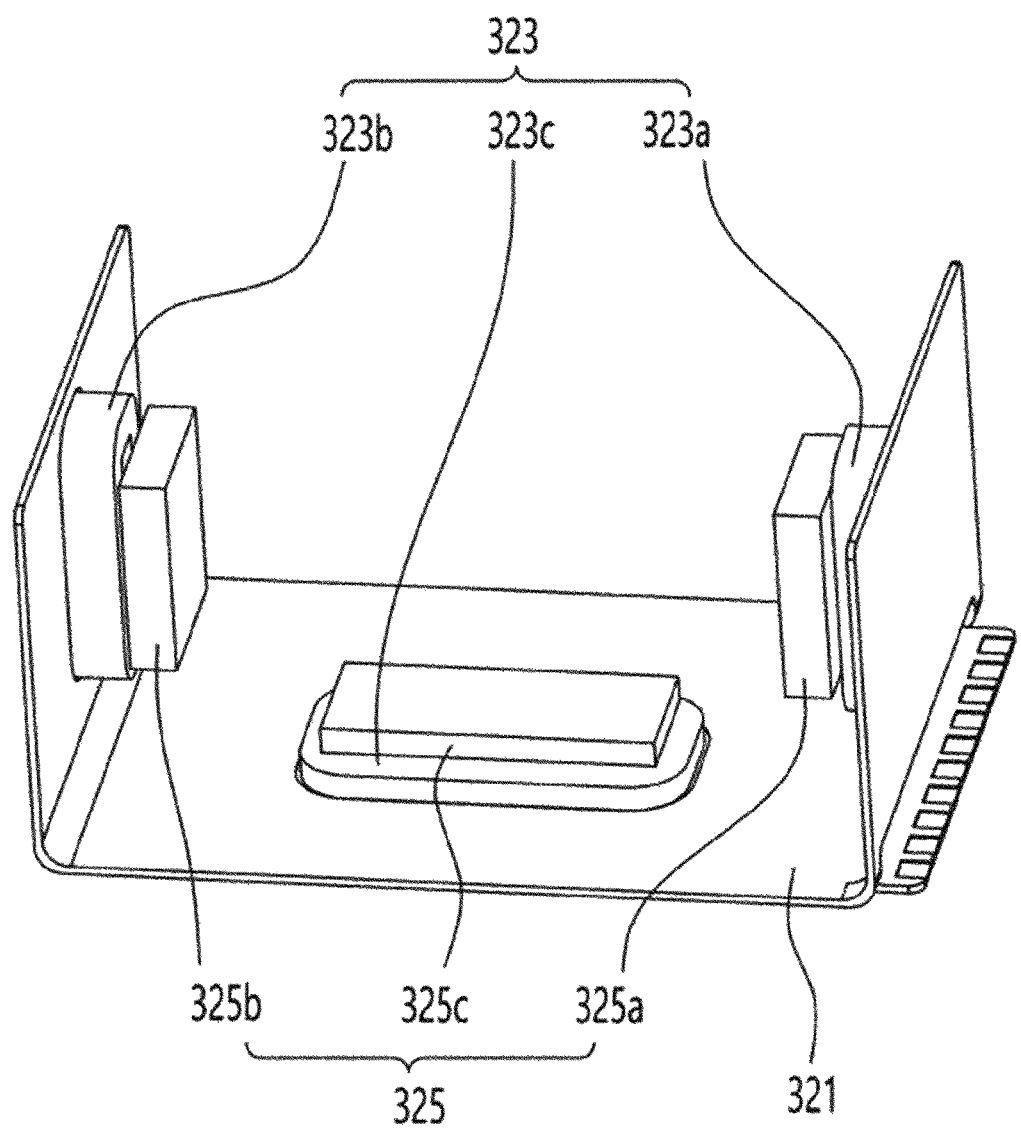
FIGS. 35A to 38B are perspective views of respective components of a second camera actuator.
Figure 35B:
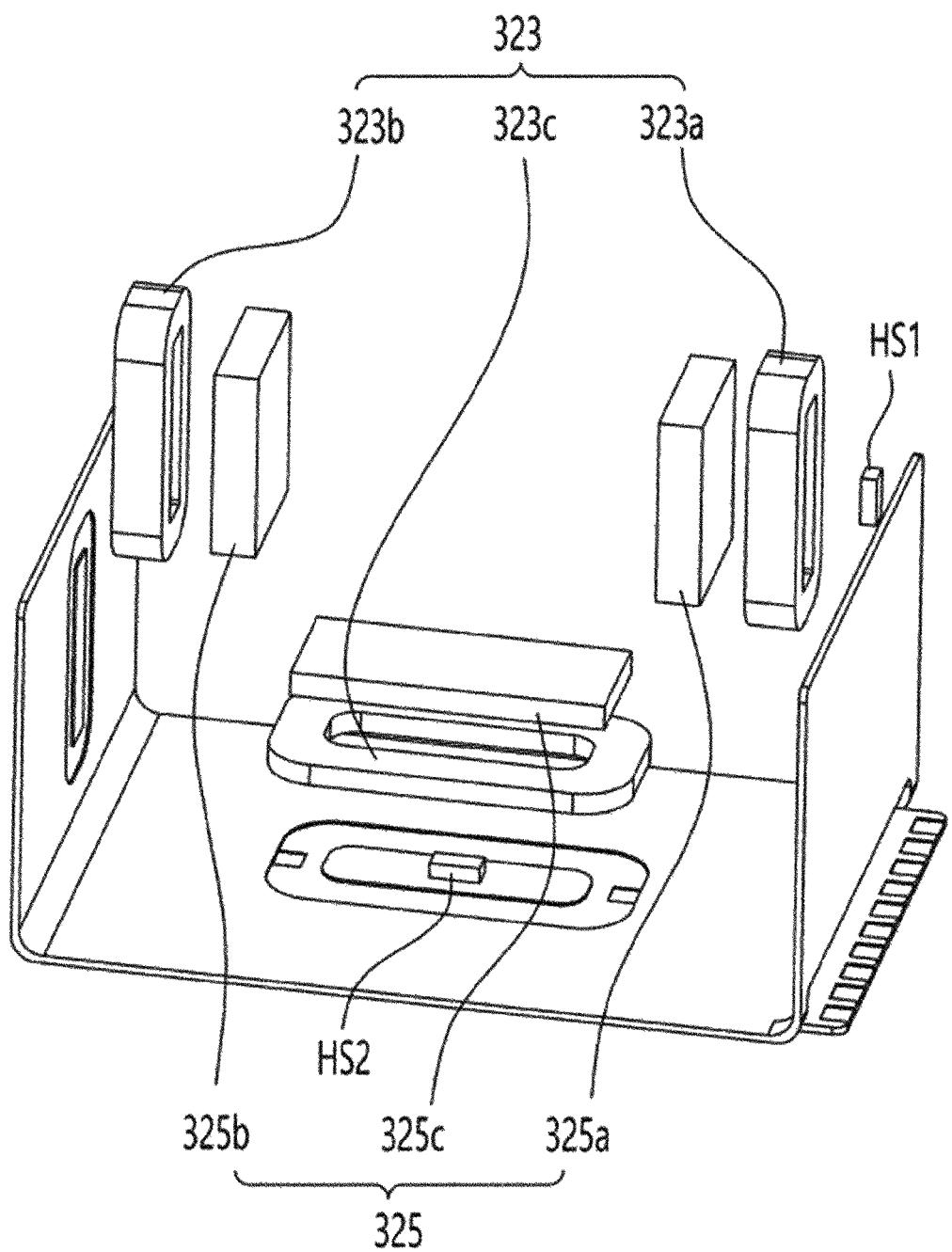

FIG. 35A is a perspective view of the image shake control unit 320 of the first camera actuator 300, and FIG. 35B is an exploded perspective view of the image shake control unit 320 of the first camera actuator 300.

Referring to FIGS. 35A and 35B, the image shake control unit 320 may include a driver circuit board 321, a coil unit 323, and a magnet 325.

The driver circuit board 321 may be connected to a predetermined power supply unit (not shown) and apply power to the coil unit 323. The driver circuit board 321 may include a circuit board having an electrically connectible wiring pattern, such as a rigid printed circuit board (Rigid PCB), a flexible printed circuit board (Flexible PCB), and a rigid flexible printed circuit board (Rigid Flexible PCB).

The coil unit 323 may be electrically connected to the driver circuit board 321. The coil unit 323 may include one or a plurality of coil units. For example, the coil unit 323 may include a first coil unit 323*a*, a second coil unit 323*b*, and a third coil unit 323*c*. The coil unit 323 may correspond to the first to third coils described above.

The first to third coil units 323*a*, 323*b*, and 323*c* may be spaced apart from each other. For example, the driver circuit board 321 may have a 'c' shape, and the first coil unit 323*a* and the second coil unit 323*b* may be respectively disposed on the opposing first and second surfaces of the driver circuit board 321. Also, the third coil unit 323*c* may be disposed on a third surface connecting the first and second surfaces of the driver circuit board 321.

The magnet 325 may include one or a plurality of magnets. For example, the magnet 325 may include a first magnet 325*a*, a second magnet 325*b*, and a third magnet 325*c* disposed in a region corresponding to the coil unit 323. In detail, the first magnet 325*a* may be disposed in a region corresponding to the first coil unit 323*a* on the first surface. Also, the second magnet 325*b* may be disposed in a region corresponding to the second coil unit 323*b* on the second surface. Also, the third magnet 325*c* may be disposed in a region corresponding to the third coil unit 323*c* on the third surface. Also, the magnet 325 may correspond to the first to third magnets described above.

The image shake control unit 320 may further include Hall sensors HS1 and HS2. For example, the Hall sensors HS1 and HS2 may include a first hall sensor HS1 disposed adjacent to one coil unit selected from among the first coil unit 323*a* and the second coil unit 323*b*, and a second Hall sensor HS2 disposed adjacent to the third coil unit 323*c*.

Meanwhile, the driver circuit board 321 may include some components included in the first board 160 described in the first actuator. Also, the driver circuit board 321 may correspond to the above-described first substrate unit.

That is, the driver circuit board 321 may have mounting recesses formed in regions where the first coil unit 323*a*, the second coil unit 323*b*, and the third coil unit 323*c* are disposed. The mounting recess may be an open area of the coverlay. In addition, test pads (not shown) for testing the Hall sensors HS1 and HS2 may be formed in regions where the first coil unit 323*a*, the second coil unit 323*b*, and the third coil unit 323*c* are disposed.

That is, the embodiment is characterized by including the test pad for testing the Hall sensor and opening the coverlay in an area where the coil unit is disposed. The test pad and the open area of the coverlay may be formed on both the first substrate 160 and the driver circuit board 321.

<Housing>

Figure 36A:
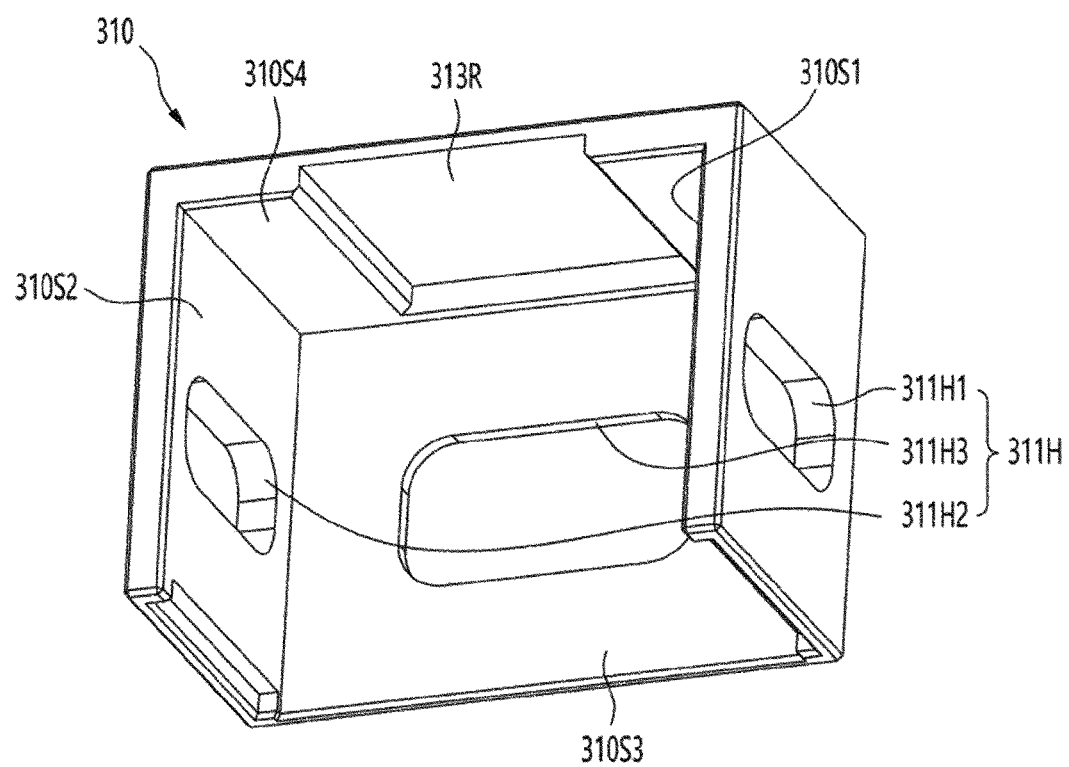
Figure 36B:
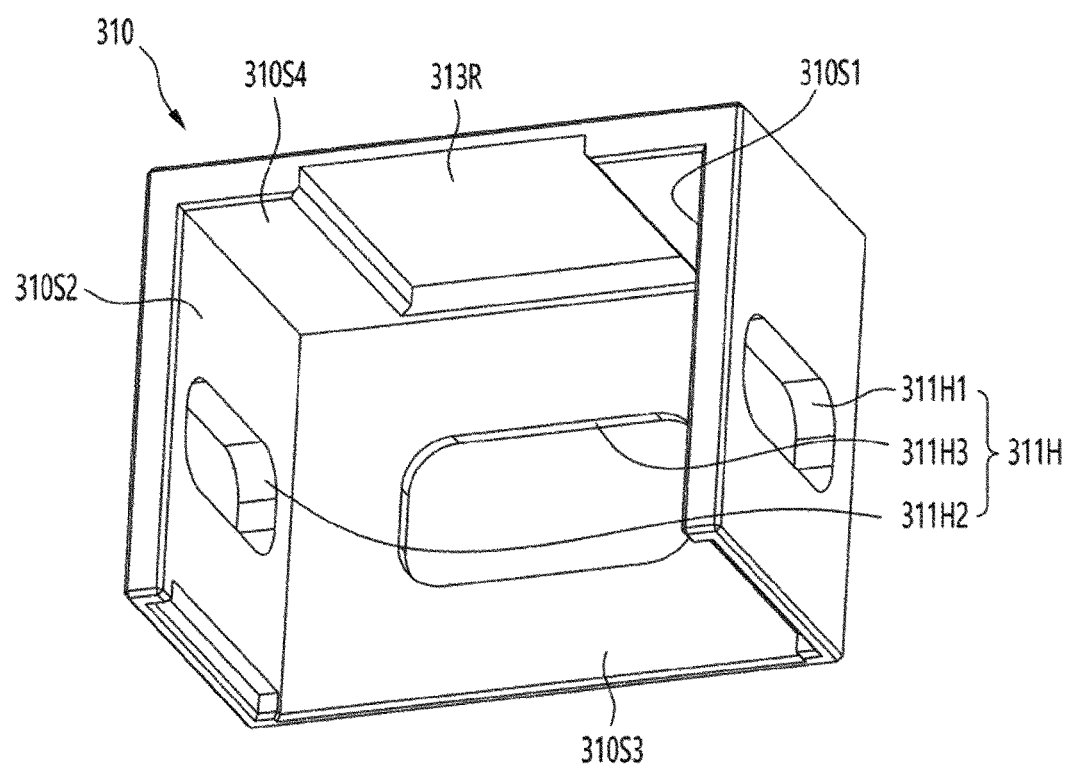

FIG. 36A is a perspective view of the housing 310 of the first camera actuator 300, and FIG. 36B is a perspective view of the second tilting guide part 352 combined with the housing of FIG. 36A.

Referring to FIGS. 36A and 36B, the housing 310 may have an accommodation space to accommodate the mover 330. The housing 310 may have a plurality of inner surfaces. For example, the housing 310 may have a first inner surface 310S1 corresponding to the first surface of the driver circuit board 321, a second inner surface 310S2 corresponding to the second surface of the driver circuit board 321, and a third inner surface 310S3 corresponding to the third surface of the driver circuit board 321.

In detail, the housing 310 may have the first inner surface 310S1 corresponding to the first coil unit 323*a*, the second inner surface 310S2 corresponding to the second coil unit 323*b*, and the third inner surface 310S3 corresponding to the third coil unit 323*c*.

In addition, the housing 310 may have a fourth inner surface 310S4 connected to the first inner surface 310S1 and the second inner surface 310S2 and also connected to the third inner surface 310S3.

The housing 310 may have a plurality of housing holes 311H. The housing hole 311H may be a through hole penetrating the outer and inner surfaces of the housing 310. The plurality of housing holes 311H may include first to third housing holes 311H1, 311H2, and 311H3. The first housing hole 311H1 may be a through hole passing through the first inner surface 310S1 and the outer surface corresponding to the first inner surface 310S1. The second housing hole 311H2 may be a through hole passing through the second inner surface 310S2 and the outer surface corresponding to the second inner surface 310S2. The third housing hole 311H3 may be a through hole passing through the third inner surface 310S3 and the outer surface corresponding to the third inner surface 310S3.

The first housing hole 311H1 may be disposed in a region corresponding to the first coil unit 323*a*. Also, the first housing hole 311H1 may have a size and shape corresponding to those of the first coil unit 323*a*. Accordingly, the first coil unit 323*a* may be partially or entirely inserted and disposed in the first housing hole 311H1.

The second housing hole 311H2 may be disposed in a region corresponding to the second coil unit 323*b*. Also, the second housing hole 311H2 may have a size and shape corresponding to those of the second coil unit 323*b*. Accordingly, the second coil unit 323*b* may be partially or entirely inserted and disposed in the second housing hole 311H2.

The third housing hole 311H3 may be disposed in a region corresponding to the third coil unit 323*c*. Also, the third housing hole 311H3 may have a size and shape corresponding to those of the third coil unit 323*c*. Accordingly, the third coil unit 323*c* may be partially or entirely inserted and disposed in the third housing hole 311H3.

The housing 310 may have at least one recess 313R. For example, the recess 313R may be disposed on at least one inner surface of the housing 310. In detail, the recess 313R may be disposed on the fourth inner surface 310S4 of the housing 310. The recess may have a concave shape on the fourth inner surface 310S4 toward the outer surface of the housing 310 (in the z-axis direction).

The recess 313R of the housing 310 may provide a space where the tilting guide part 350 is disposed. Preferably, the recess 313R may provide a space in which the second tilting guide part 352 of the tilting guide part 350 is disposed. To this end, an adhesive member (not shown) may be disposed in the recess 313R. Also, the second tilting guide part 352 may be disposed in and fixed to the recess 313R of the housing 310 by the adhesive member.

<Mover>

Figure 37A:
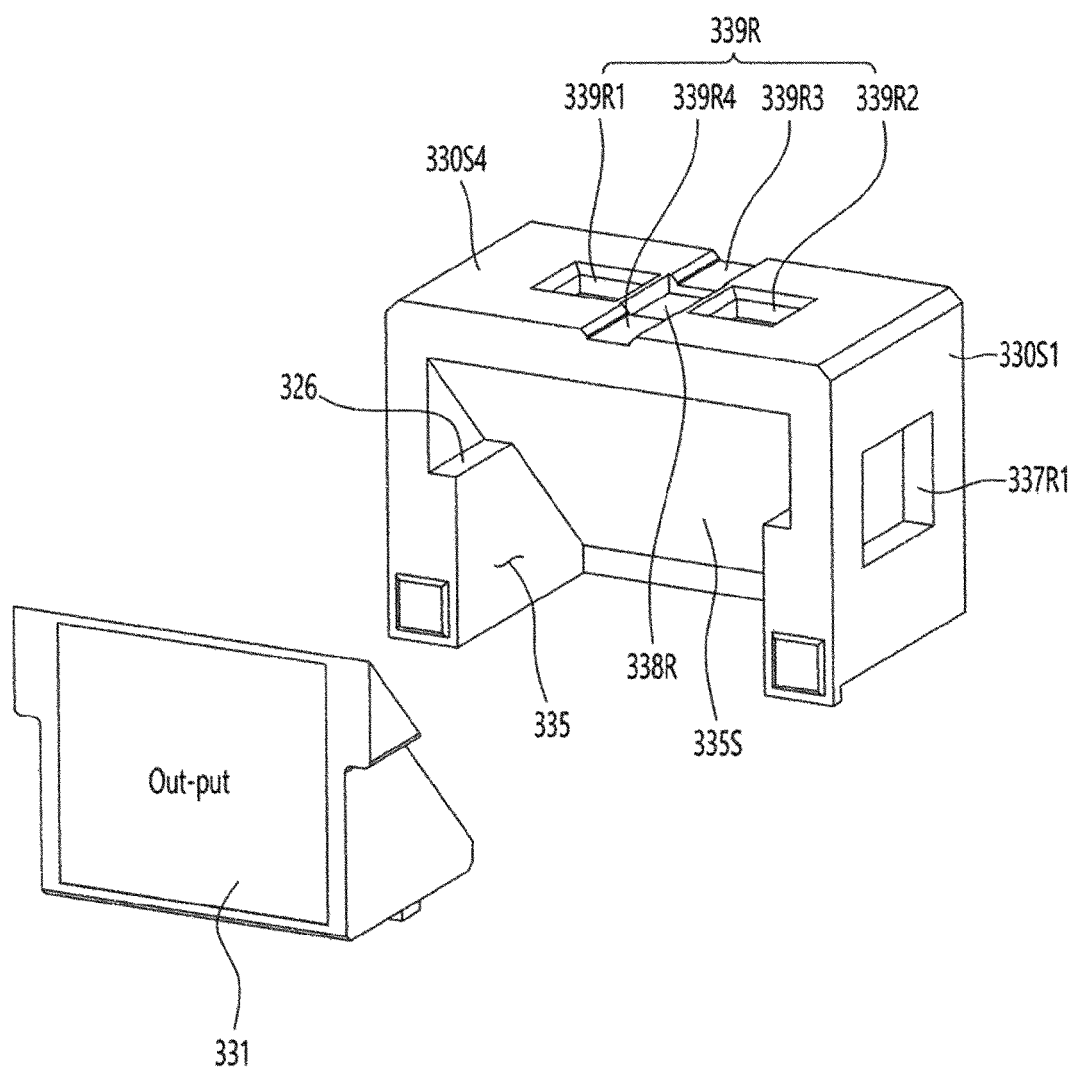
Figure 37B:
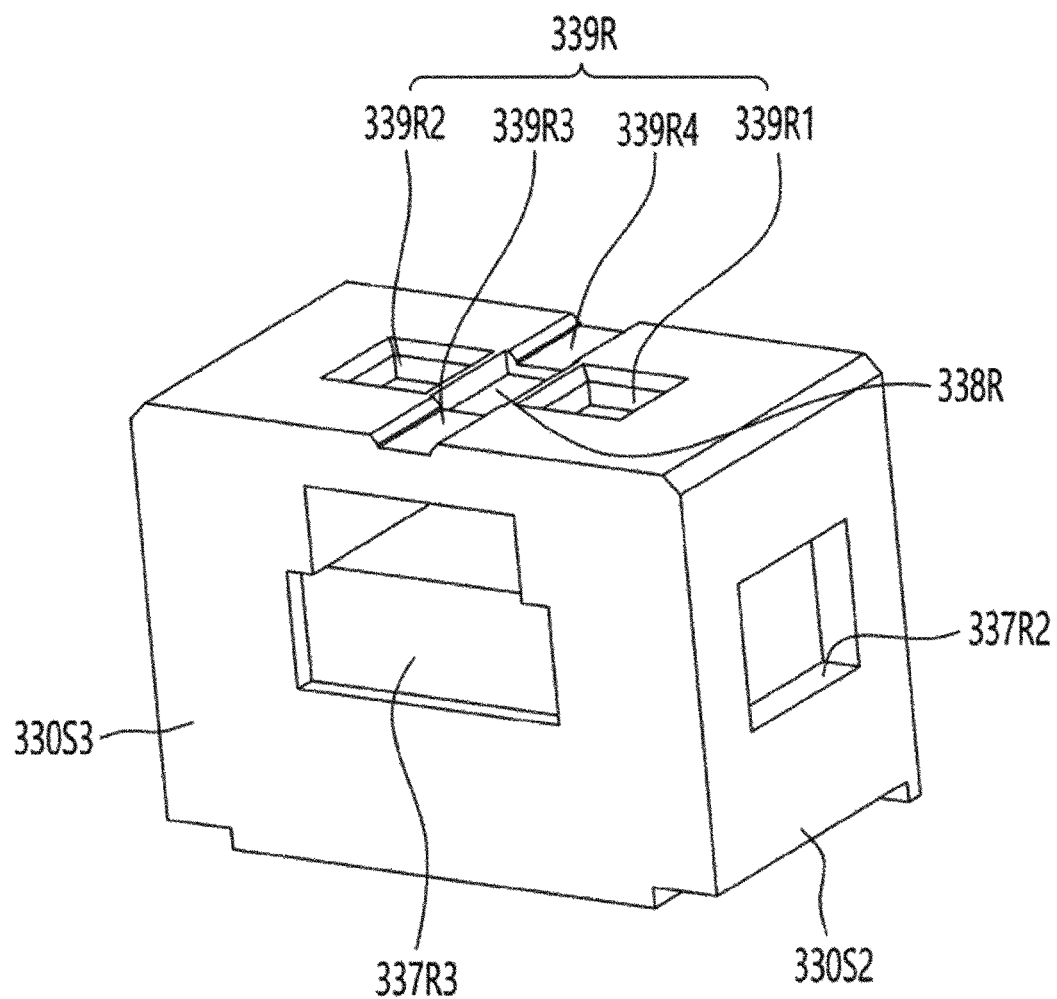
Figure 37C:
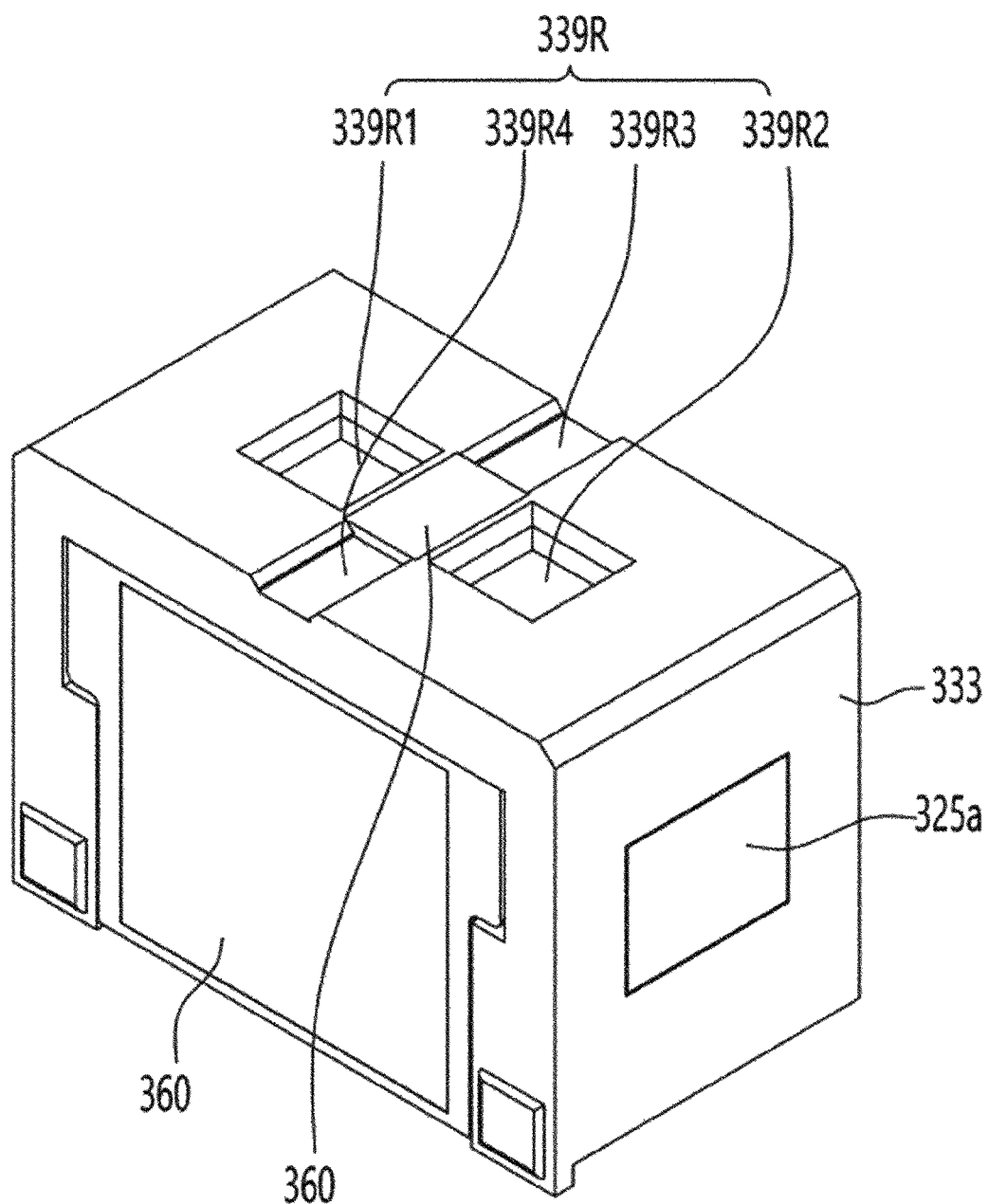

FIGS. 37A to 37C are views of the mover 330 of the first camera actuator 300.

Referring to FIGS. 37A to 37C, the mover 330 may be disposed within the housing 310. In detail, the mover 330 may be disposed within the accommodation space of the housing 310.

The mover 330 may include the optical member 331 and the holder 333 disposed on the optical member 331.

The optical member 331 may be a right angle prism. The optical member 331 may reflect the direction of light incident from the outside. That is, the optical member 331 may change a path of light incident on the first camera actuator 300 from the outside toward the second camera actuator 100.

The holder 333 may be disposed on the optical member 331. The holder 333 may be disposed to surround the optical member 331. The holder 330 may have at least one opened side surface and have an accommodation space therein. In detail, the holder 333 may have a structure in which a plurality of external surfaces connected to each other are open. For example, the holder 333 may have a structure in which an outer surface corresponding to the optical member 331 is open, and may have an accommodation space defined as a first space 335 therein.

The holder 333 may have an inner surface 335S. The inner surface 335S may be an inner surface forming the first space 335. The first space 335 may have a shape corresponding to that of the optical member 331. In the first space 335, the inner surface 335S may be in directly contact with the optical member 331.

The holder 333 may include a step 326. The step 326 may be disposed within the first space 335. The step 326 may perform a function of guiding and/or placing the optical member 331. In detail, a protrusion corresponding to the step 326 may be formed on the outside of the optical member 331. The optical member 331 may be disposed in the first space 335 with the protrusion guided to the step 326 of the holder 333. Therefore, the holder 333 can effectively support the optical member 331. In addition, the optical member 331 may be placed at a set position and may have improved alignment characteristics in the holder 333.

The mover 330 may have a plurality of outer surfaces. For example, the holder 333 of the mover 330 may have a plurality of outer surfaces. The holder 333 may have a first outer surface 330S1 corresponding to the first inner surface 310S1 of the housing 310, a second outer surface 330S2 corresponding to the second inner surface 310S2, a third outer surface 330S3 corresponding to the third inner surface 310S3, and a fourth outer surface 330S4 corresponding to the fourth inner surface 310S4.

The holder 333 may have at least one recess. For example, the recess may be disposed on at least one outer surface of the holder 333. In detail, the recess may be disposed on the fourth outer surface 330S4 of the holder 333. The recess may have a concave shape on the fourth outer surface 330S4 toward the first space 335 (in the z-axis direction).

A plurality of recesses 338R and 319R of the holder 333 may be provided. The recesses 338R and 319R may include a third recess 338R and a fourth recess 319R.

The third recess 338R may be disposed in a central region of the fourth outer surface 330S4. In detail, the third recess 338R may overlap with the center of the fourth outer surface 330S4 in the z-axis direction. The third recess 338R may be disposed to face the recess 313R of the housing 310. Preferably, the third recess 338R may be disposed in a region overlapping with the center of the recess 313R of the housing 310 in the z-axis direction. The third recess 338R may provide a space in which the pulling magnet 360 is disposed. Preferably, the pulling magnet 360 may be inserted into the third recess 338R. In this case, an adhesive member (not shown) may be coated in the third recess 338R. Also, the pulling magnet 360 may be fixed to and disposed in the third recess 338R by the adhesive member.

The fourth recess 319R may be disposed in plural on the fourth outer surface 330S4. The fourth recess 319R may have a size equal to or different from that of the third recess 338R. The plurality of fourth recesses 319R may be disposed adjacent to the third recess 338R and selectively spaced apart from the third recess 318R. That is, some of the fourth recesses 319R may be spaced apart from the fourth recess 338R. The other fourth recesses 319R may be connected to the third recess 338R. In this case, the depth of the third recess 338R may be different from that of the fourth recess 319R. Also, the plurality of fourth recesses 319R may have different depths.

The fourth recesses 319R may be disposed around the third recess 338R. That is, the fourth recesses 319R may be disposed to surround the recess 313R with the third recess 338R as the center.

For example, the plurality of fourth recesses 319R may include a first sub-fourth recess 319R1 and a second sub-fourth recess 319R2, which are spaced apart from the third recess 338R in the first direction (x-axis direction). In addition, the plurality of fourth recesses 319R may include a third sub-fourth recess 319R3 and a fourth sub-fourth recess 319R4, which are spaced apart from or connected to the third recess 338R in the second direction (y-axis direction).

The fourth recess 319R may provide a space in which the first tilting guide part 351 of the tilting guide part 350 is inserted. Preferably, a plurality of protrusions (to be described later) of the first tilting guide part 351 may be inserted into the fourth recess 319R.

That is, the fourth recess 319R may be formed to correspond to the positions of the plurality of protrusions disposed on the first tilting guide part 351, thereby providing a space in which the plurality of protrusions of the first tilting guide part 351 are disposed.

In this case, the depths of the fourth recesses 319R may be different from each other. Preferably, the first sub-fourth recess 319R1 and the second sub-fourth recess 319R2 may have the same depth. That is, the first sub-fourth recess 319R1 and the second sub-fourth recess 319R2 may have a depth corresponding to the height of the plurality of first protrusions (to be described later) of the first tilting guide part 351.

The third sub-fourth recess 319R3 and the fourth sub-fourth recess 319R4 may have the same depth as each other. Preferably, the third sub-fourth recess 319R3 and the fourth sub-four recess 319R4 may have a depth corresponding to the height of the plurality of second protrusions (to be described later) of the first tilting guide part 351.

Meanwhile, each depth of the first sub-fourth recess 319R1 and the second sub-fourth recess 319R2 in which the first protrusion is inserted may be different from each depth of the third sub-fourth recess 319R3 and the fourth sub-fourth recess 319R4 in which the second protrusion is inserted. In this case, the height of the first protrusion of the first tilting guide part 351 may be greater than the height of the second protrusion. Therefore, each depth of the first sub-fourth recess 319R1 and the second sub-fourth recess 319R2 may be greater than each depth of the third sub-fourth recess 319R3 and the fourth sub-fourth recess 319R4.

The holder 333 may further have a plurality of recesses. The recess may have a concave shape on the outer surface of the holder 333 toward the first space 335. The plurality of recesses may include a first recess 337R1, a second recess 337R2, and a third recess 337R3. For example, the first recess 337R1 may be disposed on the first outer surface 330S1. The first recess 337R1 may be disposed in a region corresponding to the first housing hole 311H1. Also, the second recess 337R2 may be disposed on the second outer surface 330S2. The second recess 337R2 may be disposed in a region corresponding to the second housing hole 311H2. Also, the third recess 337R3 may be disposed on the third outer surface 330S3. The third recess 337R3 may be disposed in a region corresponding to the third housing hole 311H3. That is, the first housing hole 311H1 may correspond to the first coil unit 323a, and the second housing hole 311H2 may correspond to the second coil unit 323b. Also, the third housing hole 311H3 may correspond to the third coil unit 323c.

The magnet 325 may be disposed in the first to third recesses 337R1, 337R2, and 337R3. For example, the first magnet 325a may be disposed in the first recess 337R1, the second magnet 325b may be disposed in the second recess 337R2, and the third magnet 325c may be disposed in the third recess 337R3. Also, they may be spaced apart from each other.

<Tilting Guide Pnit>

Figure 38A:
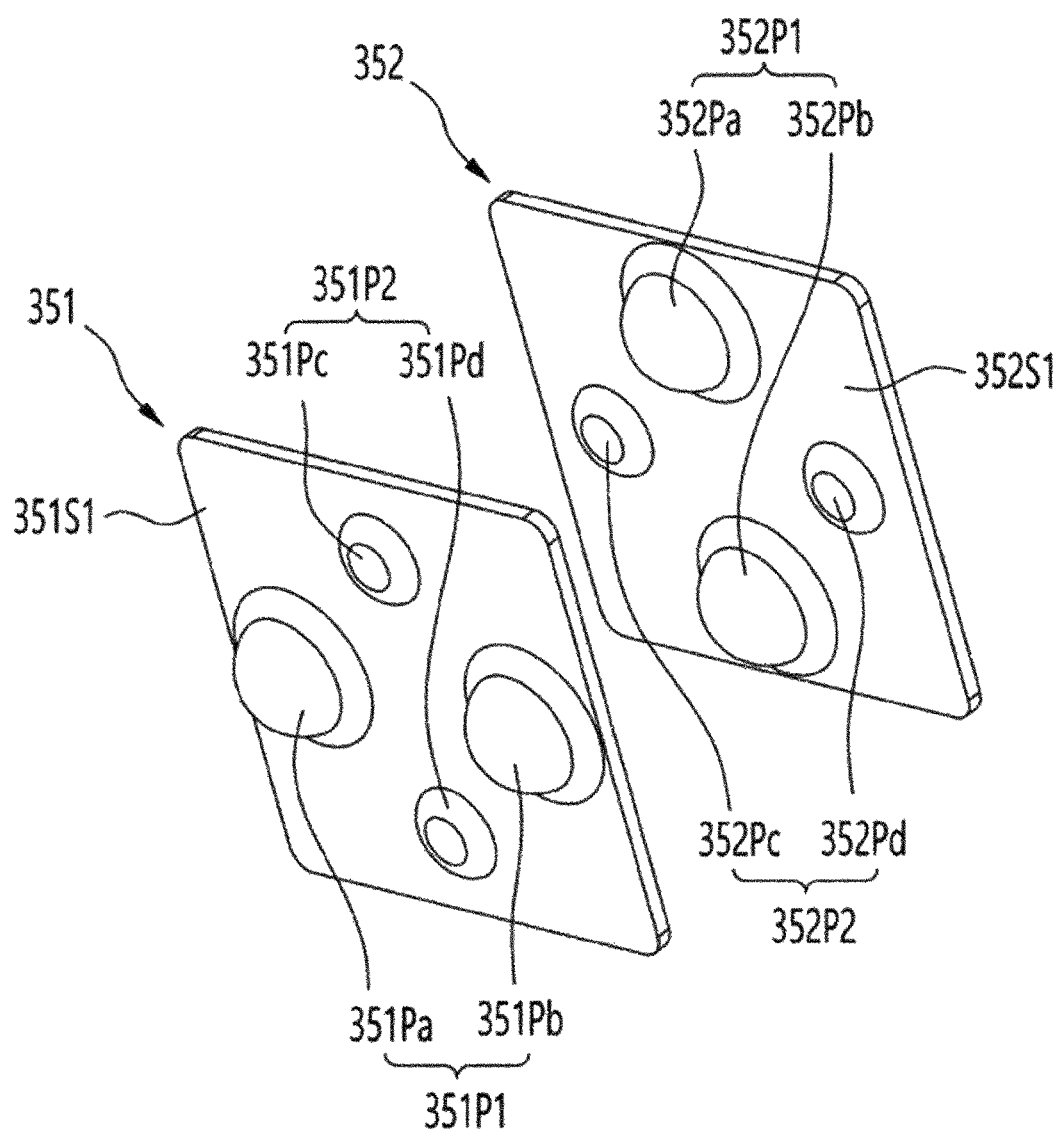
Figure 38B:
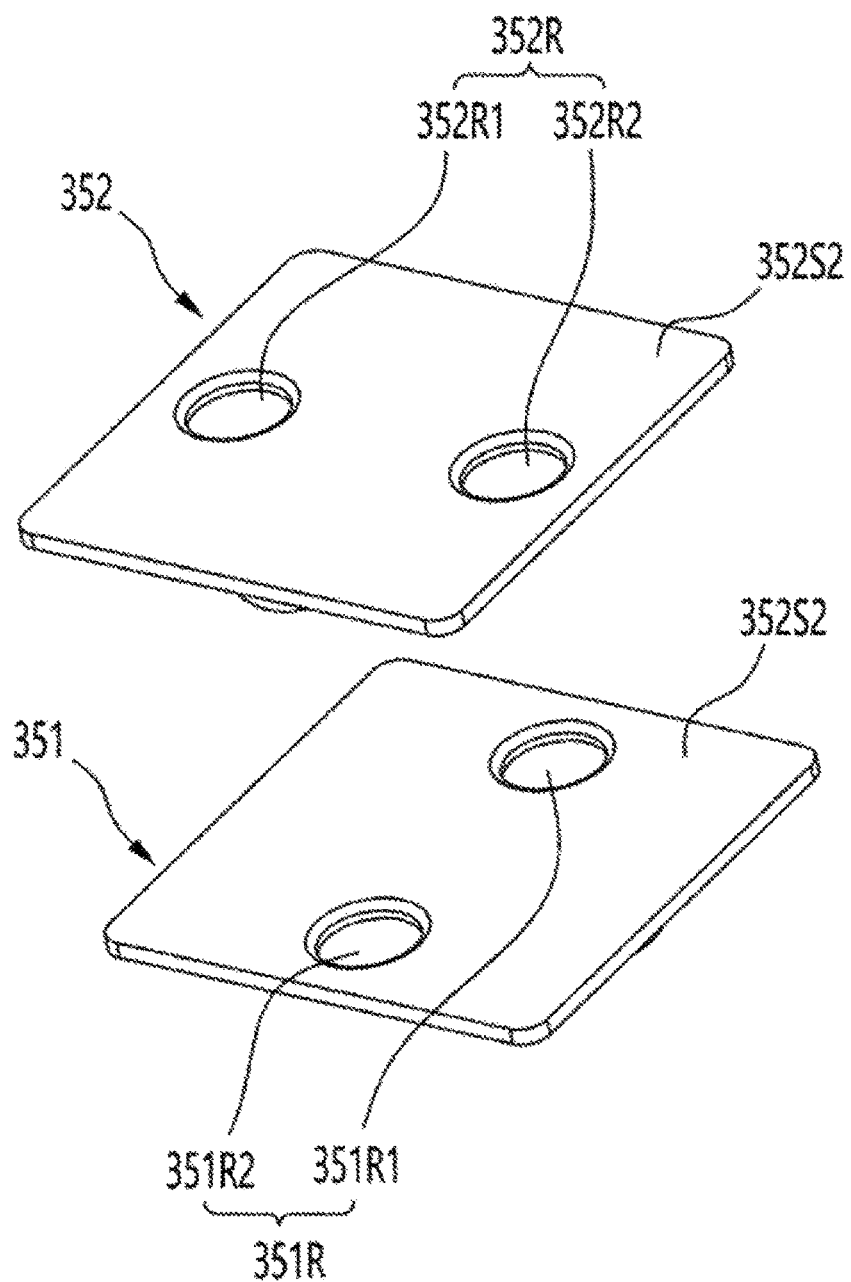

FIG. 38A is a front perspective view of the tilting guide part of the second camera actuator, and FIG. 38B is a rear perspective view of the tilting guide part of the second camera actuator.

Referring to FIGS. 38A and 38B, the tilting guide part 350 may include a first tilting guide part 351 and a second tilting guide part 352.

The first tilting guide part 351 may provide a rotation axis for rotating or tilting the mover 330 in the second direction (e.g., an up-down direction or the y-axis direction). In addition, the second tilting guide part 352 may provide a rotation axis for rotating or tilting the mover 330 in the first direction (e.g., a left-right direction or the x-axis direction).

As described above, in the embodiment, the rotation of the mover 330 in the first direction is performed by the second tilting guide part 352, and the rotation in the second direction is performed by the first tilting guide part 351. That is, in the camera actuator, different plates take charge of a rotation axis for rotation of the mover 330 in the first direction and a rotation axis for rotation in the second direction, respectively. Accordingly, in the embodiment, because the rotation axes are made by different moving plates when the mover 330 rotates in two axes, more stable rotation is possible, rotation accuracy can be increased, and thus stability of rotation driving can be secured.

In this case, the tilting guide part 350 may be disposed between the housing 310 and the mover 330.

The first tilting guide part 351 and the second tilting guide part 352 constituting the tilting guide part 350 may have the same shape and size as each other. That is, the first tilting guide part 351 and the second tilting guide part 352 may be identical to each other. Accordingly, in the embodiment, the two tilting guide parts 350 may be identically manufactured in one equipment, and thus ease of manufacture may be secured.

However, the first tilting guide part 351 and the second tilting guide part 352 constituting the tilting guide part 350 may be disposed in different directions between the housing 310 and the mover 330.

That is, one of the first and second tilting guide parts 351 and 352 may be rotated by 90 degrees relative to the other tilting guide part.

The first tilting guide part 351 and the second tilting guide part 352 may be combined with each other.

That is, the second tilting guide part 352 is combined with the housing 310. In addition, the first tilting guide part 351 may be combined with the second tilting guide part 352 as the mover 330 is disposed on the second tilting guide part 352. Here, the combination means that the first tilting guide part 351 is not fixedly combined with the second tilting guide part 352, but the first tilting guide part 351 simply comes into contact with the second tilting guide part 352.

In this case, the first tilting guide part 351 has a plurality of protrusions and a plurality of grooves, and also the second tilting guide part 352 has a plurality of protrusions and a plurality of grooves. In this case, the plurality of protrusions of the second tilting guide part 352 may be inserted into the plurality of grooves of the first tilting guide part 351. This will be described in detail.

The first tilting guide part 351 and the second tilting guide part 352 may provide rotational axes for the moving direction of the mover 330 moved by an external driving force, for example, the coil unit 323 and the magnet 325.

The first tilting guide part 351 may have a first-first surface 351S1.

The first-first surface 351S1 may be a surface facing the fourth outer surface 330S4 of the mover 330.

A first moving protrusion 351P1 and a first auxiliary protrusion 351P2 may be disposed on the first-first surface 351S1 of the first tilting guide part 351. The first moving protrusion 351P1 performs a function of a rotational axis for rotating the mover 330 in the second direction. The first auxiliary protrusion 351P2 may perform a function of a stopper to limit a rotation range of the mover 330 in the second direction.

The first moving protrusions 351P1 may be disposed to be spaced apart from each other in the first direction (x-axis direction) based on a central region of the first-first surface 351S1 of the first tilting guide part 351. Here, the central region of the first-first surface 351S1 may be a region facing the pulling magnet 360 fixedly disposed on the mover 330. Preferably, the central region of the first-first surface 351S1 may be a region overlapping with the pulling magnet 360 fixedly disposed on the mover 330 in the z-axis direction.

The first moving protrusions 351P1 are spaced apart from each other in the x-axis direction of the central region. That is, the first moving protrusions 351P1 may include a first sub-first moving protrusion 351Pa spaced apart from the central region in the negative x-axis direction, and a second sub-first moving protrusion 351Pb spaced apart from the central region in the positive x-axis direction.

The first sub-first moving protrusion 351Pa may correspond to the first sub-fourth recess 319R1. That is, the first sub-first moving protrusion 351Pa may be disposed at least in part within the first sub-fourth recess 319R1. That is, at least a part of the first sub-first moving protrusion 351Pa may be inserted into the first sub-fourth recess 319R1. In this case, the height of the first sub-first moving protrusion 351Pa may be greater than the depth of the first sub-fourth recess 319R1. Therefore, only a part of the first sub-first moving protrusion 351Pa may be inserted into the first sub-fourth recess 319R1. Accordingly, in a state where at least a part of the first sub-first moving protrusion 351Pa is inserted into the first sub-fourth recess 319R1, the first-first surface 351S1 of the first tilting guide part 351 may be spaced apart from the fourth outer surface 330S4 of the holder 333 by a predetermined distance.

The second sub-first moving protrusion 351Pb may correspond to the second sub-fourth recess 319R2. That is, the second sub-first moving protrusion 351Pb may be disposed at least in part within the second sub-fourth recess 319R2. That is, at least a part of the second sub-first moving protrusion 351Pb may be inserted into the second sub-fourth recess 319R2. In this case, the height of the second sub-first moving protrusion 351Pb may be greater than the depth of the second sub-fourth recess 319R2. Therefore, only a part of the second sub-first moving protrusion 351Pb may be inserted into the second sub-fourth recess 319R2. Accordingly, in a state where at least a part of the second sub-first moving protrusion 351Pb is inserted into the second sub-fourth recess 319R2, the first-first surface 351S1 of the first tilting guide part 351 may be spaced apart from the fourth outer surface 330S4 of the holder 333 by a predetermined distance.

In addition, the first sub-first moving protrusion 351Pa and the second sub-first moving protrusion 351Pb are arranged in the x-axis direction with respect to the center of the first tilting guide part 351, and thus provides a rotation axis for rotating the mover 330 in the second direction. That is, using a virtual first line formed by the first sub-first moving protrusion 351Pa and the second sub-first moving protrusion 351Pb as a reference axis, the mover 330 may provide rotational movement in the second direction (up-down direction)

The first auxiliary protrusions 351P2 may be disposed to be spaced apart from each other in the second direction (y-axis direction) based on a central region of the first-first surface 351S1 of the first tilting guide part 351. Here, the central region of the first-first surface 351S1 may be a region facing the pulling magnet 360 fixedly disposed on the mover 330. Preferably, the central region of the first-first surface 351S1 may be a region overlapping with the pulling magnet 360 fixedly disposed on the mover 330 in the z-axis direction.

The first auxiliary protrusions 351P2 are spaced apart from each other in the y-axis direction of the central region. That is, the first auxiliary protrusions 351P2 may include a first sub-first auxiliary protrusion 351Pc spaced apart from the central region in the positive y-axis direction, and a second sub-first auxiliary protrusion 351Pd spaced apart from the central region in the negative y-axis direction.

The first sub-first auxiliary protrusion 351Pc may correspond to the third sub-fourth recess 319R3. That is, the first sub-first auxiliary protrusion 351Pc may be disposed at least in part within the third sub-fourth recess 319R3. That is, at least a part of the first sub-first auxiliary protrusion 351Pc may be inserted into the third sub-fourth recess 319R3.

In this case, the height of the first sub-first auxiliary protrusion 351Pc may be smaller than the depth of the third sub-fourth recess 319R3. Therefore, the entirety of the first sub-first auxiliary protrusion 351Pc may be inserted into the third sub-fourth recess 319R3. In this case, a difference between the height of the first sub-first auxiliary protrusion 351Pc and the depth of the third sub-fourth recess 319R3 may correspond to a moving range of the mover. That is, the mover 330 may move upward through the first tilting guide part 351 by the difference between the height of the first sub-first auxiliary protrusion 351Pc and the depth of the third sub-four recess 319R3. When out of the movement range, the first sub-first auxiliary protrusion 351Pc may come into contact with the bottom surface of the third sub-fourth recess 319R3 and limit the movement of the mover 330.

The second sub-first auxiliary protrusion 351Pd may correspond to the fourth sub-fourth recess 319R4. That is, the second sub-first auxiliary protrusion 351Pd may be disposed at least in part within the fourth sub-fourth recess 319R4. That is, at least a part of the second sub-first auxiliary protrusion 351Pd may be inserted into the fourth sub-fourth recess 319R4.

In this case, the height of the second sub-first auxiliary protrusion 351Pd may be smaller than the depth of the fourth sub-fourth recess 319R4. Therefore, the entirety of the second sub-first auxiliary protrusion 351Pd may be inserted into the fourth sub-fourth recess 319R4. In this case, a difference between the height of the second sub-first auxiliary protrusion 351Pd and the depth of the fourth sub-fourth recess 319R4 may correspond to the moving range of the mover.

That is, the mover 330 may move downward through the first tilting guide part 351 by the difference between the height of the second sub-first auxiliary protrusion 351Pd and the depth of the fourth sub-fourth recess 319R4. When out of the movement range, the second sub-first auxiliary protrusion 351Pd may come into contact with the bottom surface of the fourth sub-fourth recess 319R4 and limit the movement of the mover 330.

The second tilting guide part 352 has the same structure as the first tilting guide part 351. However, the second tilting guide part 352 may be disposed in a direction different from that of the first tilting guide part 351 in the recess 313R of the housing 310. That is, the first tilting guide part 351 is disposed between the housing 310 and the mover 330 so that the first moving protrusion 351P1 having a greater height between the two protrusions is arranged in the x-axis direction. In this case, the second tilting guide part 352 includes the second moving protrusion 352P1 corresponding to the first moving protrusion 351P1 of the first tilting guide part 351. However, the second moving protrusion 352P1 may be disposed in a direction perpendicular to the disposition direction of the first moving protrusion 351P1. That is, the second moving protrusion 352P1 may be disposed in the y-axis direction based on the center of the second tilting guide part 352.

The second tilting guide part 352 may have a second-first surface 352S1.

The second-first surface 352S1 may be a surface facing the first-second surface 351S2, which is the opposite surface of the first-first surface 351S1 of the first tilting guide part 351.

A second moving protrusion 352P1 and a second auxiliary protrusion 352P2 may be disposed on the second-first surface 352S1 of the second tilting guide part 352. The second moving protrusion 352P1 performs a function of a rotational axis for rotating the mover 330 in the first direction. The second auxiliary protrusion 352P2 may perform a function of a stopper to limit a rotation range of the mover 330 in the first direction.

The second moving protrusion 352P1 may be disposed to be spaced apart from each other in the second direction (y-axis direction) based on the central region of the second-first surface 352S1 of the second tilting guide part 352. Here, the central region of the second-first surface 352S1 may be a region facing the pulling magnet 360 fixedly disposed on the mover 330. Preferably, the central region of the second-first surface 352S1 may be a region overlapping with the pulling magnet 360 fixedly disposed on the mover 330 in the z-axis direction.

The second moving protrusions 352P1 are spaced apart from each other in the x-axis direction of the central region. That is, the second moving protrusion 352P1 may include a first sub-second moving protrusion 352Pa spaced apart from the central region in the positive y-axis direction, and a second sub-second moving protrusion 352Pb spaced apart from the central region in the negative y-axis direction.

The first sub-second moving protrusion 352Pa and the second sub-second moving protrusion 352Pb may correspond to a first moving recess 351R disposed on the first-second surface 351S2 of the first tilting guide part 351 to be described later. That is, the first sub-second moving protrusion 352Pa and the second sub-second moving protrusion 352Pb may be fitted into the first moving recess 351R disposed on the first-second surface 351S2 of the first tilting guide 351. This will be described in detail below.

In addition, the first sub-second moving protrusion 352Pa and the second sub-second moving protrusion 352Pb are arranged in the y-axis direction with respect to the center of the second tilting guide part 352, and thus provides a rotation axis for rotating the mover 330 in the first direction. That is, using a virtual second line formed by the first sub-second moving protrusion 352Pa and the second sub-second moving protrusion 352Pb as a reference axis, the mover 330 may provide rotational movement in the first direction (left-right direction).

The second auxiliary protrusions 352P2 may be disposed to be spaced apart from each other in the first direction (x-axis direction) based on a central region of the second-first surface 352S1 of the second tilting guide part 352. Here, the central region of the second-first surface 352S1 may be a region facing the pulling magnet 360 fixedly disposed on the mover 330.

Preferably, the central region of the second-first surface 352S1 may be a region overlapping with the pulling magnet 360 fixedly disposed on the mover 330 in the z-axis direction.

The second auxiliary protrusions 352P2 are spaced apart from each other in the x-axis direction of the central region. That is, the second auxiliary protrusion 352P2 may include a first sub-second auxiliary protrusion 352Pc spaced apart from the central region in the negative x-axis direction, and a second sub-second auxiliary protrusion 352Pd spaced apart from the central region in the positive x-axis direction.

In a state where the first sub-second moving protrusion 352Pa and the second sub-second moving protrusion 352Pb are fitted into the first moving recess 351R of the first tilting guide part 351, the first sub-second auxiliary protrusion 352Pc and the second sub-second auxiliary protrusion 352Pd may be spaced apart from the first-second surface 351S2 of the first tilting guide part 351 by a predetermined distance. Also, the separation distance may correspond to the movement range of the mover.

That is, the mover 330 may move leftward through the second tilting guide part 352 by the separation distance between the first sub-second auxiliary protrusion 352Pc and the first-second surface 351S2. When out of the movement range, the first sub-second auxiliary protrusion 352Pc may come into contact with the first-second surface 351S2 and the bottom surface of the first tilting guide part 351 and limit the movement of the mover 330.

In addition, the mover 330 may move rightward through the second tilting guide part 352 by the separation distance between the second sub-second auxiliary protrusion 352Pd and the first-second surface 351S2. When out of the movement range, the second sub-second auxiliary protrusion 352Pd may come into contact with the first-second surface 351S2 and the bottom surface of the first tilting guide part 351 and limit the movement of the mover 330.

Meanwhile, the first tilting guide part 351 may have the first-second surface 351S2. The first-second surface 351S2 may be a surface facing the second-first surface 352S1 of the second tilting guide part 352.

In addition, first moving recesses 351R may be disposed on the first-second surface 351S2 of the first tilting guide part 351.

The first moving recesses 351R may be arranged in the y-axis direction based on the center of the first-second surface 351S2 of the first tilting guide part 351, thus providing a space for a combination with the second tilting guide part 352. That is, the first moving recesses 351R may correspond to the second moving protrusions 352P1 of the second tilting guide part 352. That is, the first moving recesses 351R may include a first sub-first moving recess 351R1 corresponding to the first sub-second auxiliary protrusion 352Pc of the second moving protrusion 352P1, and a second sub-first moving recess 351R2 corresponding to the second sub-second auxiliary protrusion 352Pd of the second tilting guide part 352.

Accordingly, the first sub-second auxiliary protrusion 352Pc of the second moving protrusion 352P1 may be inserted at least in part into the first sub-first moving recess 351R1, and the second sub-second auxiliary protrusion 352Pd of the second tilting guide part 352 may be inserted at least in part into the second sub-first moving recess 351R2.

Meanwhile, the second tilting guide part 352 may have the second-second surface 352S2. The second-second surface 352S2 may be a surface facing the fourth inner surface 310S4 of the housing 310 where the recess 313R is formed.

In addition, the second moving recesses 352R may be disposed on the second-second surface 352S2 of the second tilting guide part 352. Meanwhile, the second moving recess 352R of the second tilting guide part 352 may be omitted. However, in order to manufacture the first tilting guide part 351 and the second tilting guide part 352 in the same process, the second moving recess 352R may be disposed in the second tilting guide part 352 as in the first tilting guide part 351.

The second moving recesses 352R may be arranged in the x-axis direction based on the center of the second-second surface 352S2 of the second tilting guide part 352.

For example, the second moving recesses 352R may include a first sub-second moving recess 352R1 disposed in the negative x-direction based on the center of the second-second surface 352S2 of the second tilting guide part 352, and a second sub-second moving recess 352R2 disposed in the positive x-direction based on the center of the second-second surface 352S2 of the second tilting guide part 352.

In this case, the second tilting guide part 352 is fixedly disposed in the recess 313R of the housing 310. Also, an adhesive member for fixing the second tilting guide part 352 is disposed in the recess 313R. In this case, the second moving recess 352R may improve combining force between the second tilting guide part 352 and the housing 310. That is, in the process of fixing the second tilting guide part 352 to the housing 310 by using the adhesive member, the adhesive member may penetrate into the second moving recess 352R of the second tilting guide part 352, thereby increasing the contact area with the adhesive member and improving the adhesive force.

Meanwhile, in the embodiment, the first tilting guide part 351 and the second tilting guide part 352 may be formed of the same material or different materials. In this case, the second tilting guide part 352 may be formed of a magnetic material.

That is, the second tilting guide part 352 is fixed to the housing 310. Also, the pulling magnet 360 is fixed to the mover 330. In addition, the first tilting guide part 351 may be interposed between the second tilting guide part 352 and the pulling magnet 360 in a state where the protrusion thereof is inserted into the recess of the mover 330 and the protrusion of the second tilting guide part 352 is inserted into the recess thereof.

In this case, the second tilting guide part 352 is formed of a magnetic material. Therefore, the pulling magnet 360 and the second tilting guide part 352 may generate the attractive force to each other. That is, the attractive force acts between the pulling magnet 360 and the second tilting guide part 352. Thus, the mover 330 may be pressed toward the housing 310 by the attractive force. That is, the mover 330 may be supported to the housing 310 by the attractive force. In addition, as the mover 330 is pressed, the first tilting guide part 351 may also be pressed together with the mover 330 and supported to the housing 310.

Here, the first tilting guide part 351 and the second tilting guide part 352 may be formed by a press method. Thus, the first tilting guide part 351 and the second tilting guide part 352 may be formed of different materials. That is, unlike the second tilting guide part 352, the first tilting guide part 351 may be formed of a non-magnetic material. For example, the first tilting guide part 351 may be formed of an injection molding material or a ceramic material. However, to simplify the manufacturing process, the first tilting guide part 351 and the second tilting guide part 352 may be formed of a magnetic material. In addition, when the first tilting guide part 351 is formed of a magnetic material, the combining force among the first tilting guide part 351, the second tilting guide part 352, and the pulling magnet 360 can be further improved.

On the other hand, the plurality of first moving protrusions and the plurality of first auxiliary protrusions are arranged in a cross shape based on the first area on the first-first surface 351S1 of the first tilting guide part 351, and the plurality of second moving protrusions and the plurality of second auxiliary protrusions are arranged in a cross shape based on the second area on the second-first surface 352S1 of the second tilting guide part 352. In this case, the first and second areas overlap with the pulling magnet in the third direction. In other words, on the first-first surface 351S1 of the first tilting guide part 351, the plurality of first moving protrusions and the plurality of first auxiliary protrusions may be arranged in a cross shape based on a region overlapping with the pulling magnet 360 in the z-axis direction. In addition, on the second-first surface 352S1 of the second tilting guide part 352, the plurality of second moving protrusions and the plurality of second auxiliary protrusions may be arranged in a cross shape based on a region overlapping with the pulling magnet 360 in the z-axis direction.

Figure 39:
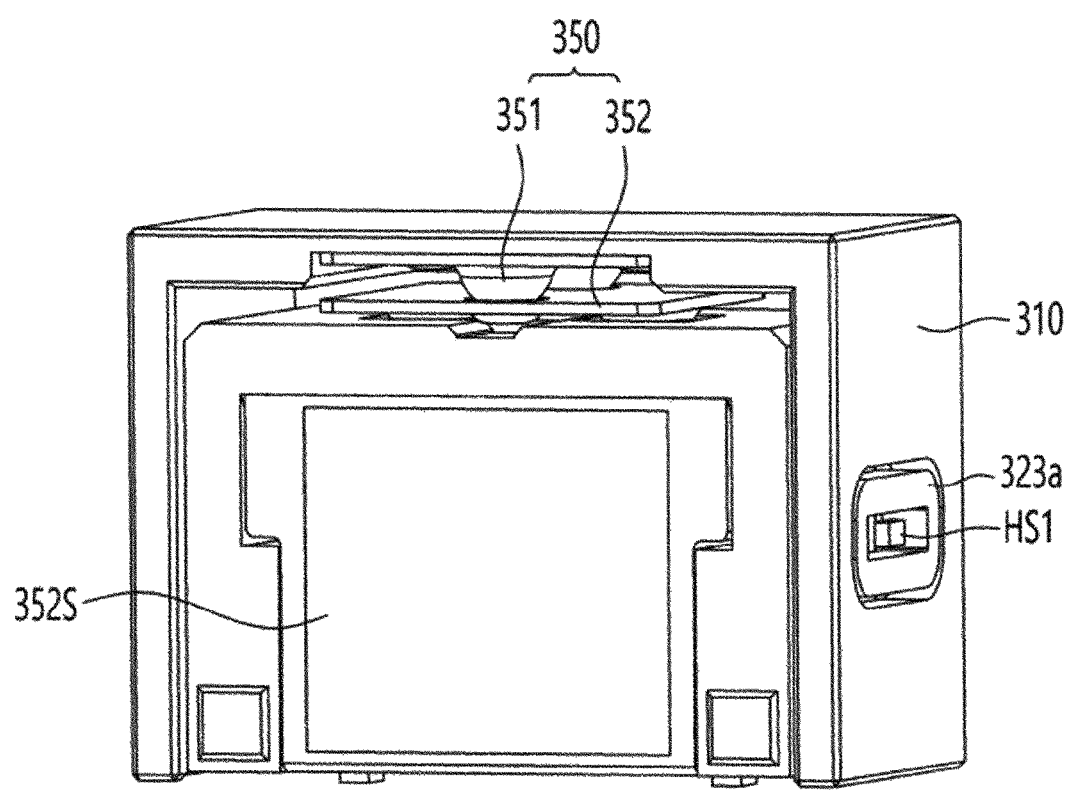
FIGS. 39 and 40 are views of a combination relationship among a housing, a mover, and a moving protrusion in a second camera actuator.
Figure 40:
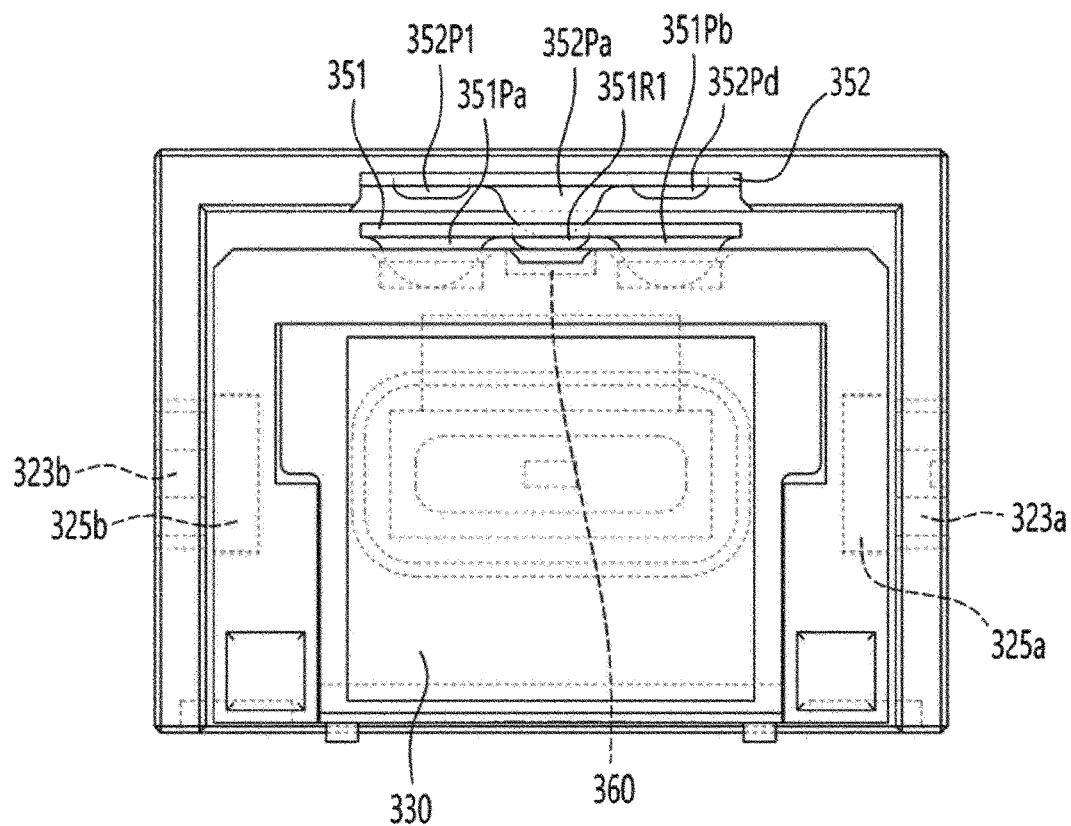

FIGS. 39 and 40 are views of a combination relationship among a housing, a mover, and a moving protrusion 352P1 in a second camera actuator.

Referring to FIGS. 39 and 40, the tilting guide part 350 according to the embodiment may include the first tilting guide part 351 and the second tilting guide part 352. In addition, the second tilting guide part 352 may generate a force for fixing the mover 330 to the housing 310 and also provide a rotation axis for rotating the mover 330 in the first direction.

The centers of the pulling magnet 360, the first tilting guide part 351, and the second tilting guide part 352 may overlap with each other in the z-axis direction.

The first tilting guide part 351 may be disposed between the housing 310 on which the second tilting guide part 352 is disposed and the mover 330 on which the pulling magnet 360 is disposed.

In this case, the first moving protrusion 351P1 and the first auxiliary protrusion 351P2 of the first tilting guide part 351 may be inserted into the fourth recess 319R of the mover 330.

The first sub-first moving protrusion 351Pa may be inserted into the first sub-fourth recess 319R1, and the second sub-first moving protrusion 351Pb may be inserted into the second sub-fourth recess 319R2.

In addition, the first sub-first auxiliary protrusion 351Pc may be inserted into the third sub-four recess 319R3, and the second sub-first auxiliary protrusion 351Pd may be inserted into the fourth sub-fourth recess 319R4.

Also, the second moving protrusion 352P1 of the second tilting guide part 352 may be inserted into the first moving recess 351R of the first tilting guide part 351.

Accordingly, the first tilting guide part 351 may be pressed together with the mover 330 by the attractive force acting between the second tilting guide part 352 and the pulling magnet 360, thereby being supported to the housing 310.

Therefore, the first tilting guide part 351 serves as a rotation axis for rotating the mover 330 in the second direction corresponding to the y-axis direction, and the second tilting guide part 352 serves as a rotation axis for rotating the mover 330 in the first direction corresponding to the x-axis direction.

In the embodiment, by the electromagnetic force between the first to third magnets 325a, 325b, and 325c disposed on the holder 333 and the first to third coil units 323a, 323b, and 323c, the tilting of the mover 330 on the first axis or the second axis is controlled. This achieves technical effects of minimizing the occurrence of a decent or tilt phenomenon upon OIS implementation and providing the best optical characteristics.

For example, according to the embodiment, in a state where the tilting guide part 350 is disposed between the housing 310 and the mover 330, the tilting of the mover 330 on the first axis or the second axis is controlled by the driving force of the image shake control unit 320. This achieves technical effects of minimizing the occurrence of a decenter or tilt phenomenon upon OIS implementation, providing the best optical characteristics, and realizing an ultra-slim and ultra-small camera actuator.

Also, the mover 330 according to the embodiment may be fixed within the housing 310 by the cover member 301 and the elastic member 350. Accordingly, a separate magnet and yoke for fixing the mover 330 in the housing 310 can be omitted, so that a slimmer camera actuator can be implemented.

Figure 41A:
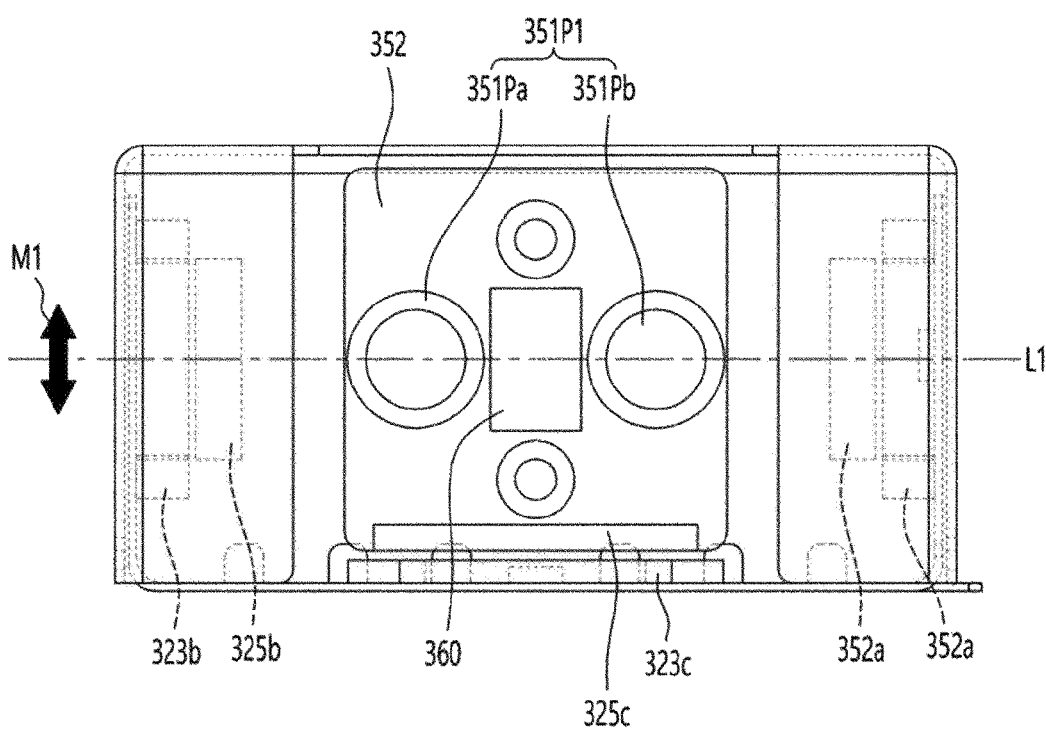
FIGS. 41A and 41B are exemplary views showing an operation of a second camera actuator according to an embodiment.
Figure 41B:
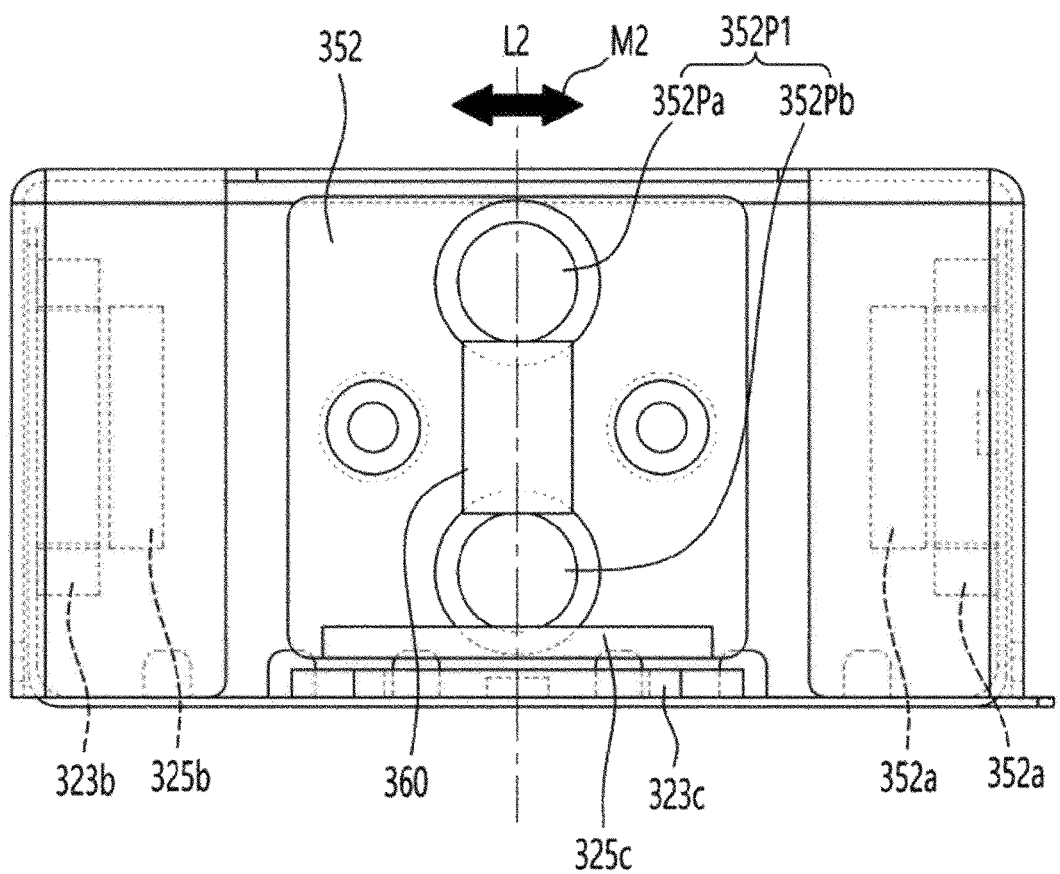

FIGS. 41A and 41B are exemplary views showing an operation of a second camera actuator according to an embodiment.

Referring to FIG. 41, the mover 330 according to the embodiment can control tilting on the first axis or second axis by the driving force of the image shake control unit 320.

First, referring to FIG. 41A, the mover 330 may provide rotational movement in the second direction by using the first imaginary line L1 formed by the first moving protrusion 351P1 of the first tilting guide part 351 as a reference axis. In detail, the image shake control unit 320 may rotate the mover 330 in the up and down directions.

For example, a repulsive force may occur between the third-first coil unit adjacent to the first tilting guide part 351 among the third coil units 323$c$ and the third-first magnet adjacent to the first tilting guide part 351 among the third magnets 325$c$. In addition, an attractive force may occur between the third-second coil unit far from the first tilting guide part 351 among the third coil units 323$c$ and the third-second magnet far from the first tilting guide part 351 among the third magnets 325$c$.

Accordingly, the mover 330 may be tilted upward or downward with respect to the first line L1 as a reference axis. That is, the mover 330 may be tilted at a predetermined angle upward or downward with respect to the first line L1. Thus, the travel path of light incident on the mover 330 can be controlled.

In addition, referring to FIG. 41B, the mover 330 may provide rotational movement in the first direction by using the second imaginary line L2 formed by the second moving protrusion 352P1 of the second tilting guide part 352 as a reference axis. In detail, the image shake control unit 320 may rotate the mover 330 in the left and right directions.

For example, a repulsive force may occur between the first-first coil unit adjacent to the second tilting guide part 352 among the first coil units 323$a$ and the first-first magnet adjacent to the second tilting guide part 352 among the first magnets 325$a$. In addition, an attractive force may occur between the first-second coil unit far from the second tilting guide part 352 among the first coil units 323$a$ and the first-second magnet far from the second tilting guide part 352 among the first magnets 325$a$. In addition, an attractive force may occur between the second-first coil unit adjacent to the second tilting guide part 352 among the second coil units 323$b$ and the second-first magnet adjacent to the second tilting guide part 352 among the second magnets 325$b$. In addition, a repulsive force may occur between the second-second coil unit far from the second tilting guide part 352 among the second coil units 323$b$ and the second-second magnet far from the second tilting guide part 352 among the second magnets 325$b$.

Accordingly, the mover 330 may be tilted leftward or rightward with respect to the second line L2 as a reference axis. That is, the mover 330 may be tilted at a predetermined angle leftward or rightward with respect to the second line L2. Thus, the travel path of light incident on the mover 330 can be controlled.

Figure 42:
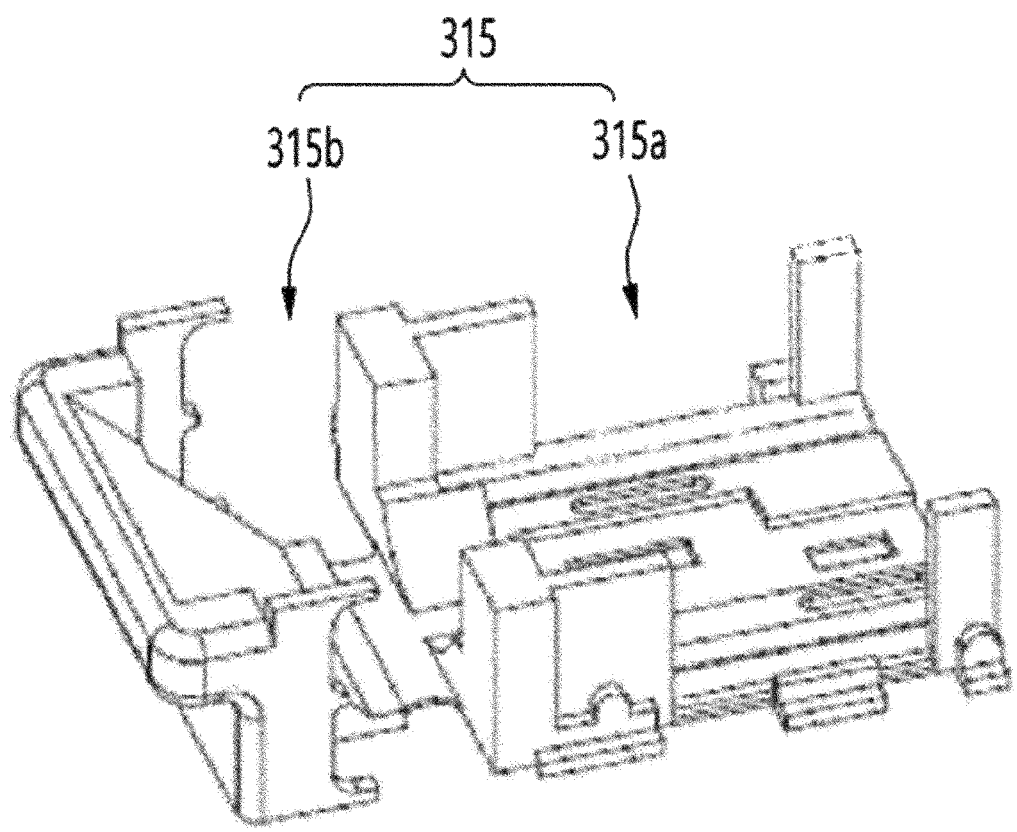
FIG. 42 is an exemplary view of an integrated body in a camera module according to another embodiment.

FIG. 42 is an exemplary view of an integrated body 315 in a camera module according to another embodiment.

In the camera module according to another embodiment, the second camera actuator 100 may be disposed in a first body region 315$a$ of the integrated body 315, and the first camera actuator 100 may be disposed in a second body region 315$b$.

Figure 43:
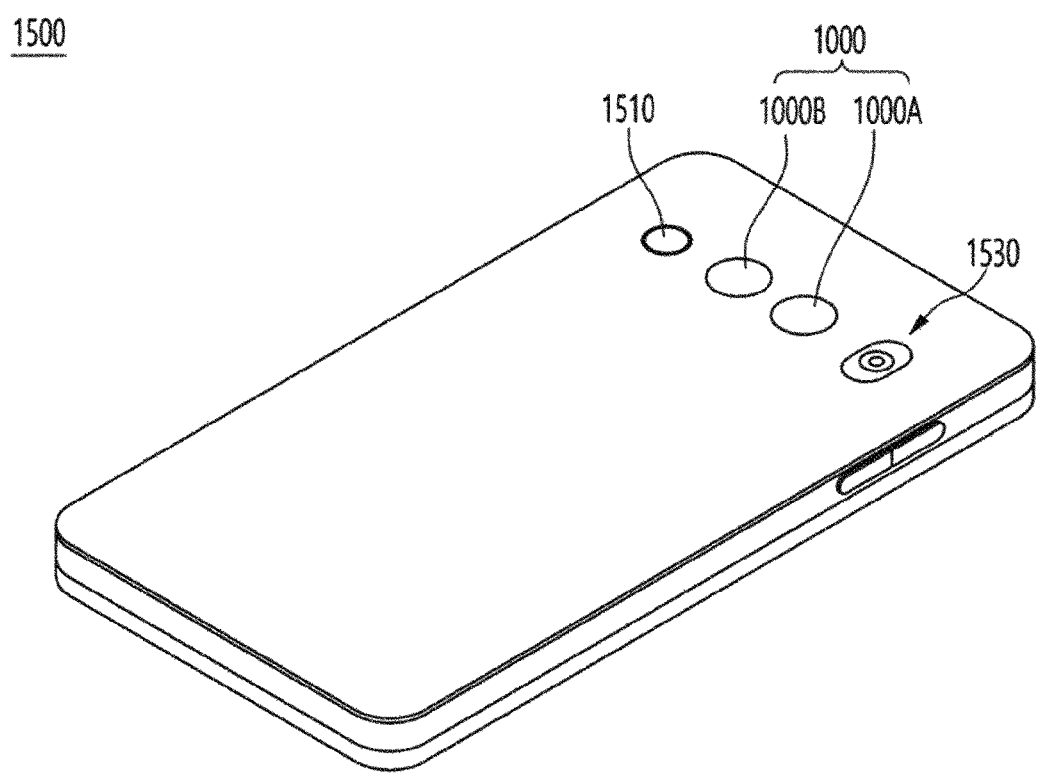
FIG. 43 is a perspective view of a mobile terminal to which a camera module according to an embodiment is applied.

FIG. 43 is a perspective view of a mobile terminal 1500 to which a camera module according to an embodiment is applied.

Referring to FIG. 43, a mobile terminal 1500 according to an embodiment may include a camera module 1000, a flash module 1530, and an auto-focus device 1510, which are provided on the rear surface thereof.

The camera module 1000 may have an image capturing function and an auto-focus function. For example, the camera module 1000 may have the auto-focus function using an image.

The camera module 1000 processes an image frame of a still image or a moving image obtained by an image sensor in a shooting mode or a video call mode. The processed image frame may be displayed on a predetermined display unit and stored in a memory. A camera (not shown) may also be disposed on the front surface of the mobile terminal.

For example, the camera module 1000 may include a first camera module 1000A and a second camera module 1000B, and the OIS may be implemented together with the AF or zoom function by the first camera module 1000A.

The flash module 1530 may include therein a light emitting device that emits light. The flash module 1530 may operate in response to a camera operation of the mobile terminal or a user's manipulation.

The auto-focus device 1510 may include one of packages of a surface light emitting laser device as a light emitting part.

The auto-focus device 1510 may include an auto-focusing function using a laser. The auto-focus device 1510 may be mainly used in a condition in which the auto-focusing function using the image of the camera module 1000 is deteriorated, for example, in a close environment of 10 m or less or in a dark environment. The auto-focus device 1510 may include a light emitting unit including a vertical cavity surface emitting laser (VCSEL) semiconductor device, and a light receiving unit such as a photodiode that converts light energy into electrical energy.

Figure 44:
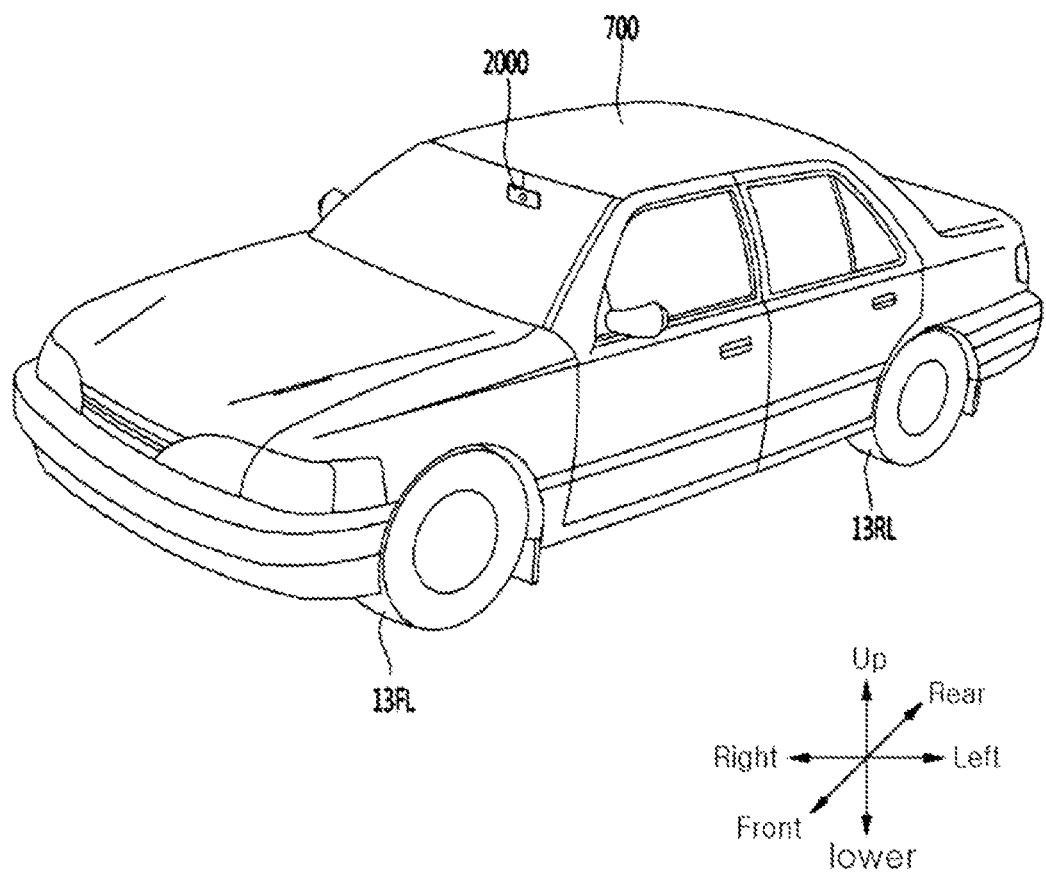
FIG. 44 is a perspective view of a vehicle to which a camera module according to an embodiment is applied.

FIG. 44 is a perspective view of a vehicle 700 to which a camera module according to an embodiment is applied.

For example, FIG. 44 is an external view of a vehicle including a vehicle driving assistance device to which the camera module 1000 according to an embodiment is applied.

Referring to FIG. 44, a vehicle 700 according to an embodiment may include wheels 13FL and 13FR that rotate by a power source, and a predetermined sensor. The sensor may be, but is not limited to, a camera sensor 2000.

The camera 2000 may be a camera sensor to which the camera module 1000 according to an embodiment is applied.

The vehicle 700 of the embodiment may acquire image information through the camera sensor 2000 that captures a front image or a surrounding image, and determine a lane unidentified situation by using the image information to generate a virtual lane.

For example, the camera sensor 2000 may obtain a front image by capturing the front of the vehicle 700, and a processor (not shown) may analyze an object contained in the front image to acquire image information.

For example, if the image captured by the camera sensor 2000 contains objects such as a lane, an adjacent vehicle, a driving obstacle, and an indirect road mark such as a median, a curb, or a street tree, the processor may detect such objects and include them in the image information.

In this case, the processor may acquire distance information from the object detected through the camera sensor 2000 and thereby further supplement the image information. The image information may be information about an object captured in an image.

The camera sensor 2000 may include an image sensor and an image processing module.

The camera sensor 2000 may process a still image or a moving image obtained by the image sensor (e.g., CMOS or CCD). The image processing module may process a still image or a moving image obtained through the image sensor, extract necessary information, and transmit the extracted information to the processor.

In this case, the camera sensor 2000 may include, but is not limited to, a stereo camera to improve the object measurement accuracy and further secure information such as a distance between the vehicle 700 and the object.

Although it has been described based on embodiments so far, this is only exemplary and does not limit the present disclosure, and those of ordinary skill in the art to which the present disclosure pertains will appreciate that various modifications and applications, not described above, are possible in the scope that does not depart from the subject matter of the present disclosure. For example, the respective elements specifically shown in the embodiments may be implemented by modification. Differences related to these modifications and applications should be construed as being included in the scope of the present disclosure defined in the appended claims.

The invention claimed is:

1. A camera actuator comprising:
a housing;
a first member coupled with the housing;
a mover including an optical member;
a first magnetic body disposed on the first member;
a second magnetic body disposed on the mover; and
a tilting guide configured to guide tilting of the mover,
wherein the mover includes a holder coupled with the optical member and a second member coupled with the holder,
wherein the tilting guide is in close contact with the first member and the holder by a repulsive force of the first magnetic body and the second magnetic body,
wherein the first member includes a first through hole and a second through hole spaced apart from the first through hole, and
wherein the second member includes a member base; a first extension located at an edge of the member base and extending toward the holder; and a second extension spaced apart from the first extension and extending toward the holder,
wherein the first extension passes through the first through hole, and
wherein the second extension passes through the second through hole.

2. The camera actuator of claim 1, wherein the first member includes:
an upper member disposed above the first through hole and the second through hole;
a lower member disposed below the first through hole and the second through hole;
a connecting member connecting the upper member and the lower member;
a first protrusion extending toward the holder from one side of the upper member; and
a second protrusion extending toward the holder from an other side of the upper member,
wherein the first extension and the second extension are disposed between the upper member and the lower member.

3. A camera actuator comprising:
a housing;
a first member coupled with the housing;
a mover including a holder;
a first magnetic body disposed on the first member;
a second magnetic body disposed on the mover; and
a tilting guide part disposed between the holder and the first member,
wherein the mover includes a second member coupled with the holder,
wherein a portion of the first member is disposed between the second member and the holder,
wherein a first surface of the first magnetic body and a second surface of the second magnetic body facing the first surface have same polarity,
wherein the first member includes a first through hole and a second through hole spaced apart from the first through hole,
wherein the second member includes a member base; a first extension located at an edge of the member base and extending toward the holder; and a second extension spaced apart from the first extension and extending toward the mover,
wherein the first extension passes through the first through hole, and
wherein the second extension passes through the second through hole.

4. The camera actuator of claim 3, wherein a center of the second magnetic body and a center of the second member are disposed at different positions from each other.

5. The camera actuator of claim 4, wherein the center of the second magnetic body is located above or below the center of the second member.

6. The camera actuator of claim 5, wherein an area of the second magnetic body is greater than an area of the first magnetic body.

7. A camera actuator comprising:
a housing;
a first member coupled with the housing;
a first magnetic body disposed on the first member;
a second magnetic body corresponding to the first magnetic body;
a second member on which the second magnetic body is disposed;
a holder coupled with the second member; and
a tilting guide part disposed between the holder and the first member,
wherein a portion of the first member is disposed between the second member and the holder,
wherein the first member includes a first through hole and a second through hole spaced apart from the first through hole,
wherein the second member includes a member base; a first extension located at an edge of the member base and extending toward the holder; and a second extension spaced apart from the first extension and extending toward the mover,
wherein the first extension passes through the first through hole, and
wherein the second extension passes through the second through hole.

8. The camera actuator of claim 7, wherein the first magnetic body and the second magnetic body face each other with same polarity.

* * * * *